US006771866B2

(12) United States Patent
Iimura

(10) Patent No.: US 6,771,866 B2
(45) Date of Patent: Aug. 3, 2004

(54) PHOTOCATALYST APPARATUS, METHOD OF MANUFACTURE THEREOF AND PHOTOCATALYST REACTOR

(76) Inventor: Keiji Iimura, 10-8, Akatsuka 3 chome, Itabashi-ku, Tokyo, 175-0092 (JP)

(*) Notice: Subject to any disclaimer, the term of this patent is extended or adjusted under 35 U.S.C. 154(b) by 0 days.

(21) Appl. No.: 10/225,115

(22) Filed: Aug. 19, 2002

(65) Prior Publication Data

US 2003/0026585 A1 Feb. 6, 2003

Related U.S. Application Data

(63) Continuation-in-part of application No. 09/644,418, filed on Aug. 21, 2000, now Pat. No. 6,501,893, which is a continuation-in-part of application No. 09/146,915, filed on Sep. 2, 1998, now Pat. No. 6,108,476.

(30) Foreign Application Priority Data

May 17, 2002 (JP) ....................................... 2002-143727

(51) Int. Cl.[7] ................................................. G02B 6/02

(52) U.S. Cl. ......................... 385/128; 385/12; 385/123; 385/147

(58) Field of Search ........................... 385/12, 123–128, 385/147; 422/186, 186.3

(56) References Cited

U.S. PATENT DOCUMENTS 6,108,476 A * 8/2000 Iimura ........................ 385/128
6,501,893 B1 * 12/2002 Iimura ........................ 385/128

* cited by examiner

*Primary Examiner*—Phan T. H. Palmer

(57) ABSTRACT

A photocatalyst apparatus includes a plurality of photocatalytic optical fibers, each having a photocatalytic clad on a solid or hollow core and a solid or hollow substrate having a surface for attaching the fibers thereto/thereon, preferably by an adhesive, wherein the fibers project from the surface, preferably in perpendicular direction and/or substantially parallel to one another. The substrate may have light-redirecting means preferably with a gradation pattern or may have opening/openings to pass therethrough. The photocatalytic optical fibers may receive light at fixed ends and/or at free ends thereof. The fibers may have light collectors on free ends thereof. A manufacture of the photocatalyst apparatus may be preferably accomplished by an electrostatic process. A photocatalyst reactor may include a light source to communicate with the photocatalytic optical fibers and/or may include a housing to enclose the photocatalyst apparatus/apparatuses.

47 Claims, 47 Drawing Sheets

A 100 30d 30c A L 60 60a 30b 30 30a 200 40

20c 10a 10d 10 20a 10a 10c 20a 20b 20 20c L3 10 20b 100

A
30d
60
60a
200
30b
30
30a
100
L
30c
40
A 100
30a
60
L3
L2
100
30c
L
40
50
90
30
30b
90
30d
35
200

100a
100b
100c
100d
100e
100f
30a
30c
60
40
50
L
90
30
30b
90
30d
35
300

100
100
72a
60
72
72c
72d
72b
40a
40b
50a
50b
91-1
91-1
91
91-(n-1)
91-n
91-(n-1)
500

100
100
110
72a
60
72
72b
72c
72d
40a
40b
50a
50b
91
91-1
91-1
91-(n-1)
91-n
91-(n-1)
600

90
70d
100
70a
70b
410
100
80
70
110
60
L
70c
40
50

120
120-n
60
75a
700
F1
75b
75
120-1
F2
100
40

100
73d
40b
50b
73b
73a
130
750
60
73
80
100
130
73c
40a
50a 100
73d
40b
50b
73b
100
73a
130
60
73
800
100
100
130
60
73c
40a
50a 50b
40b
30d
L
100
90
30b
60
220
30a
30
90
100
L
30c
40a
50a 35
30d
100
w
90-n
90-(n-1)
60
30b
230
30a
30
90-1
100
L
30c
40
50

100
30d
35
91-n
91-(n-1)
w
60
80
620
30a
30b
91
30
91-1
100
L
30c
40
50

30b
38
100
60
30a
860
60
39
100
38
30

100
10
22
23
30d
30a
60
30
30b
880
30c 100
25
30d
30b
30a
890
60
30
25b
100
30c
25a 30d
60
60a
200
45
40
30b
30
140
140b
30a
100
30c
140a

950
H
H1
H2
F1
F2
35
30d
100
90
30b
30a
200-1
200-2
30
60
L
30c
40
50

H1
F1
960
H
100a
120-1
120-1
100a
H5
60a
73a
H5
73c
H
73-1
140A1
60b
100b
73b
73d
140B1
45a
100b
45b
800-1
100a
100a
40a
120-2
120-2
40b
60a
73a
73d
73c
140A2
140B2
73-2
73b
60b
100b
H5
100b
H5
800-2
F2
H2

35
100
30d
200
90
30b
60
900
30a
30
90
150
150c
100
30c
150a
150b
L
40
50

30d
60
60a
30b
30
900
45
40
140b
30a
150
200
140
140a
100
30c 30d
60
60a
920
30b
30
30a
200
150a
150
150b
150c
100
40
30c 100
40
74a
60
100
74b
820
74

100
40
75a
840
60
75
100

110
78
15
10c
10
20
10d
L2
L2
L2
60
860
78a
78b 120
78
16
10c
10
20
10d
L2
L2
L2
60
880
78a
78b 100
79a
60
100
79d
79b
79e
420
79
79c
40b
50b
40a
50a 930
100
74a
62
100
74d
74b
74
74c 940
60
100
92
92a
92b
120
122
75d
950
F1
75a
75b
75 (77)
75c
40
PR-1
F2
100
100
60

92a
92b
60
100
100
75d
75a
75b
F1
950
940
75
75c
F2
92
122
120
PR-2
40

920
91a
91b
65d
60
100
980
65a
65b
65
91
65c
100
60
L
PR-4
40

91
60
100
920
91b
91a
100
65d
930
65a
65b
65
65c
L
40
PR-5

60d
100
60
30
990
30a
60a
60b
150
L
60c
40
50

PHOTOCATALYST APPARATUS, METHOD OF MANUFACTURE THEREOF AND PHOTOCATALYST REACTOR

CROSS-REFERENCE TO RELATED APPLICATIONS

This is a continuation-in-part (CIP) application of U.S. patent application Ser. No. 09/644,418 filed on Aug. 21, 2000, now U.S. Pat. No. 6,501,893, which is a CIP application of U.S. patent application Ser. No. 09/146,915 filed on Sep. 2, 1998, now U.S. Pat. No. 6,108,476.

BACKGROUND OF THE INVENTION

1. Field of the Invention

The present invention relates to a photocatalyst apparatus using a plurality of photocatalytic optical fibers which include a photocatalyst material, a method of manufacture thereof and a photocatalyst reactor using the photocatalyst apparatus.

2. Description of Related Art

It is well known that a photocatalyst (i.e. photocatalytic material) is made of photo-activating or photo-catalyzing semiconductor typically Titanium Dioxide ($TiO_2$). The photocatalyst is activated by irradiation of light including relatively short wavelength such as ultraviolet (UV) light, purple or blue visible light.

The photocatalyst oxidizes and/or reduces contaminants (i.e. pollutants) so as to decompose (i.e. dissolve, resolve) the contaminants by a photo-catalyzing reaction or effect.

The photocatalyst is capable of applying to various fields by utilizing the photo-catalyzing reaction of the photocatalyst. That is, these fields are, for example, a cleaning to delete dirty components from a surface of articles, a dirt protection to prevent the surface from fixing or attaching or sticking a dirty component, an infection, a deleting of offensive odor (i.e. bad smell), a purification of gas (e.g. air) or liquid (e.g. water), a processing of exhausting gas, a processing of waste liquid, a generation of Hydrogen and/or Oxygen from water, a speeding up of chemical reaction and a dissolving of contaminants to cause social pollution.

All the applications as mentioned above utilize the photocatalyst reaction or photocatalyst function by a strong oxidation and/or reduction power to show when the photocatalyst is activated by the light with relatively short wavelength. For example, as for the purification of the air or water, when the photocatalyst is irradiated by the light rays having comparatively short wavelength (e.g. ultraviolet light, purple or blue visible light), Oxygen ($O_2$) existing in the air or dissolving in the water is activated by the photocatalyzing reaction so that Ozone ($O_3$) and/or activated Oxygen (O) generate.

The Ozone or the activated Oxygen decomposes contaminants or microorganism including in the air or water, such as mold (i.e. fungi), bacteria or organic chlorine compound by an oxidization reaction. Therefore, the air or water is sterilized (i.e. disinfected, removed from microorganisms,) purified (i.e. sanitized), deodorized or discolored.

Furthermore, when the photocatalyst is irradiated by the light rays with short wavelength, it accelerates to decompose (i.e. resolve) the water $H_2O$ to activated oxygen (O) and/or hydrogen ($H_2$).

Moreover, the photocatalyst as a circumstance cleaning material contributes to decomposition of pollutants, which give a bad influence to a social circumstance.

The pollutants are for example a volatile organic solvent, a chemical agent for agriculture such as grass eliminating agent (i.e. insecticide), an organic phosphate and a deleterious inorganic chemical compound such as cyanide and a kind of chrome.

In case that multiple photocatalyst particles (i.e. photocatalyst particulates) are used directly for reaction of oxidation and/or reduction with any substance, it is so difficult that the photocatalyst particles are separated and collected and a device to utilize the photocatalyst particles becomes complicated and large.

While, in the case that multiple photocatalyst particles are used as a form of photocatalyst supported substrate in which a layer or film including the photocatalyst particles is fixed and supported on the substrate, a recycling or reuse of the photocatalyst particles can be easily carried out, because the separation and collection of the photocatalyst particles are not required.

As for the latter case using the photocatalyst supported substrate, it is disclosed, in the publication of Japanese patent application Laying-open No. H05-155726 published on Jun. 22, 1993, (Japanese Patent No. 2883761 issued on Apr. 9, 1999), that a Titanium Dioxide layer (i.e. film) is formed on a substrate made of a heat resistance material such as metal, ceramic or glass in such a manner that Titania sol. is first coated on a surface of the substrate and then the Titania sol. is fired (i.e. baked) to produce the Titanium Dioxide layer on the surface. Thereby, the surface of the substrate is prevented from growth (i.e. proliferation) of bacteria.

SUMMARY OF THE INVENTION

It is an object of the present invention to propose an enhanced photocatalyst apparatus utilizing photocatalytic optical fibers.

It is another object of the present invention to propose an enhanced photocatalyst reactor utilizing the photocatalyst apparatus utilizing photocatalytic optical fibers.

It is a still another object of the present invention to propose a method for manufacturing or fabricating the photocatalyst apparatus utilizing photocatalytic optical fibers.

The entire disclosure of my U.S. patent applications: Ser. No. 09/644,418 filed on Aug. 21, 2000 (U.S. Pat. No. 6,501,893) and Ser. No. 09/146,915 filed on Sep. 2, 1998 (U.S. Pat. No. 6,108,476) are hereby incorporated herein by reference.

Further, the entire disclosure of my Japanese Patent application No.2002-143727 filed May 17, 2002 (Japanese Patent application Laid-open No. 2003-334422 published on Nov. 25, 2003), which is the prior foreign application of the present U.S. Patent application and Japanese Patent application No.H08-80434 filed on Feb. 27, 1996 (Japanese Patent application Laid-open No. 09-225295 published on Sep. 2, 1997), which is the prior foreign application of the U.S. patent applications, Ser. No. 09/644,418 (U.S. Pat. No. 6,501,893) and Ser. No. 09/146,915 (U.S. Pat. No. 6,108,476) are also hereby incorporated herein by reference.

In an aspect of the present invention, a photocatalyst apparatus comprises: a plurality of photocatalytic optical fibers, each photocatalytic optical fiber having a core and a photocatalytic clad including a photocatalyst; and a substrate having at least one surface, wherein the photocatalytic optical fibers are disposed on the substrate to project from the surface.

The photocatalytic optical fibers may project in a substantially perpendicular direction and/or project substantially parallel to one another.

The core may comprise a solid core composed of a substantially transparent material or a hollow core composed of a substantially transparent tubular member having a hollow space therethrough.

The substrate may comprise a substantially rectangular panel composed of a solid body or a substantially rectangular panel composed of a hollow structure having a pair of substantially rectangular plates and a substantially rectangular hollow space therebetween. The substrate may comprise a solid or hollow light guide. The substrate may comprise a column-like solid body or a column-like hollow structure having a substantially transparent tubular member and a space therethrough. The substrate further may comprise at least one opening to pass through a thickness thereof. The substrate further comprise at least one opening to pass through a thickness thereof, wherein the opening may be composed of a dot and/or linear shape. The substrate may be composed of a substantially, uniform thickness. The substrate may be composed of a substantially variable thickness having e.g. such as a taper-like shape. The substrate may be an existing article, installation or facility and the photocatalytic optical fibers are attached to/on the at least one surface by an electrostatic process at a site where the existing article, installation or facility is located. The substrate may comprise a filter device composed of a filter medium having a thickness and a plurality of through holes to pass therethrough. The substrate may comprise a filter device composed of a filter medium having a thickness and a plurality of through holes to pass therethrough, wherein the filter medium contains an adsorbent and/or a photocatalyst therein/thereon.

The photocatalyst apparatus may further comprise an adhesive for adhering the photocatalytic optical fibers to/on the at least one surface, the adhesive being disposed entirely or partially on the at least one surface to form at least one adhesive film. The adhesive may be composed of a thermosetting, photo-setting or thermoplastic resin and a combination thereof. The adhesive may be disposed entirely or partially on the at least one surface to form at least one adhesive film and a photocatalyst disposed entirely or partially on/in the at least one adhesive film.

The photocatalytic optical fibers may be attached to/on the at least one surface preferably by an electrostatic process.

Each of the photocatalytic optical fibers further may comprise a light collector disposed on a free end thereof. The light collector may be composed of a condenser lens having a substantially spherical or funnel-like body.

Each of the photocatalytic optical fibers further may comprise a photocatalyst disposed on a free end of the core as well as the photocatalytic clad disposed on a surface of the core.

The photocatalyst apparatus may further comprise at least one substantially transparent electric conductor film disposed on the at least one surface.

The photocatalyst apparatus may further comprise a light reflector film disposed selectively on a first area/areas of the at least one surface, except a second area/areas where the photocatalytic optical fibers are attached to/on the at least one surface.

In another aspect of the present invention, a photocatalyst apparatus comprises: a plurality of photocatalytic optical fibers, each photocatalytic optical fiber having a core and a photocatalytic clad including a photocatalyst; and a substrate having at least one surface, wherein the photocatalytic optical fibers are disposed on the substrate to project from the at least one surface, and light-redirecting or light-diffusing means for redirecting or diffusing light transmitted in the substrate.

The light-redirecting means may comprise a plurality of projections, grooves or prisms disposed in/on the at least one surface. The light-redirecting means may comprise a light-redirecting film including a plurality of light diffusing particles disposed in/on the at least one surface. The light-redirecting means may comprise a plurality of light diffusing particles disposed in an interior of the substrate. The light-redirecting means form a gradation pattern so as to produce a substantially uniform brightness of light to irradiate uniformly most of the photocatalytic optical fibers. The light-redirecting means may form a gradation pattern so as to produce a substantially uniform brightness of light to irradiate uniformly most of the photocatalytic optical fibers and wherein the gradation pattern is selected from the gradation patterns with variable distribution density consisting of grooves on the at least one surface, projections on the at least one surface, prisms on the at least one surface, light-redirecting film on the at least one surface and light-diffusing particles in an interior of the substrate. The light-redirecting means may form a gradation pattern so as to produce a substantially uniform brightness of light to irradiate uniformly most of the photocatalytic optical fibers and wherein the gradation pattern may be selected from the gradation patterns with variable quantity, width or height consisting of grooves on the at least one surface, projections on the at least one surface, prisms on the at least one surface, light-redirecting film on the at least one surface and light-diffusing particles in an interior of the substrate.

In a still another aspect of the present invention, a photocatalyst reactor comprises: a photocatalyst apparatus comprising (1) a plurality of photocatalytic optical fibers, each photocatalytic optical fiber having a core and a photocatalytic clad including a photocatalyst and (2) a substrate having at least one surface, wherein the photocatalytic optical fibers are disposed on the substrate to project from the surface; and a light source in communication with the photocatalytic optical fibers. The photocatalytic optical fibers may receive light from the light source or ambient light passed through the substrate or wherein the photocatalytic optical fibers receive the light or the ambient light directly without passing through the substrate.

The photocatalyst reactor may further comprise at least one light delivering optical fiber without a photocatalyst for delivering light from the light source toward the substrate and/or the photocatalytic optical fibers.

The substrate may further comprise a substantially transparent material to act as a light guide having at least one side or end and/or at least one peripheral portion of the at least one surface to introduce light from the light source into the substrate therefrom, wherein the photocatalytic optical fibers receive light leaked or output from the at least one surface of the surface.

The photocatalyst reactor may further comprise: the substrate composed of a substantially transparent material to act as a light guide having at least one side or end and/or at least one peripheral portion of the at least one surface; at least one prism disposed on or adjacent to at least one portion of at least one surface or disposed on or adjacent to the at least one side or end and/or the at least one peripheral portion of the at least one surface to receive light from the light source; and wherein light is introduced into the substrate through the at least one prism and the photocatalytic optical fibers receive light leaked or output from the at least one surface of the surface.

The photocatalyst reactor may further comprise an automatic light control device having a brightness control device and a photo-sensor, wherein the brightness control device controls a brightness of the light source in response to an ambient light detected by the photo-sensor.

The photocatalyst reactor may further comprise: a substantially transparent adhesive film to act as a light guide having at least one surface and/or or at least one side or end, wherein the adhesive film is disposed on the substrate to attach the photocatalytic optical fibers thereto/thereon and wherein the light source is disposed at least one position relative to the at least one surface and/or or the at least one side or end to receive light from the light source and to introduce light into the adhesive film.

Each of the photocatalytic optical fibers may receive light from the light source at a fixed end thereof and/or at a free end thereof and/or receive light directly at the photocatalytic clad.

The photocatalyst reactor may further comprise: a light-diffusing or leaky light-guide means having a solid or hollow light guide, wherein the light source disposed at least one position relative to the light-diffusing or leaky light-guide means and the photocatalyst apparatus receives light via the light-diffusing or leaky light-guide means to irradiate the photocatalytic optical fibers. The photocatalyst reactor may further comprising: a light-diffusing or leaky light-guide means composed of a substantially rectangular panel having a solid body or composed of a substantially rectangular panel having a hollow structure with a pair of substantially rectangular plates and a substantially rectangular hollow space therebetween, wherein the light source disposed at least one position relative to the light-diffusing or leaky light-guide means and the photocatalyst apparatus receives light via the light-diffusing or leaky light-guide means to irradiate the photocatalytic optical fibers.

The photocatalyst reactor may further comprise: a housing to enclose the one or more photocatalyst apparatus having a space to enclose the photocatalyst apparatus, an inlet to introduce a fluid thereto and an outlet to discharge the fluid therefrom. The photocatalyst reactor may further comprise: a housing to enclose the one or more photocatalyst apparatus having a space to enclose the photocatalyst apparatus, an inlet to introduce a fluid thereto and an outlet to discharge the fluid therefrom, wherein the photocatalyst apparatus is disposed at one or more position where fluid flows across a length of the photocatalytic optical fibers, or wherein the photocatalyst apparatus is disposed at one or more position where fluid flows along a length of the photocatalytic optical fibers.

In further aspect of the present invention, a method for manufacturing a photocatalyst apparatus comprises the steps of: a first step of preparing (a) a plurality of optical fibers, each optical fiber having a core and (b) a substrate having at least one surface; and a second step of attaching the optical fibers to/on the at least one surface by an electrostatic process, wherein the optical fibers are projected from the at least one surface, wherein a photocatalytic clad is disposed on the core to form a photocatalytic optical fiber before the first step or after the second step. In the method, an adhesive may be disposed entirely or partially on the at least one surface after the first step so as to adhere the photocatalytic optical fibers thereto/thereon. In the method, an adhesive may be disposed entirely or partially on the at least one surface after the first step so as to adhere the photocatalytic optical fibers thereto/thereon and the adhesive is made of thermosetting, photo-setting or thermoplastic resin or plastic.

BRIEF DESCRIPTION OF THE DRAWINGS

For a more complete understanding of the present invention and the advantage thereof, reference is now made to the following descriptions taken in conjunction with the accompanying drawings, in which.

DESCRIPTION OF THE PREFERRED EMBODIMENTS

Figure 1:
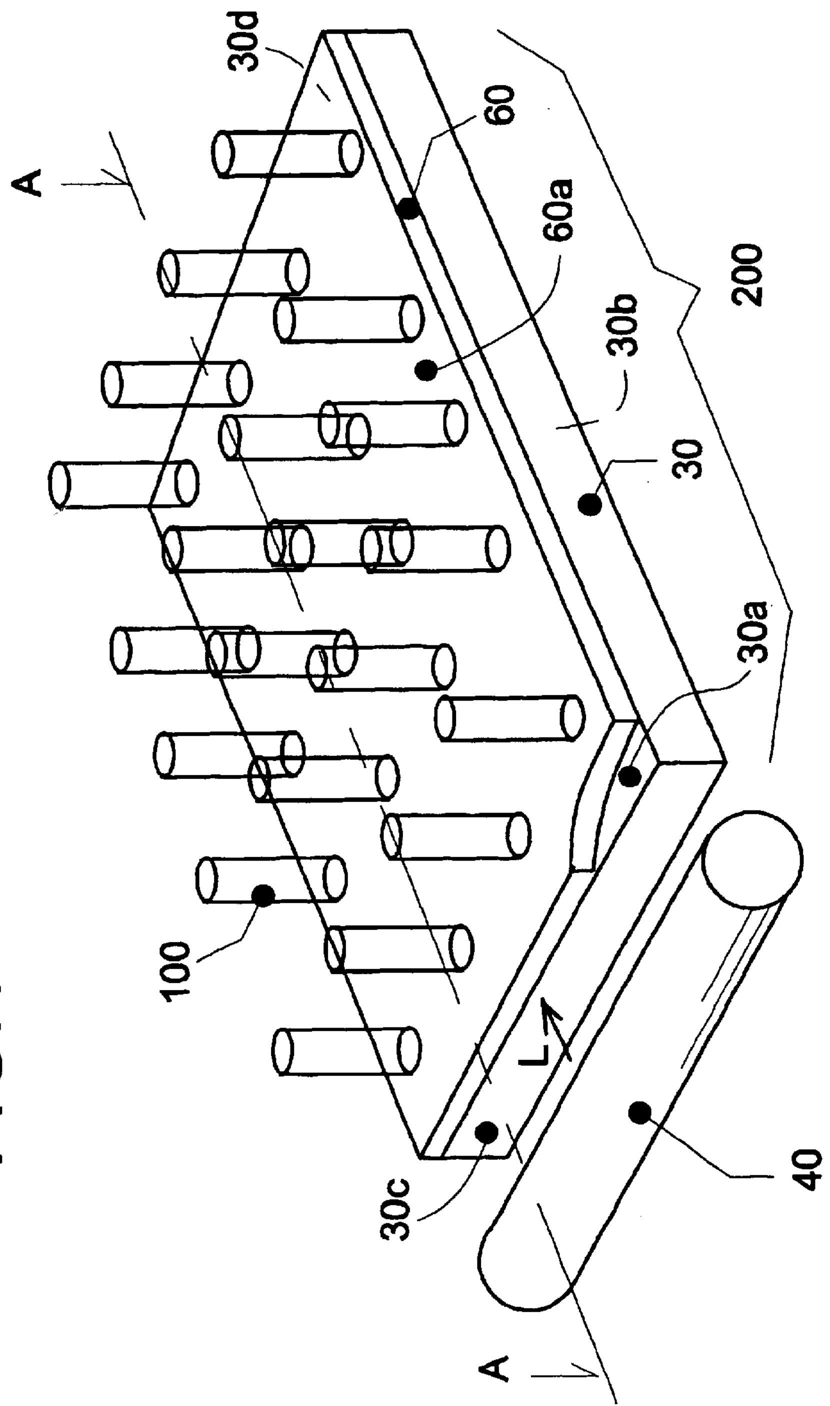
FIG. 1 is a conceptual and schematic perspective view of a preferred embodiment of the present invention showing a photocatalyst apparatus 200.

In the drawings, elements (parts or portions) are not necessarily shown to scale and like or similar elements are designated by the same reference numeral or character through the several views or figures.

The present invention will now be described in detail with reference to the accompanying drawings FIG. 1 through FIG. 47.

Figure 2:
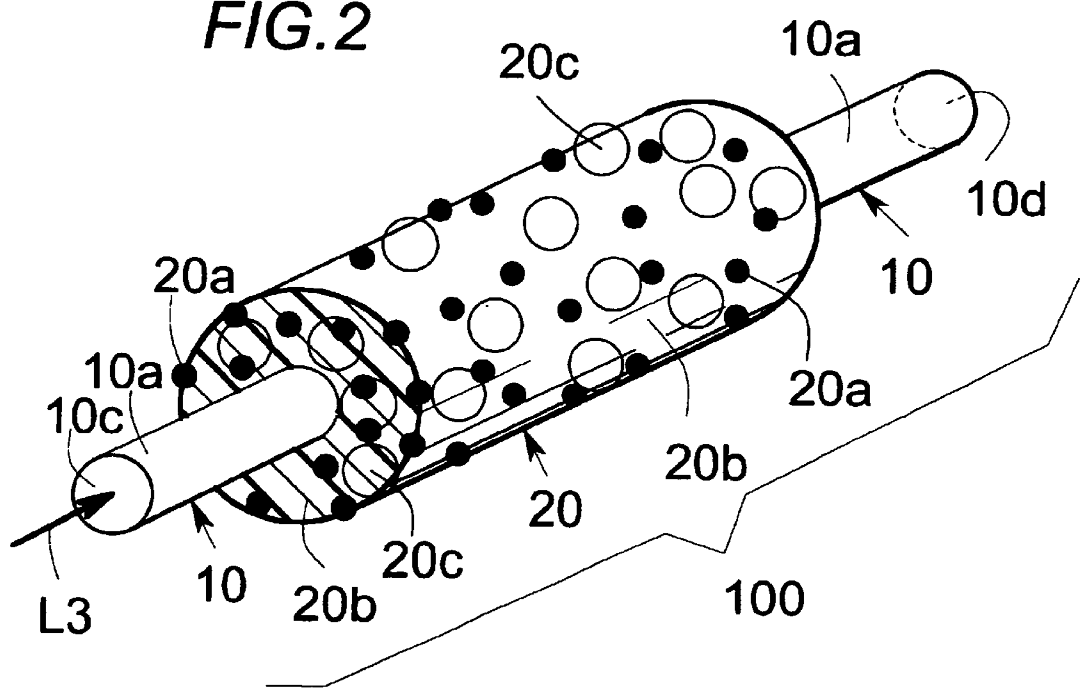
FIG. 2 is a conceptual and schematic perspective view showing a photocatalytic optical fiber 100.
Figure 3:
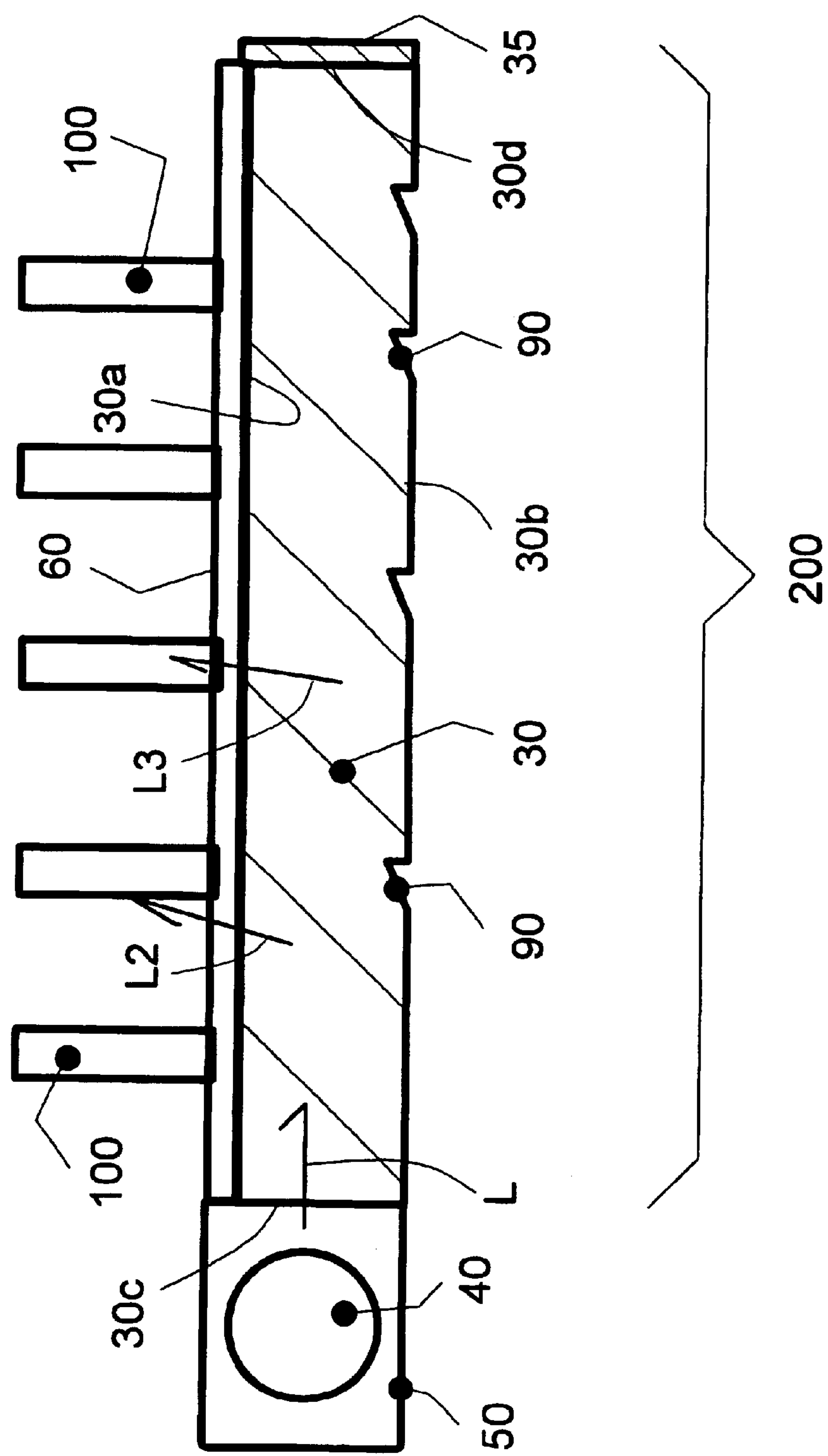
FIG. 3 is a cross sectional view of the photocatalyst apparatus 200 of FIG.1 taken along the line A—A.

Reference is made to FIG. 1 through FIG. 3 showing a first preferred embodiment of the present invention.

A photocatalyst apparatus 200 is briefly composed of a plurality of photocatalytic optical fibers 100 and a "substrate" 30 having a first surface 30*a* and a second end 30*b* for fixing (or disposing, fixing or attaching) the photocatalytic optical fibers 100 to or on the first surface 30*a* at a first end 10*c* (See FIG. 2), wherein the photocatalytic optical fibers 100 project (i.e. elongate, extend out, protrude) from the first surface 30*a*.

The above term "substrate" means "base, support, supporter or carrier" as well as the substrate throughout the specification and claims of the present invention.

In FIG. 2, each of the photocatalytic optical fibers 100 is briefly composed of a core 10, a photocatalytic clad 20 including a photocatalyst 20*a*, the first end 10*c* and a second end 10*d*.

The photocatalytic optical fibers 100 may preferably project (or extend, protrude) in a substantially perpendicular direction and/or substantially parallel to one another, as is shown in FIG. 1 and FIG. 3.

An adhesive 60 (i.e. an adhesive layer or film) is preferably disposed on the first surface 30*a* so as to attach the photocatalytic optical fibers 100 to the first surface 30*a*.

The adhesive 60 may be made of thermosetting resin (i.e. plastics) or photo-setting resin which is initially soft, but change irreversibly to a hard-rigid form by applying a curing condition such as heating or irradiation of light e.g. UV (ultraviolet) rays. Instead, the adhesive 60 may made of a thermoplastic resin which can repeatedly softened by heating and hardened again by cooling.

The photocatalytic optical fibers are preferably fixed or attached to the surface 30*a* by an electrostatic flocking process.

A substantially transparent material is used for the substrate 30 in this embodiment. However, a substantially non-transparent (i.e. opaque) material is used for the substrate in the other embodiments as described hereinafter. The term "transparent" means "clear, lucent, light-transmissible, light-permeable or translucent" throughout the specification and the claims.

At least one light source 40 is disposed in communication with the photocatalytic optical fibers 200.

Referring to FIG. 2, a single photocatalytic optical fiber 100 will be explained in detail. The single photocatalytic optical fiber 100 is composed of a core 10 (i.e. solid core), a surface 10*a* of the core 10, a first end (i.e. light-input end) 10*c*, a second end (i.e. light-output end) 10*d* and a photocatalytic clad (i.e. cladding, sheath, cover, covering) 20. The photocatalytic clad 20 is disposed partially or entirely on the surface 10*a* of the core 10.

In other words: the core 10 is an optical fiber core or a core-like light transmissible body (or substantially transparent member, solid light guiding member, solid wave-guide); the light-input end 10*c* is a proximate end or a proximate face; the light-output end 10*d* is a distal end or a distal face; the photocatalytic clad 20 is a photocatalytic sheath, a photocatalytic layer or a photocatalytic film.

The core 10 is made of transparent solid material capable of transmitting light rays such as UV (ultraviolet) light. The photocatalytic clad 20 includes a photocatalyst material and may be composed of a plurality of photocatalyst elements (or particles) 20*a* and a binder 20*b* capable of transmitting the light rays.

The photocatalyst particles 20*a* may be dispersed in the binder 20*b*. In other words, the photocatalyst particles mean photocatalyst elements, photocatalyst powders or photocatalyst pieces.

The core 10 further may be preferably made of transparent inorganic or organic material capable of transmitting relatively short-wavelength light rays including the UV light or visible light such as purple or blue light.

The transparent inorganic material suitable for use in the core 10 are typically made of Fused Quartz (including more than 99.9 weight % of $SiO_2$), Sapphire, Borosilicate glass (composing of $SiO_2$; 75.3, $B_2O_3$; 13.8; ZnO; 1.4, $Al_2O_3$; 4.3, NaO; 5.0 weight %). The transparent organic (i.e. polymer) material suitable for use in the core 10 are typically made of Silicone resin (Dimethyl Silicone, etc.), Acrylic resin (Polymethyl Methacrylate, etc.), Polycarbonate resin (PC) and UV transmissible Fluoric resin (Polyfluoroethylene), Polyethylene resin, Polyester resin, or epoxy resin.

The photocatalyst elements (particles) 20*a* may be made of photo-activated semiconductors such as Titanium Dioxide; $TiO_2$ (photo-activation wavelength; not more than 388 nm), Tungsten Dioxide; $WO_2$ (photo-activation wavelength; not more than 388 nm), Zinc Oxide; ZnO (photo-activation wavelength; not more than 388 nm), Zinc Sulfide; ZnS (photo-activation wavelength; not more than 344 nm) and Tin Dioxide; $SnO_2$ (photo-activation wavelength; not more than 326 nm).

The binder (i.e. paint) 20*b* capable of transmitting the UV light rays "L" may be made of transparent organic material such as Silicone resin, Acrylic resin, Polycarbonate resin and UV transmissible Fluoric resin, etc.

The binder 22 is made of inorganic material capable of transmitting the UV light rays "L" such as transparent glass frit, instead.

Alternatively, the photocatalytic clad 20 may be made from Titania sol, which is preliminarily coated on the core 10 and treated by high temperature of about 500 deg. C., then the Titania sol changes to Titanium Dioxide.

A first transparent material used for the core 10 and a second transparent material used for the photocatalytic clad 20 are so selected that a refractive index of the core 10 is higher than that of the photocatalytic clad 20, similar to a conventional optical fiber excluding a photocatalyst.

However, a refractive index of the core 10 may be equal to that of the photocatalytic clad 20 or a refractive index of the photocatalytic clad 20 may be higher to than that of the core 10, in which both cases differ from the conventional optical fiber excluding a photocatalyst.

The UV light rays "L" emitting from a UV light source is projected to the light-input end 10*c* of the photocatalytic optical fiber 100. The UV light rays "L" are transmitted to another terminal i.e. a distal end 10*d* of the photocatalytic optical fiber 100 according to an optical principle of "internal total reflection".

The UV light rays "L" reflect repeatedly along a length of the core 10 and simultaneously the UV light rays "L" are leaked out from the core 10 to the photocatalytic clad 20 to activate the photocatalyst elements (or particles) 21, which are dispersed in the photocatalytic clad 20.

The photocatalytic clad 20 may preferably include an adsorbent or absorbent (i.e. adsorption or absorption material) capable of adsorbing or absorbing contaminants (i.e. pollutants) included in fluid (i.e. gaseous or liquid material) in addition to the photocatalyst material.

The adsorbent or absorbent may be composed of a simple substance or composite such as active carbon, zeolite, porous ceramics or silica gel.

The adsorbent may be formed as elements (or particles). A mixture of the photocatalyst elements (or particles) 20*a* and the adsorbent elements (or particles) 20*c* may be disposed (or dispersed) in/on the photocatalytic clad 20 (i.e. the binder layer including photocatalyst).

Alternatively, the photocatalyst elements (or particles) 20*a* may be preferably carried on each of adsorbent particle (or element) having larger size than each photocatalyst particle.

A plurality of the adsorbent elements (or particles) 20*c*, each of photocatalytic optical fibers adsorbent particle 20*c* carrying the photocatalyst elements (or particles) 20*a* may be disposed (or dispersed) in/on the photocatalytic clad 20 (binder layer including photocatalyst).

In the photocatalytic clad 20 including a composite of the photocatalyst and adsorbent as mentioned above, the adsorbent is always absorbing the pollutant until a capacity of absorbing is saturated and the photocatalyst is activated by irradiation of light rays "L".

The photocatalyst oxidizes and/or reduces the pollutant being contacted directly with the photocatalyst at the time of light-irradiation. At the same time, the pollutant absorbs the pollutant being storing in the adsorbent.

Therefore, it should be noted that since the adsorbent is used with the photocatalyst, a large amount of the pollutant can be treated to be oxidized and/or reduced by photocatalyzing of the photocatalyst.

As is shown in FIG. 1 and FIG. 3, the photocatalyst apparatus 200 is composed of a substrate member 30 and a plurality of photocatalytic optical fibers 100, in which the plurality of photocatalytic optical fibers 100 is disposed on the substrate member 30. The photocatalytic optical fibers may be implanted partially or entirely on the substrate member 30.

The substrate member 30 may be made of substantially transparent material capable of transmitting light including relatively short wavelength light rays such as ultraviolet (UV) light rays. For example, the substrate member 30 may be formed as a transparent panel (i.e. plate) having a substantially rectangular-shaped body.

The rectangular-shaped body 30 has a first surface 30*a* (a front surface), a second surface 30*b* (a rear surface) opposed to the first surface 30*a*, a first side face (i.e. side, edge, end, end face, end surface or facet) 30*c*, a second side face 30*d* opposed to the first side face 30*c*. The above term "side face" means "side, edge, end, end face, end surface, flank or facet throughout the specification.

The transparent substrate member 30 may be made of organic transparent material (typically, acrylic resin or polycarbonate resin) or inorganic transparent material (typically, fused-quarts or glass), which is the same as transparent material used for the core 10 and/or the photocatalytic clad of the optical fiber 100 as described above.

As is shown in FIG. 3, for more detail, an adhesive member 60 (i.e. an adhesive layer or film) may be disposed on the front surface 30*a* of the substrate member 30.

The adhesive layer 60 is preferably made of substantially transparent resin (i.e. polymer) material such as Silicone resin, Acrylic resin, Polycarbonate resin and Fluoric resin, Polyethylene resin, Polyester resin or epoxy resin, which is equivalent to the transparent material of the photocatalytic clad 20.

When the adhesive member (adhesive layer) 60 is made of curable resin i.e. thermo-setting or light-setting resin or plastic, an implantation of photocatalytic optical fibers to the substrate member 30 may preferably be processed by an electrostatic process (i.e. method, means) or an electrostatic flocking process.

The electrostatic process is generally classified into a "DOWN method", an "UP method" and a combination thereof, wherein the fibers (i.e. flocks, piles) are moved or transferred downwardly in the DOWN method while the fibers (i.e. flocks, piles) are moved or transferred upwardly in the UP method, further, there are two types of an applied voltage used in the electrostatic process, namely a direct current (DC) and an alternating current (AC).

An adhesive layer is formed on a substrate by coating an adhesive material. Multiple flock fibers are contained in a hopper having the mesh screen at a bottom of the hopper and a vibrator.

A high voltage, DC or AC in the range of 30,000 volts to 120,000 volts is applied between an electrically conductive mesh screen (a charging electrode) and the adhesive layer. An electric charge is given to the individual fibers from the charging electrode. The flock fibers are transferred onto the adhesive layer on the substrate, so that the flock fibers are oriented vertically and embedded or implanted on/in the adhesive layer. Alternatively, a separate charging electrode with openings may be used instead.

As is shown in FIG. 3 again, liquid resin is mixed with curing agent (i.e. hardener) in advance. The liquid resin in an uncured state is preliminarily coated on the front surface 30*a* of the panel 30 by a conventional coating method. The conventional coating method may be a printing, spraying, immersing or transferring method.

A high voltage of DC or AC is applied between the substrate member 30 (or the adhesive layer 60) and the plurality of photocatalytic optical fibers so that the photocatalytic optical fibers are transferred (i.e. removed or propelled) toward the adhesive layer 60 by electrostatic field attraction. Accordingly, the plurality of photocatalytic optical fibers is implanted temporarily on or in the adhesive layer 60 under the uncured state.

Then, the uncured resin is cured by applying a cured condition of the uncured resin, in which curing is carried out by heating in a high temperature more than a room temperature or by irradiation of light rays such as UV light, until the adhesive layer 60 is hardened. Thereby, the photocatalytic optical fibers are fixed permanently on the adhesive layer 60.

Instead of the curable resin (i.e. thermo-setting resin), thermo-plastic resin (i.e. hot-melt resin) may be used for the adhesive member 60. The thermo-plastic resin is preliminarily coated on the front surface 30*a* of the panel 30.

The thermoplastic resin coating (adhesive layer) 60 is heated in a sufficient temperature more than a room temperature during application of the high voltage or after an implantation is accomplished so that the adhesive layer 60 is melt. Then, the coating 60 is cooled less than the room temperature until the coating is hardened to fix the photocatalytic optical fibers on the adhesive layer 60.

A third transparent material used for the transparent panel 30 and a fourth transparent material used for the adhesive layer 60 in cured or hardened state are so selected that a refractive index of the transparent panel 30 is higher than that of the adhesive layer 60. However, the transparent panel 39 may be equal to or lower than the adhesive layer 60 in the refractive index.

The transparent panel 30 may be provided with a light redirecting (i.e. light-diffusing, light-scattering) means 90 disposed on the rear surface 30*b* as is shown in FIG. 3 (and/or the front surface 30*a*). The light redirecting means 90 may be composed of a plurality of micro-projections, micro-grooves or micro-prisms positioned on the rear surface 30*b* (and/or the front surface 30*a*). The light redirecting means 90 are acting as a light-diffuser in which light redirects, diffuses, refracts or reflects toward the adhesive layer 60 so as to irradiate the optical fibers 100.

Further, the light redirecting means 90 have preferably a gradation pattern, in which a pitch of the micro-projections, micro-grooves or micro-prisms is gradually changed from the first side face 30*c* to the second side face 30*d*.

When only the single light source 40 is positioned adjacent to the first side face 30*c*, a pitch for positioning the micro-projections, micro-grooves or micro-prisms on the rear surface 30*b* may be increased gradually from the first side face 30*c* to the second side face 30*d* so as to produce a uniform or even surface brightness for irradiating (or lighting) uniformly (or evenly) most of the optical fibers 100 as is shown in FIG. 3.

When the photocatalytic optical fibers 100 of the photocatalyst apparatus 200 are photo-catalyzed by light irradiation, the photocatalyst material included in the photocatalytic optical fibers are activated in order to oxidize and/or reduce a substance/substances being contacted, closed to, or stuck on the photocatalytic optical fibers so that the substance/substances are subjected to be cleaned-up or processed to react for clarification.

At the same time, the photocatalyst apparatus 200 is cleaned-up so as to have a self-cleaning characteristic; thereby maintenance work for clarifying the photocatalyst apparatus 200 is reduced.

Referring again to FIG. 2 and FIG. 3, the light rays L input to the adhesive layer 60 further transmit toward the photocatalytic optical fibers and outside.

The light rays "L" directing to the photocatalytic optical fibers are received at the light-input end (or the first end) 10*c* of the photocatalytic optical fibers 100 and transmit inside of a length of the core 10 of the photocatalytic optical fibers toward the second end.

Some volume of the light rays "L" leak i.e. output to the photocatalytic clad 20 including the photocatalytic elements 20*a*.

Therefore, the photocatalytic clad 20 is photo-catalyzed by irradiated of the light rays "L". Further, some volume of the light rays "L" directing to outside via the transparent adhesive layer 60 transmit toward the photocatalytic optical fibers for irradiating the photocatalytic optical fibers from an exposed surface of the photocatalytic optical fibers.

Therefore, the photocatalytic optical fibers can receive the light rays "L" from an interior of the photocatalytic optical fibers 100 and, at the same time, the light rays "L" from an exterior of the photocatalytic optical fibers. It is noted that the photocatalytic clads of the photocatalytic optical fibers 100 can be irradiated by the light from the inside via the cores and also the direct light from the outside.

Furthermore the adhesive layer 60 may further include photocatalytic material, for example, the photocatalytic material may be formed as elements (or particles) and the elements (or particles) may be formed on a surface of the adhesive layer 60 or may be dispersed in the adhesive layer 60 instead It should be noted that an optimum use of the light rays from the light source is accomplished efficiently without loss of light by utilizing the transparent substrate member (i.e. light-guidable member) applying an edge-lighting effect and the plurality of photocatalytic optical fibers disposed on/in the transparent substrate member and that most light rays from the light source can contribute irradiation of the photocatalytic optical fibers in the first aspect of the present invention.

Figure 4:
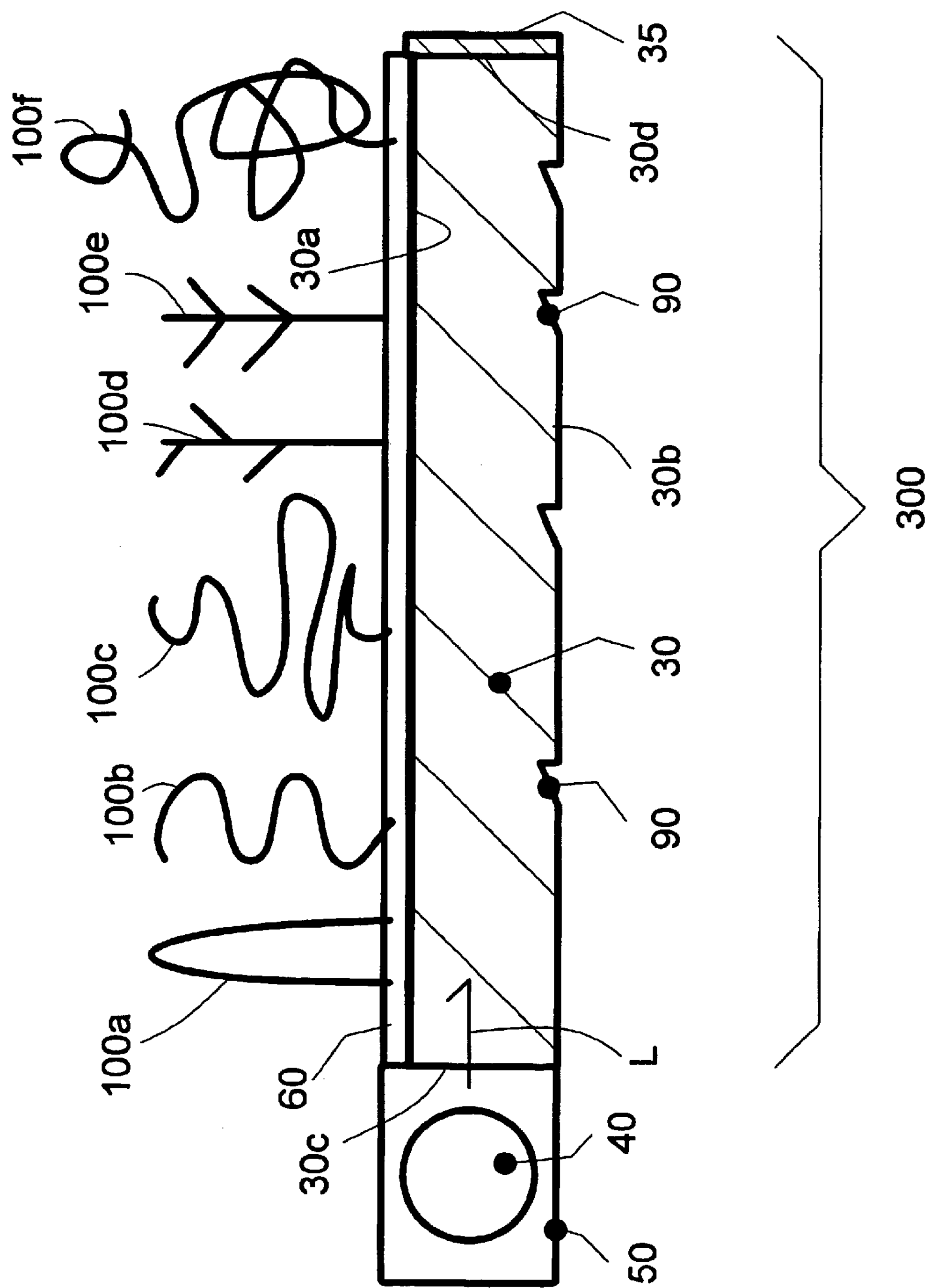
FIG. 4 is a cross sectional view of another preferred embodiment of the present invention, showing a photocatalyst apparatus 300 having photocatalytic optical fibers **100*a* to 100*f*** with different shapes.

Referring to FIG. 4, a photocatalyst apparatus 300 is briefly composed of some kinds of photocatalytic optical fibers 100*a* to 100*f* having different patterns or shapes and a substrate 30 to support the photocatalytic optical fibers 100*a* to 100*f*.

The photocatalytic optical fiber 100*a* is formed as a U-shape, in which the optical fiber 100*a* has a length of core being bent to form the U-shape, a first end and a second end. The first end and the second end are implanted on the surface of the transparent panel 30 so as to receive or accept the light "L" output via the panel 30. In this case, a total quantity of the optical fibers 100*a* can be reduced.

The photocatalytic optical fibers 100*b* and 100*c* have a coil-shape, respectively, in which the optical fiber 100*b* or 100*c* has a length of core being bent to form the coil-shape, a first end and a second end. The first end or the second end is implanted on a surface of the transparent panel 30 so as to receive light output via the panel 30. In this case, the light may be leaked from bent portions of the optical fiber 100*b* and 100*c* to a photocatalytic clad on the core by a bending loss of the optical fiber.

The optical fiber 100*b* or 100*c* is composed of a plurality of substantially circular portions, in which the optical fiber 100*b* has a substantially uniform or even diameter, while the optical fiber 100*c* has a substantially different diameter.

The optical fiber 100*d* or 100*e* is composed of a trunk optical fiber and a plurality of branched optical fibers, both optical fibers have the photocatalyst and the adsorbent, respectively.

At least dual branched optical fibers in the photocatalytic optical fiber 100*e* are elongated upwardly from the same portion of the trunk optical fiber, while at least dual branched optical fibers in the photocatalytic optical fiber 100*d* are elongated upwardly from different portions of the trunk optical fiber.

The photocatalytic optical fiber 100*f* has a random-shape, in which the optical fiber 100*f* has a length of core being extended out in a random fashion to form the random-shape, a first end and a second end. The first end or the second end is implanted on the surface.

The substrate 30 (i.e. panel-like substrate) as is shown in FIG. 1, FIG. 3 and FIG. 4 is formed as a substantially uniform or even thickness from the first side 30*c* for receiving light L to the second side 30*d* opposed to the first side 30*c*. However, the substrate is not limited to the substrate with substantially uniform or even thickness.

Figure 5:
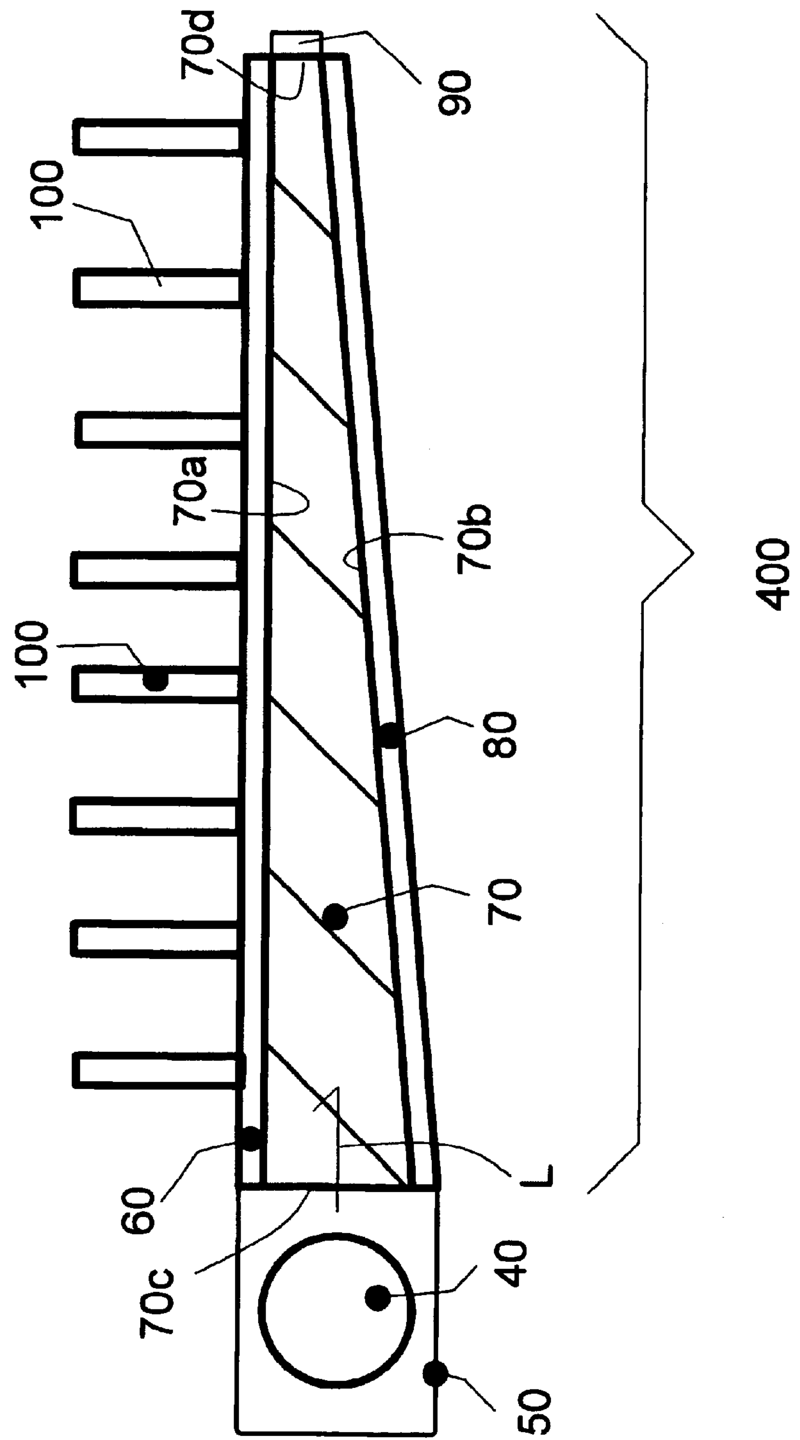
FIG. 5 is a cross sectional view of still another preferred embodiment of the present invention, showing a photocatalyst apparatus 400 having a taper like substrate.

Referring to FIG. 5, the other embodiment using a substrate 70 having a substantially variable thickness is illustrated. A photocatalyst apparatus 400 is composed of a transparent taper like substrate member 70 having a first surface 70*a* and a second surface 70*b* opposed to the first surface 70*a*, the plurality of photocatalytic optical fibers 100 disposed on the first surface 70*a*, a first side (i.e. side face or edge) 70*c* and a second side 70*d*. A thickness of the substrate member 70 changes (or decreases) continuously (or step-wise) from the first side 70*c* for receiving light "L" to the second side 70*d* opposed to the first side 70*c*.

The photocatalyst apparatus 400 is preferably further composed of an adhesive (i.e. an adhesive film or layer)

disposed on the first surface 70*a* so as to adhere the photocatalytic optical fibers 100 to the first surface 70*a* at every first end of the fibers 100.

After light "L" emitting from at least one light source 40 disposed at a vicinity of the first side 70 is received at the first side 70 in order to introduce light into an interior of the transparent taper like substrate 70, the light "L" is transmitted so as to reflect repeatedly according to the principle of "total internal reflection" (TIR) between the first and the second surfaces 70*c* and 70*d* from the first side 70*c* toward the second side 70*d*.

Since the transparent substrate 70 is formed as a taper like shape having the second surface 70*b* which is inclined, some volume of the light "L" is gradually leaked (i.e. output) from the first surface 70*a* by refraction in stead of the reflection of "TIR" on the way to advancing toward the second side 70*d*. Thereby, the light "L" can be received at every first end 10*c* of the photocatalytic optical fiber 100 so that the light "L" is introduced into the core 10 and the photocatalytic clad 20 is irradiated by the light leaked from the core 10 on the way to advancing toward the second end 10*d* (See FIG. 2).

The photocatalyst apparatus 400 is preferably further composed of a reflecting means 80 such as a reflector film (or layer, plate) disposed on the second surface 70*b* and another reflecting means 90 such as a reflector film or layer disposed on the second side 90. The reflecting means 80 prevent the light "L" from leaking outside the second surface 70*b* by reflecting the light upwardly. The reflecting means 90 prevent the light "L" from leaking outside the second side 70*b* by redirecting the light.

In the embodiments as is shown in FIG. 1 and FIG. 3 to FIG. 5 according to the present invention, the at least one light source 40 is positioned at a vicinity of (i.e. near, adjacent to) only the first side 30*c*, 70*c*, however, an additional at least one light source may be provided to position at a vicinity of the second side 30*d*, 70*d*.

Figure 6:
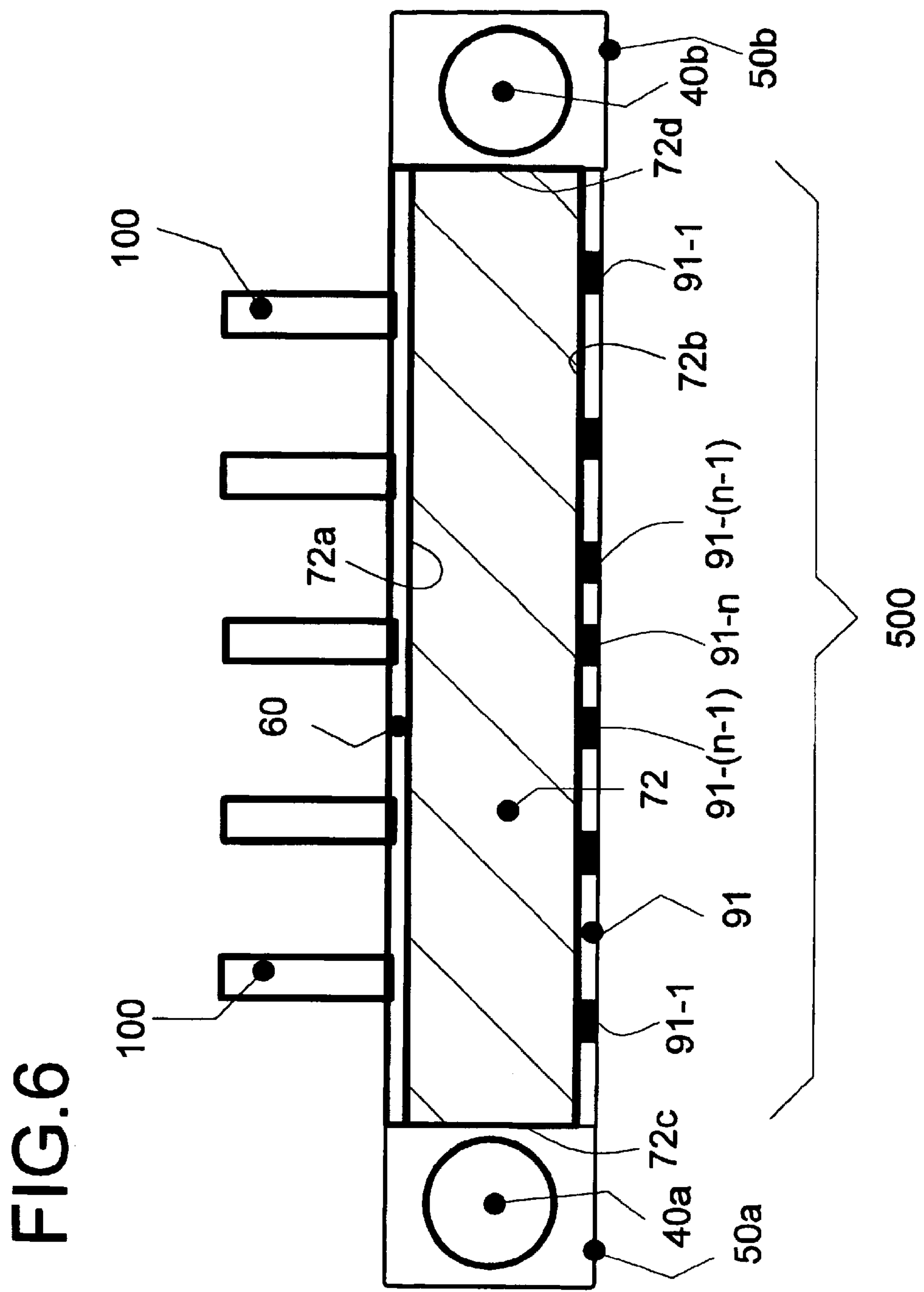
FIG. 6 is a cross sectional view of a further preferred embodiment of the present invention, showing a photocatalyst apparatus 500.

Referring to FIG. 6, the other embodiment according to the present invention is illustrated.

A photocatalyst apparatus 500 is composed of a transparent substrate member 72 having a first surface 72*a* and a second surface 72*b* opposed to the first surface 72*a*, the plurality of photocatalytic optical fibers 100 disposed on the first surface 72*a*, a first side 72*c* and a second side 72*d*. A thickness of the substrate 72 is substantially uniform or even (i.e. equal) from the first side 72*c* for receiving light "L" to the second side 72*d* opposed to the first side 72*c*.

At least one first light source 40*a* is disposed at a vicinity of the first side 72*c* of the substrate 72 with a reflector 50*a* and also at least one second light source 40*b* with a reflector 50*b* is disposed at a vicinity of the second side 72*c* of the substrate 72*d*.

The photocatalyst apparatus 400 is preferably further composed of an adhesive (i.e. an adhesive film or layer) disposed on the first surface 70*a* so as to adhere the photocatalytic optical fibers 100 to the first surface 70*a* at every first end of the fibers The photocatalyst apparatus 400 is preferably further composed of light redirecting means 91 (or light scattering means, light diffusing means) for diffusing, scattering 0r redirecting light which is transmitted in an interior of the transparent substrate 72 so as to reflects repeatedly between the first and the second surfaces 72*a* and 72*b* based on "TIR".

The light redirecting means 91 as is shown in FIG. 6, for example, is composed of a coated film (i.e. coated layer, coat) of a paint material including a plurality of light diffusing particles such as white pigments, glass beads. The coated film 9 having light diffusing characteristic is selectively coated on the second surface 72*b* in order to form a predetermined pattern typically by a screen printing method. The coated film 91 may be composed of plural light redirecting areas (i.e. region) 91-1, 91-2, . . . , 91-(n−1) and 91-n having a dotted or stripe pattern in order to form the predetermined pattern.

A distribution density of the plural light redirecting areas per a surface area of the second surface 72*b* may preferably form a gradation pattern in order to produce a surface brightness of the first surface 72*a* in such a manner that the dotted or striped light redirecting areas 91 may be distributed on the second surface so that the density of the light redirecting areas 91 gradually increases from the first or the second side of the second surface 72*b* toward the center position of the second surface 72*b*. That is, the distribution density varies in separate or different areas so that the density is higher in the vicinity of a center between the first and second sides 72*c* and 72*d* than in the vicinity of first or second sides 72*c* and 72*d* as is shown in FIG. 6.

Light from the light source 40*a* and 40*b* introduced from the first side 72*c* and the second side 72*d* to the interior of the transparent substrate 72 is transmitted into the interior, the light is attenuated i.e. decreased gradually on the way to reach the center of the substrate 72. Since the photocatalyst apparatus 500 is provided with the light redirecting coated film 91 having the gradation pattern as described in the above, the uniform or even surface brightness of the first surface can be produced so that every photocatalytic optical fibers 100 disposed on separate different positions of the first surface 72*a* can receive the light output (i.e. leaked) from the first surface 72*a* with substantially equal brightness.

The photocatalyst apparatus 400 or 500 as is shown in FIG. 5 and FIG. 6 may be additionally provided with a substantially transparent electric conductor typically made of tin oxide, indium oxide and a composite thereof, wherein the electric conductor is disposed between the adhesive 60 and the first surface 70*a* or 72*a*.

Figure 7:
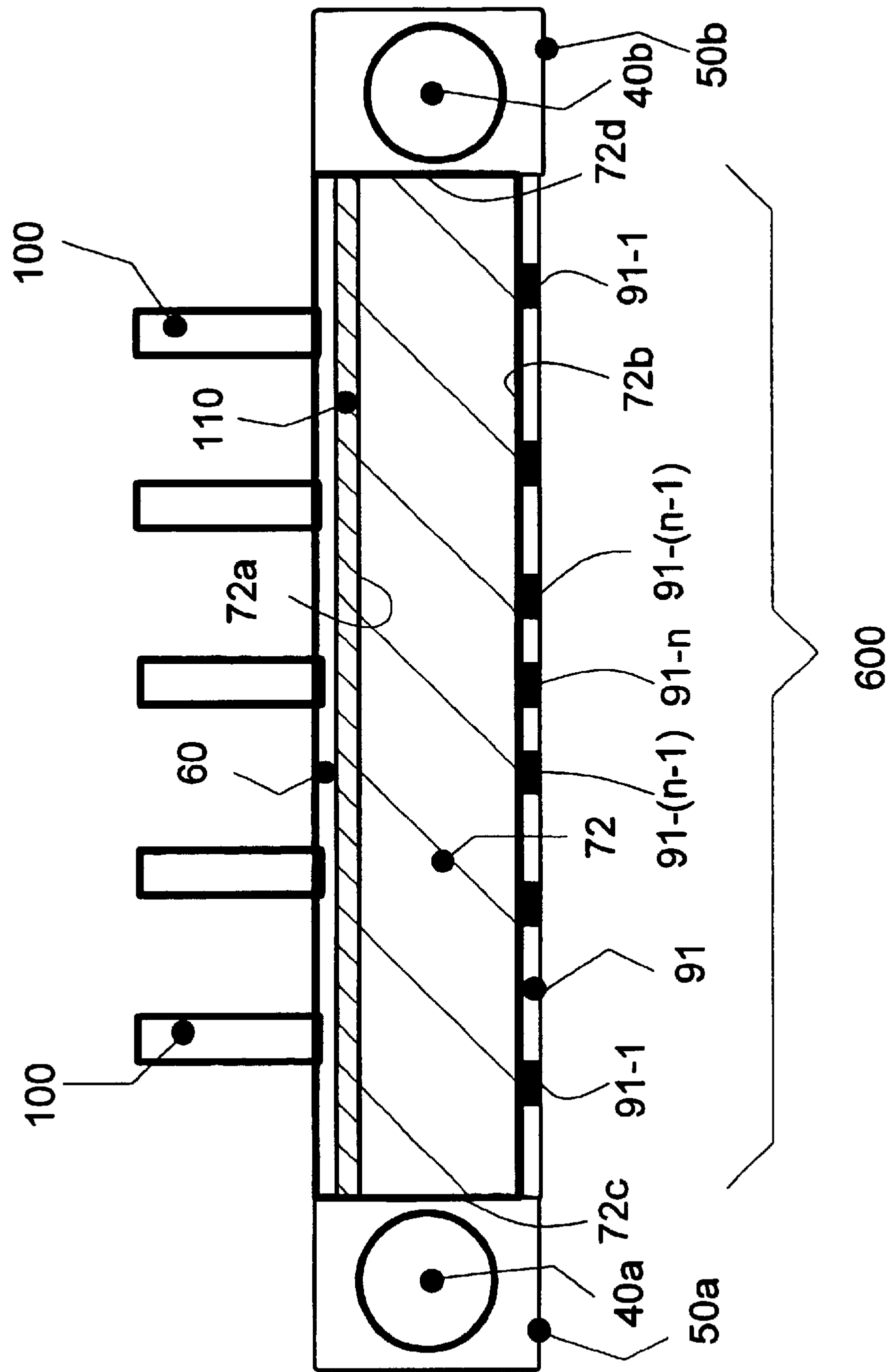
FIG. 7 is a cross sectional view of a still further preferred embodiment of the present invention, showing a photocatalyst apparatus 600.

Referring to FIG. 7, in the other embodiment of the present invention, a photocatalyst apparatus 600 provides the photocatalyst apparatus 500 as is shown in FIG. 6 with an additional transparent electric conductor 110 (e.g. tin oxide, indium oxide) between the first surface 72*a* and the adhesive 60. That is, the photocatalyst apparatus 600 in FIG. 7 is composed of the substrate 72 with a uniform or even thickness, the first surface 72*a*, the second surface 72*b*, the first side 72*c*, the second side 72*d*, the adhesive 60 disposed on the first surface 72*a*, the plurality of photocatalytic optical fibers 100 fixed/attached to the adhesive 60 at each one end thereof, the light redirecting film 91 (91-1, . . . , 91-(n−1) and 91-n) with a gradation pattern disposed on the second surface 72*b* and the transparent electric conductor 110 interposed between the above members 72 and 60.

In FIG. 7, if the transparent electric conductor film 110 having a refractive index equal to or more than the refractive index of the transparent substrate 72 is used, light transmitted to reflect repeatedly in an interior of the substrate 72 may be subject to leak or output from the first surface 72*a* so as to irradiate the photocatalytic optical fibers 100 disposed on the first surface 72*a*.

Figure 8:
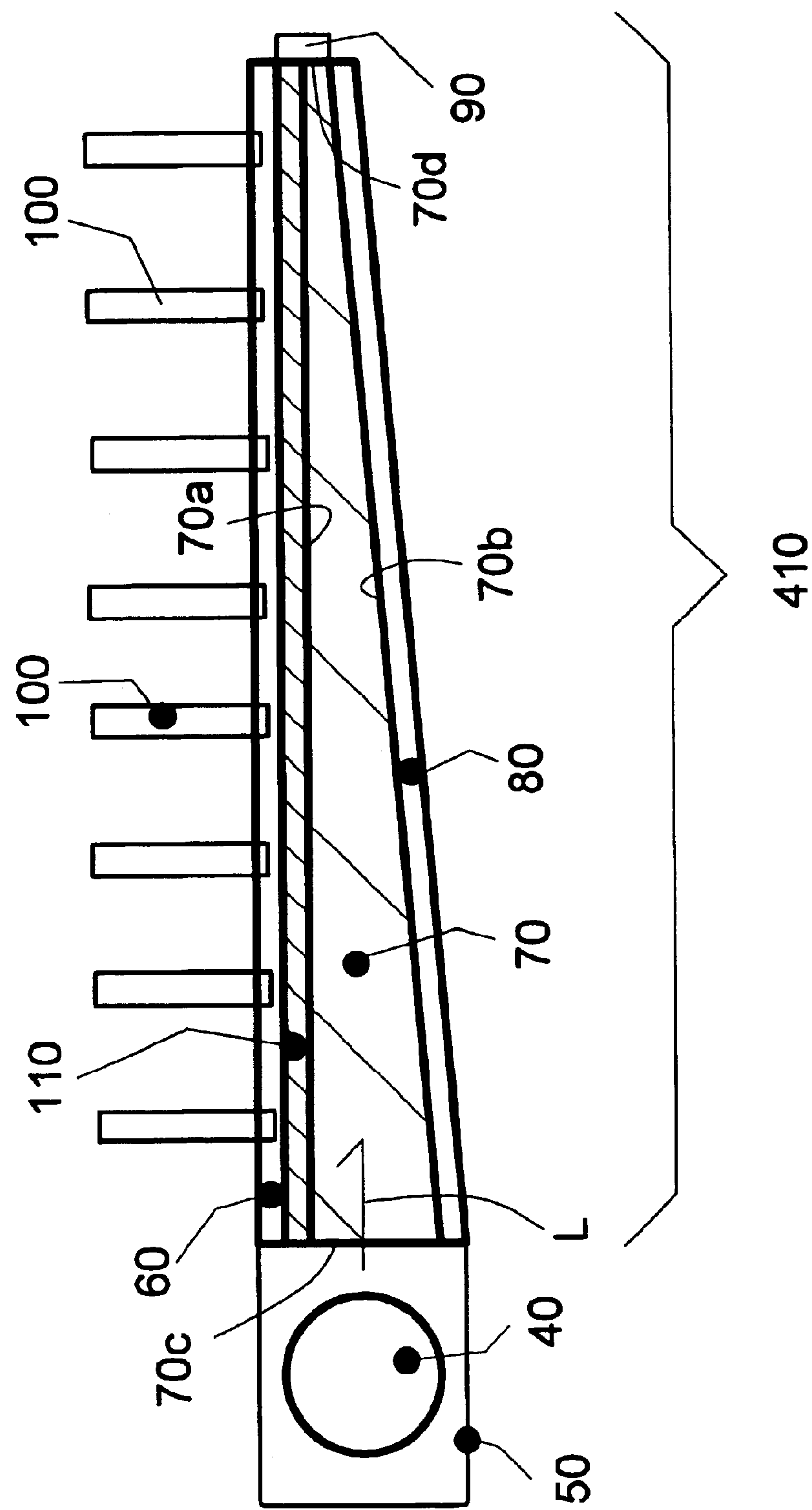
FIG. 8 is a cross sectional view of other preferred embodiment of the present invention, showing a photocatalyst apparatus 410 having a taper like substrate.

Referring to FIG. 8, in the other embodiment of the present invention, a photocatalyst apparatus 410 provides the photocatalyst apparatus 400 as is shown in FIG. 5 with an additional transparent electric conductor 110 between the first surface 70*a*and the adhesive 60. That is, the photocatalyst apparatus 410 in FIG. 8 is composed of the substrate 70 with a variable thickness, the first surface 70*a*, the second surface 70*b*, the first side 70*c*, the second side 70*d*, the adhesive 60 disposed on the first surface 70*a*, the plurality of photocatalytic optical fibers 100 fixed/attached to the adhesive 60 at each one end thereof and the transparent electric conductor 110 interposed between the above members 70 and 60.

The transparent electric conductor 110 may be suitably used as one of a pair of electrodes (an earth electrode) of an electrostatic flocking process in order to attach the photocatalytic optical fibers 100 to the adhesive 60 at each one end thereof. Further, the transparent electric conductor 110 may be suitably used as heating means (an electric heater) of the adhesive 60 in the case that thermosetting or thermoplastic resin is used as the adhesive 60 for use in the electrostatic flocking process.

Figure 9:
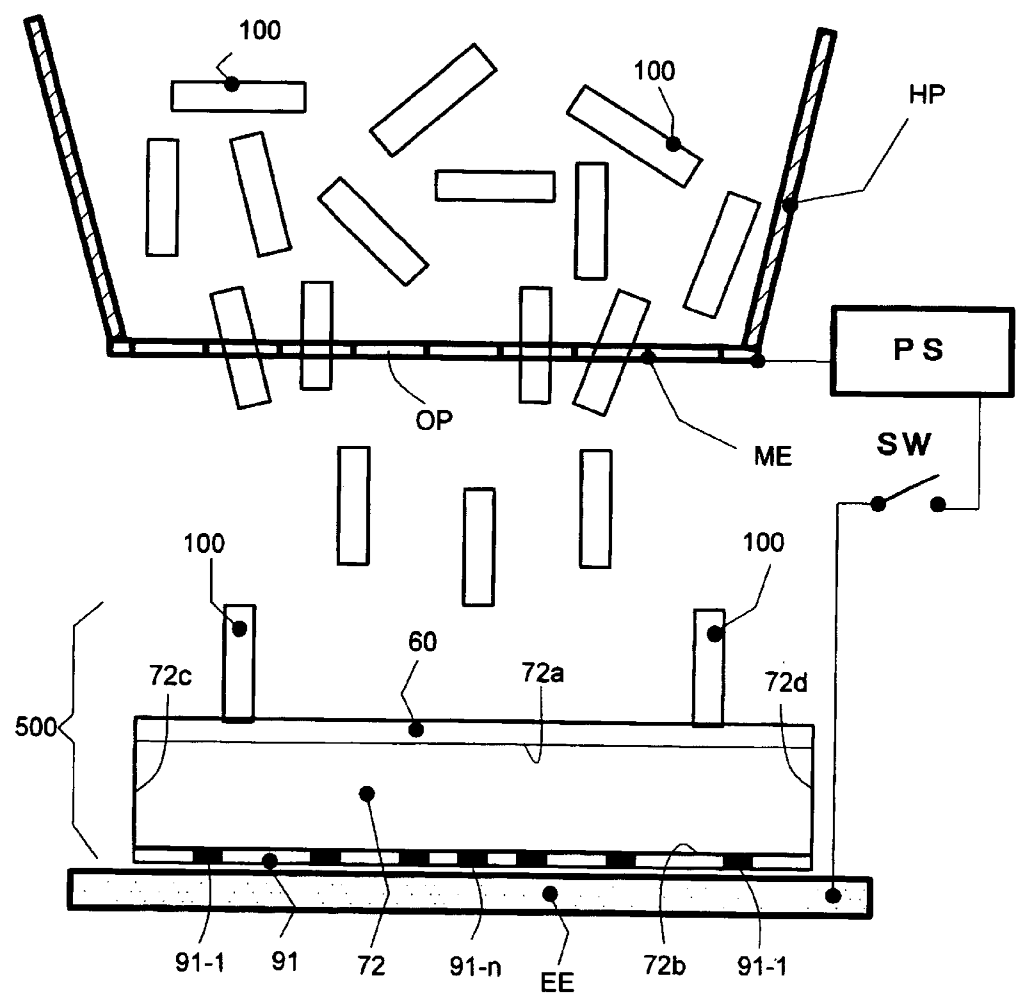
FIG. 9 is a conceptual and schematic side elevation view of other preferred embodiment of the present invention, showing a method for manufacturing the photocatalyst apparatus 500 by an electrostatic flocking process.

Referring to FIG. 9, there is shown a method of manufacturing (or fabricating) the photocatalyst apparatus 500 as is shown in FIG. 6 by an electrostatic flocking process, wherein the DOWN method is applied for the electrostatic flocking process.

In FIG. 9, a long photocatalytic optical fiber is preliminarily cut to short pieces in order to form a short plurality photocatalytic optical fibers 100 (i.e. photocatalytic optical fiber flocks, photocatalytic optical flocking fiber piles) with a substantially equal length. Any size of the photocatalytic optical fiber may be used, for example, the size of the photocatalytic optical fiber used for this purpose may be within the range of approximately 0.01 mm (10 μm) to 3.0 mm in an average diameter and within the range of approximately 0.5 mm to 50 mm in an average length (photocatalytic optical fiber flocks after cutting).

A hopper "HP" is composed of a housing having an upper opening and a metal electrode "ME" with a plurality of openings (i.e. holes) "OP" for allowing the flocks 100 to going out therefrom such as a metallic mesh, a punched metal plate at a bottom of the housing. The hopper "HP" preliminarily contains many photocatalytic optical fibers 100 therein.

At first, the transparent substrate 72 of FIG. 6 with a substantially uniform or even thickness having a first surface 72*a* and a second surfaces 72*b* is prepared. The transparent substrate 72 with a adhesive film 60 and a light redirecting film 91 is made in such a way that the light redirecting film 91 is selectively formed on the second surface 72*b* such as by a screen printing method, then the adhesive in a fluidic state is coated on the first surface 72*a* to form the adhesive film 60 thereon. Next, The transparent substrate 72 with an adhesive film 60 and a light redirecting film 91 is placed on an electrically conductive plate as an earth electrode "EE".

As is shown in FIG. 9 again, the hopper "HP" is placed keeping a suitable gap between the substrate 72 which has no photocatalytic optical fibers 100 yet and the hopper "HP" in such a way that the metallic electrode "ME" of the hopper "HP" is opposed to the adhesive 60 on the substrate 72.

The high voltage electric power source "PS" is connected between the metallic electrode "ME" (i.e. charging electrode) having plural openings "OP" and the earth electrode "EE" through a switching means "SW".

When the switching means "SW" is switched-on (i.e. turned-on), a high voltage in the range of about 30 KV to 80 KV is applied between the metallic electrode "ME" and the earth electrode "EE" so that the metallic electrode "ME" having a high electric potential gives an electrostatic charge to every plural. photocatalytic optical fibers 100 when the fibers 100 are contacted with the metallic electrode "ME" during passing through the openings "OP".

When the plural photocatalytic optical fibers 100 are charged, they have an electrostatic attraction so that the plural fibers 100 propel or transfer toward the earth electrode "EE" opposed to the metallic electrode of the hopper "HP" and the plural photocatalytic optical fibers 100 are fixed/attached to/onto the adhesive film 60. The plural photocatalytic optical fibers 100 can be embedded at each end into the adhesive film 60 by the strong electrostatic attraction.

After attaching the plural photocatalytic optical fibers 100 to the adhesive film 60 composed of a UV sensitive resin or a thermosetting resin, curing is made by applying a UV radiation or heating to the adhesive film 60 in an uncured state so as to harden the adhesive 60. Consequently, the plural photocatalytic optical fibers 100 are fixed (or; attached, implanted, secured) permanently on the substrate 72.

Because the plural photocatalytic optical fibers 100 are fixed/attached to the substrate e.g. 72 so as to standing up on the substrate (i.e. elongate from the substrate or project from the substrate) by the electrostatic flocking process, the photocatalyst apparatus e.g. 500 having the following key advantage is easily obtained: (1) the plural photocatalytic optical fibers 100 project in a substantially perpendicular direction, (2) the plural photocatalytic optical fibers 100 project substantially parallel to one another and (3) the plural photocatalytic optical fibers 100 form a high density of flocked pile-like photocatalytic optical fibers on the substrate i.e. 72.

After curing, the excessive fibers 100 not fixed/attached to the adhesive 60 can be removed by applying a vacuum to the implanted surface 72*a*.

Figure 10:
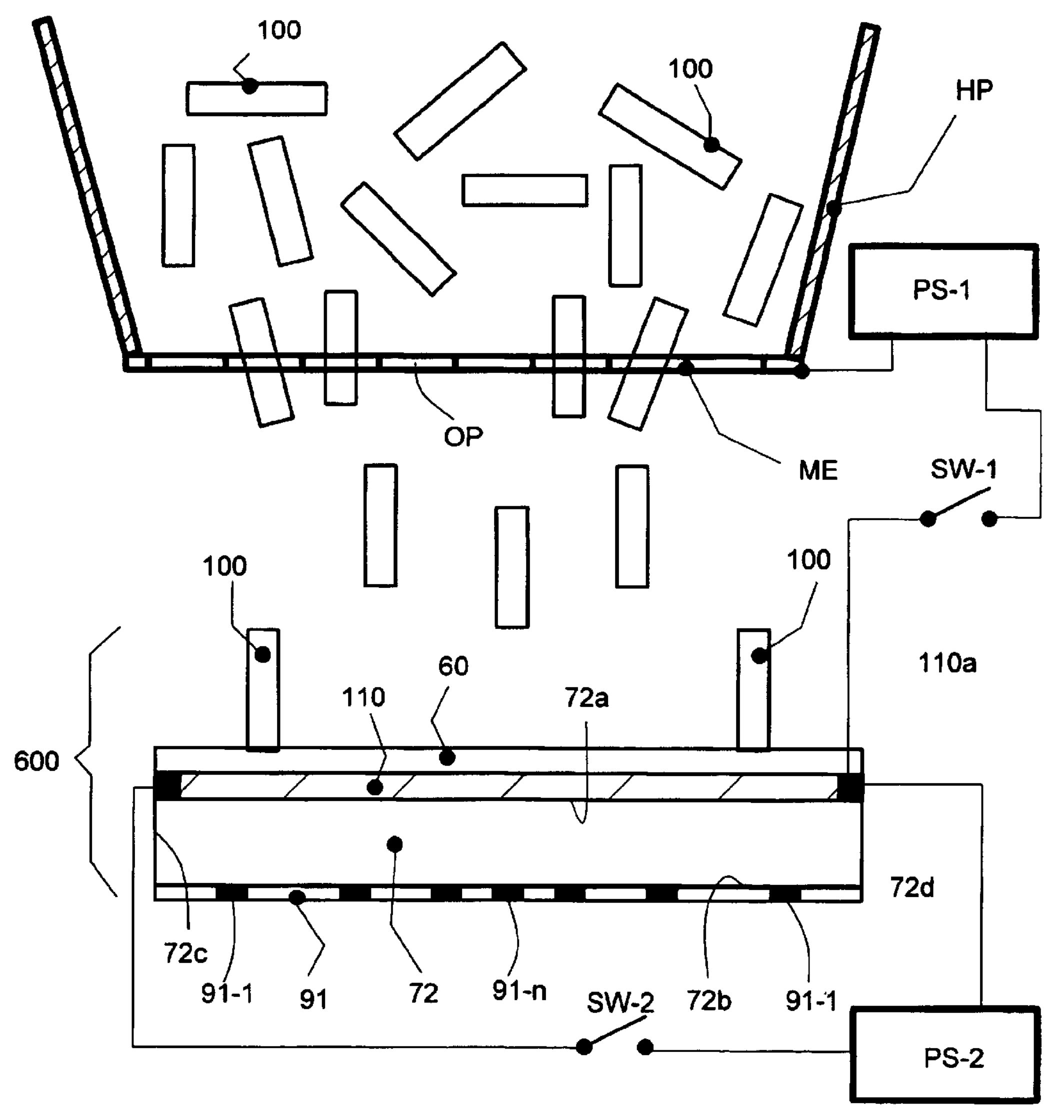
FIG. 10 is a conceptual and schematic side elevation view, showing a method for manufacturing the photocatalyst apparatus 600 by an electrostatic flocking process.

Referring to FIG. 10, a method for manufacturing the photocatalyst apparatus 600 of FIG. 7 is described in which the transparent electric conductor 110 may is used as one of a pair of electrodes (i.e. an earth electrode) and/or an electric heating means such as an electric heater when a thermosetting resin or a thermoplastic resin is applied for an adhesive 60.

In FIG. 10, a long photocatalytic optical fiber is preliminarily cut to short pieces in order to form short plurality photocatalytic optical fibers 100 with a substantially equal length. A hopper "HP" is composed of a housing having an upper opening and a metal electrode "ME" with a plurality of openings (i.e. holes) "OP" for allowing the flocks 100 to going out therefrom such as a metallic mesh, punched metal plate at a bottom of the housing. The hopper "HP" preliminarily contains many photocatalytic optical fibers 100 therein.

At first, a preparation of a transparent substrate 72 is made so that the transparent substrate 72 is provided with a substantially transparent, electric conductor film 110 on a first surface 72*a* thereof and a light-diffusing or light redirecting film 91 on a second surface thereof. Next, an adhesive in a liquid state is coated on the transparent electric conductor film 110 by e.g. splaying, printing, immersing method to form an adhesive film or layer 60.

As is shown in FIG. 10 again, the hopper "HP" is placed keeping a suitable gap between the substrate 72 which has no photocatalytic optical fibers 100 yet and the hopper "HP" in such a way that the metallic electrode "ME" of the hopper "HP" is opposed to the adhesive 60 on the substrate 72.

The high voltage electric power source "PS-1" is connected between the metallic electrode "ME" (i.e. charging electrode) having plural openings "OP" and the electric conductor film 110 acting as another electrode through a switching means When the switching means "SW-1" is switched-on, a high voltage in the range of about 30 KV to 80 KV is applied between the metallic electrode "ME" and the electric conductor film 110 (i.e. earth electrode) so that the metallic electrode "ME" having a high electric potential gives an electrostatic charge to every plural photocatalytic optical fibers 100 when the fibers 100 are contacted with the metallic electrode "ME" during passing through the openings "OP".

When the plural photocatalytic optical fibers 100 are charged, they have an electrostatic attraction so that the plural fibers 100 propel or transfer toward the electric conductor film 110 (i.e. earth electrode) opposed to the metallic electrode "ME" of the hopper "HP" and the plural photocatalytic optical fibers 100 are 100 can be embedded at each end into the adhesive film 60 by the strong electrostatic attraction.

A heater power source "PS-2" is connected to the transparent electric conductor film 110 at a first terminal 10*a* and a second terminal 10*b* opposed to the first terminal 10*a* via a switch "SW-2". When the switch "SW-2" is switched on, the transparent electric conductor film 110 generates a joule heat along the film 110 and the joule heat transfers to the adhesive 60 thereon.

If the thermosetting resin is used as the adhesive 60, the transparent electric conductor film 110 is used for a heating means for curing or hardening the adhesive film 60 so that the plural photocatalytic optical fibers 100 are permanently fixed/attached to/on the adhesive film 60 after the plural photocatalytic optical fibers 100 are fixed/attached to/on the uncured or softened adhesive film 60 on the substrate 72.

If the thermoplastic resin is used as the adhesive 60, the transparent electric conductor film 110 is used for a heating means so that the electric conductor film 110 in switching on (the closed state of the switch "SW-2") gives a sufficient temperature to soften the adhesive 60 when the adhesive 60 is coated on the surface 72*b* of the substrate 72 and/or while the plural photocatalytic optical fibers 100 are fixed/attached to the adhesive 60 by the electrostatic flocking process is carried out. After implanting, the adhesive 60 is cooled to the room temperature by switching off (the open state of the switch "SW-2") and the plural photocatalytic optical fibers 100 are permanently fixed/attached to the adhesive 60 due to hardening of the adhesive 60.

In the aforementioned plural preferred embodiments according to the present invention, the substrate with a pair of the opposed surfaces may have at least one opening, (i.e. hole, aperture, through hole, via hole) to pass through the surfaces so as to a fluid can pass through the substrate.

Figure 11:
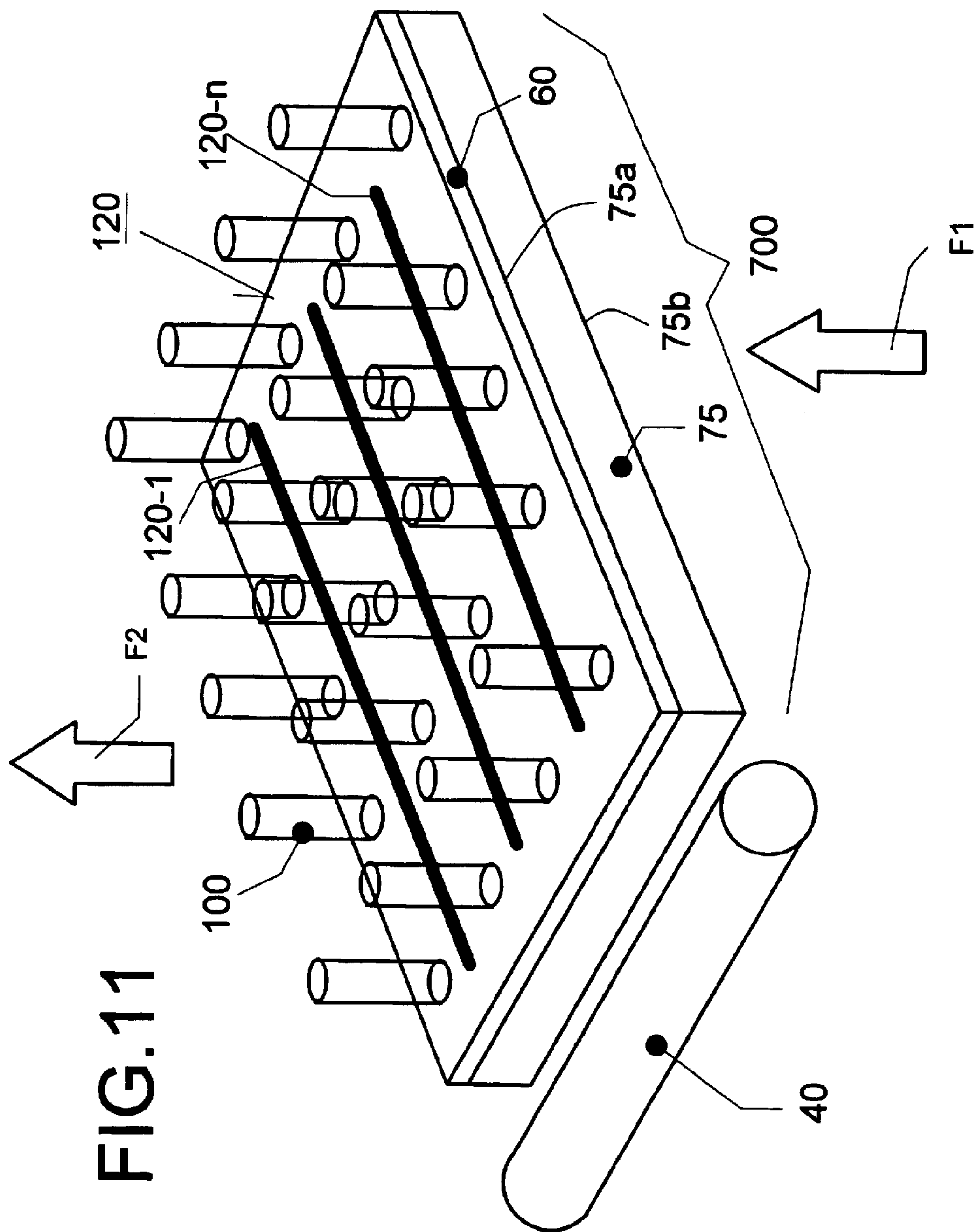
FIG. 11 a conceptual and schematic perspective view of other preferred embodiment of the present invention, showing a photocatalyst apparatus 700 having linear shaped openings to pass through a substrate.
Figure 14:
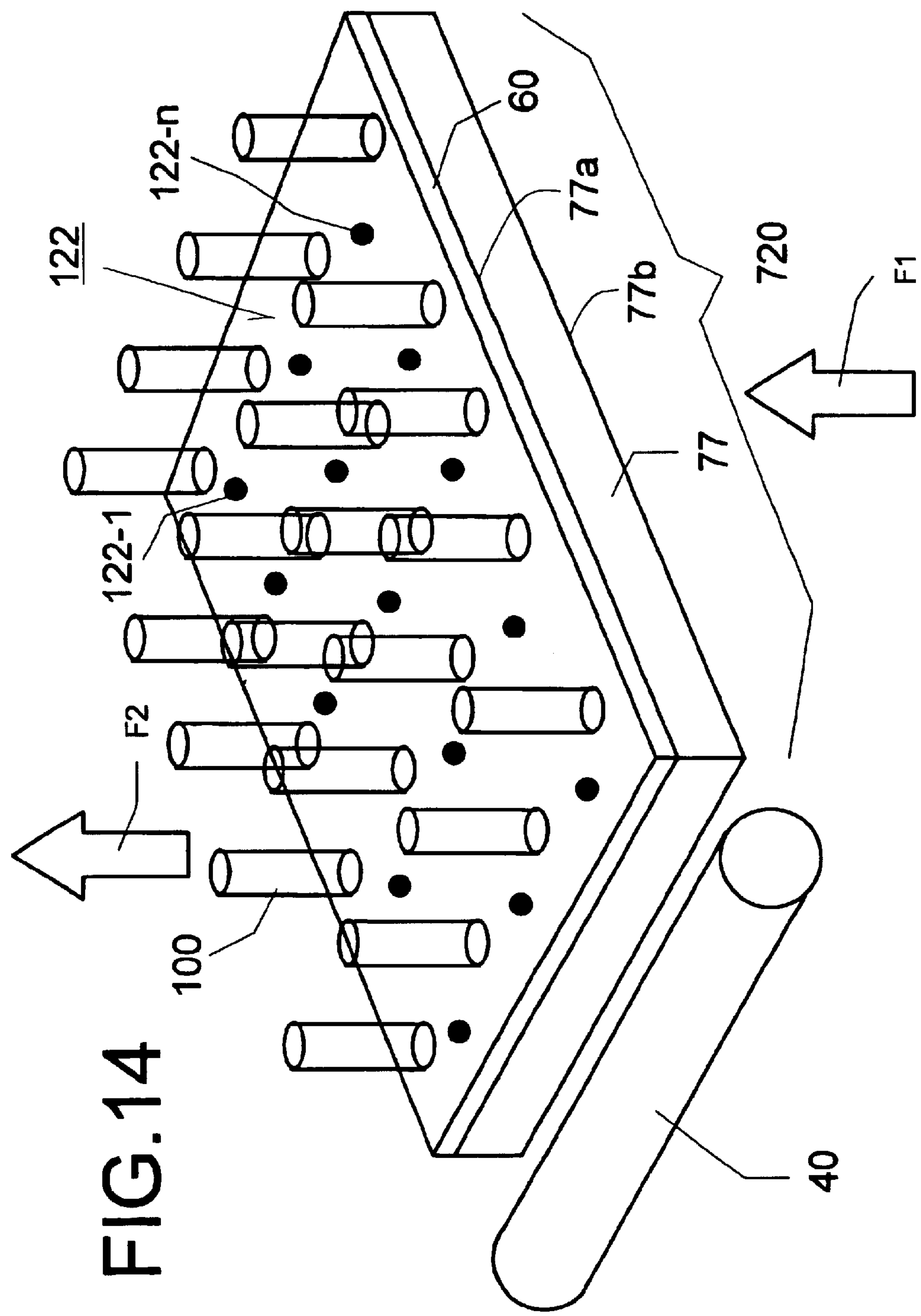
FIG. 14 is a conceptual and schematic perspective view of other preferred embodiment of the present invention, showing a photocatalyst apparatus 720 having dotted openings to pass through a substrate.

Referring to FIG. 11 and FIG. 14, a photocatalyst apparatus 700 or 720 may be provided with a plurality of openings (i.e. through holes, perforations) 120 or 122 to pass through a pair of opposed surfaces of a substrate 75 or 77.

In FIG. 11, the photocatalyst apparatus 700 is composed of a transparent substrate 75, opposed first and second surfaces thereof, opposed first and second sides thereof, an adhesive film 60 disposed on the first surface, a plurality of opening 120 (i.e. 120-1, . . . , 120-n) to pass through between the surfaces (and the adhesive film 60) and a plurality of photocatalytic optical fibers 100 fixed/attached to the first surface with the adhesive 60 therebetween. The photocatalyst apparatus 700, therefore, allow fluid to pass through the substrate 75. While an upstream "F1" of the fluid flow containing a contaminant (or pollutant) passes through the photocatalyst apparatus 700, the fluid flow is decontaminated and a downstream "F2" of the fluid flow is clean up in which the contaminant of the downstream "F2" is decreased.

Each opening 120-1, . . . , 120-n as is shown in FIG. 11 may be formed as a substantially linear shape (i.e. slit-like shape), which extend from a proximity of the first side where at least one light source 40 is disposed near the first side to a proximity of the second side. The shape of the opening 120 is not limited to the linear shape in FIG. 11 and any suitable shapes may be adopted.

Referring to FIG. 11 and FIG. 14, a photocatalyst apparatus 700 or 720 may be provided with a plurality of openings 120 or122 to pass through a pair of opposed surfaces of a substrate 75 or 77.

In FIG. 14, the photocatalyst apparatus 720 is composed of a transparent substrate 77, opposed first and second surfaces thereof, opposed first and second a sides thereof, an adhesive film 60 disposed on the first surface, a plurality of opening 122 (i.e. 122-1, . . . , 122-n) to pass through between the surfaces (and the adhesive film 60) and a plurality of photocatalytic optical fibers 100 fixed/attached to the first surface with the adhesive 60 therebetween. The photocatalyst apparatus 720, therefore, allow fluid to pass through the substrate 72. While an upstream "F1" of the fluid flow containing a contaminant (or pollutant) passes through the photocatalyst apparatus 720, the fluid flow is decontaminated and a downstream "F2" of the fluid flow is clean up in which the contaminant of the downstream "F2" is decreased.

Each opening 122-1, . . . , 122-n as is shown in FIG. 14 may be formed as a substantially I dotted shape (i.e. dot-like, point-like, circular or round shape), which extend from a proximity of the first side where at least one light source 40 is disposed near the first side to a proximity of the second side.

The plural openings 120 or 122 may be modified in each shape, total quantities thereof, size and a distribution density in such a way that the fluid can smoothly flow from the upstream F1 to the downstream F2 through the openings 120 or 122 and/or light from the light source 40 transmitting in an interior of the transparent substrate 70 or 72 can reach surely to all the photocatalytic optical fibers 100 at each end thereof to introduce the light into the core and/or the fluid can surely contact the photocatalytic optical fibers 100 to decompose the contaminant included in the fluid.

Figure 12:
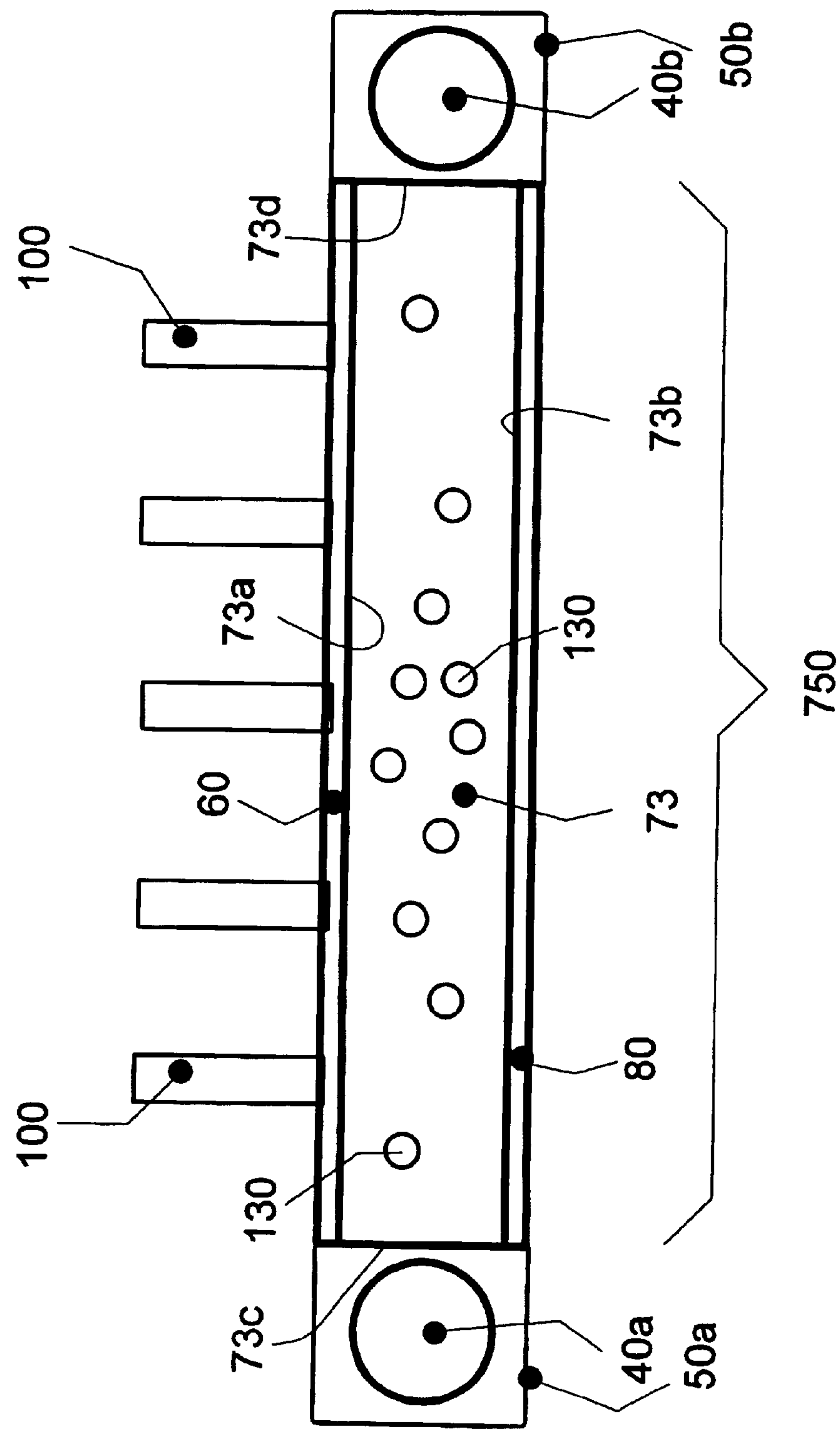
FIG. 12 is a cross sectional view of other preferred embodiment of the present invention, showing a photocatalyst apparatus 750 having a particulate light diffuser in a substrate.

Referring to FIG. 12 showing the other embodiment of the present invention, a photocatalyst apparatus 750 is composed of a transparent substrate 73 having opposed first and second surfaces 73*a* and 73*b* thereof, opposed first and second sides 73*c* and 73*d* thereof, an adhesive film 60 disposed on the first surface 73*a*, a reflector film 80 disposed on the second surface 73*b*, a plurality of photocatalytic optical fibers 100 fixed/attached to the first surface 73*a* and a light redirecting means 130 buried in the substrate 73.

The light redirecting means 130 is a plurality of light diffusing particles made of e.g. pigments, glass or plastic beads and gaseous bubbles such as air. The light diffusing particles 130 may be colored in white or they may have a refractive index, which differs from that of the transparent substrate 73 to diffuse light such as to diffuse light efficiently.

The light diffusing particles 130 may be embedded in an interior of the transparent substrate 73, in which the diffusing particles 130 may be dispersed uniform or evenly or non-uniform or evenly into the transparent substrate 73.

In FIG. 12, the photocatalyst reactor is composed of the photocatalyst apparatus 750 with the light redirecting means

130 in an interior of the transparent substrate 73, a t least one first light source 40*a* with a first reflector 50*a* disposed at a vicinity of the first side 73*a* and a t least one second light source 40*a* with a first reflector 50*b* disposed at a vicinity of the second side 73*b*.

The light redirecting means 130 as is shown in FIG. 12 have the plural light diffusing particles forming a gradation pattern, in which the light diffusing particles 130 are distributed non-uniform or evenly in the transparent substrate 73 in such a manner that the light diffusing particles 130 are increased gradually in the quantities from the first side 73*c* to a center between the both sides 73*c* and 73*d*, and the light diffusing particles 130 are increased gradually in the quantities from the second side 73*c* to the center.

That is, the transparent substrate 73 has a small quantity of the light diffusing particles 130 in a region near the first and second sides 73*c* and 73*d*, while the transparent substrate 73 has a large quantity of the light diffusing particles 130 in a region near the center between the first and second sides 73*c* and 73*d*, and a quantity of the light diffusing particles 130 varies to decrease as a region of the substrate 73 approaches from the center to the both sides 73*c* and 73*d.*

Since the transparent substrate 73 is provided with the light redirecting means, i.e. the light diffusing particles 130 therein to form the gradation pattern as described in the above, the first and second sides 73*ac* and 73*d* receive light from the first and second light source 40*a* and 40*b* to introduce the light into the transparent substrate 73, the light travels from the both sides 73*ac* and 73*d* toward the center between the sides 73*ac* and 73*d*, the light is diffused gradually simultaneously at the light diffusing particles 130 and the light diffused travels toward the first surface 73*a* in order to irradiate every photocatalytic optical fibers 100 implanted on the first surface 73*a* with a substantially uniform or even brightness at each end (10*a* in FIG. 2) of the fiber 100. The reflector film 80 on the second surface 73*b* helps the light diffused to travels toward the first surface 73*a*.

Alternatively, at least one light source (e.g. 73*a*) positioned only at one side (e.g. the first side 73*c*) may be used, instead. In this case, the gradation pattern of light redirecting means are so designed that a quantity density of the plural light diffusing particles 130 embedded in the varies to increase gradually from the first side 73*c* where the light source 73*a* is positioned to the second side 73*d* where the light source 73*a* is omitted or simplified. Thereby, a substantially uniform or even brightness can be produced so as to irradiate every photocatalytic optical fibers 100 implanted on the first surface 73*a* with a substantially uniform or even brightness at each end The photocatalyst apparatus 750 in FIG. 12 as explained in the above is provided with the photocatalytic optical fibers 100 on one (the first surface 73*a*) of a pair of surfaces, however, the positioning of the photocatalytic optical fibers 100 is not limited to the above positioning.

Figure 13:
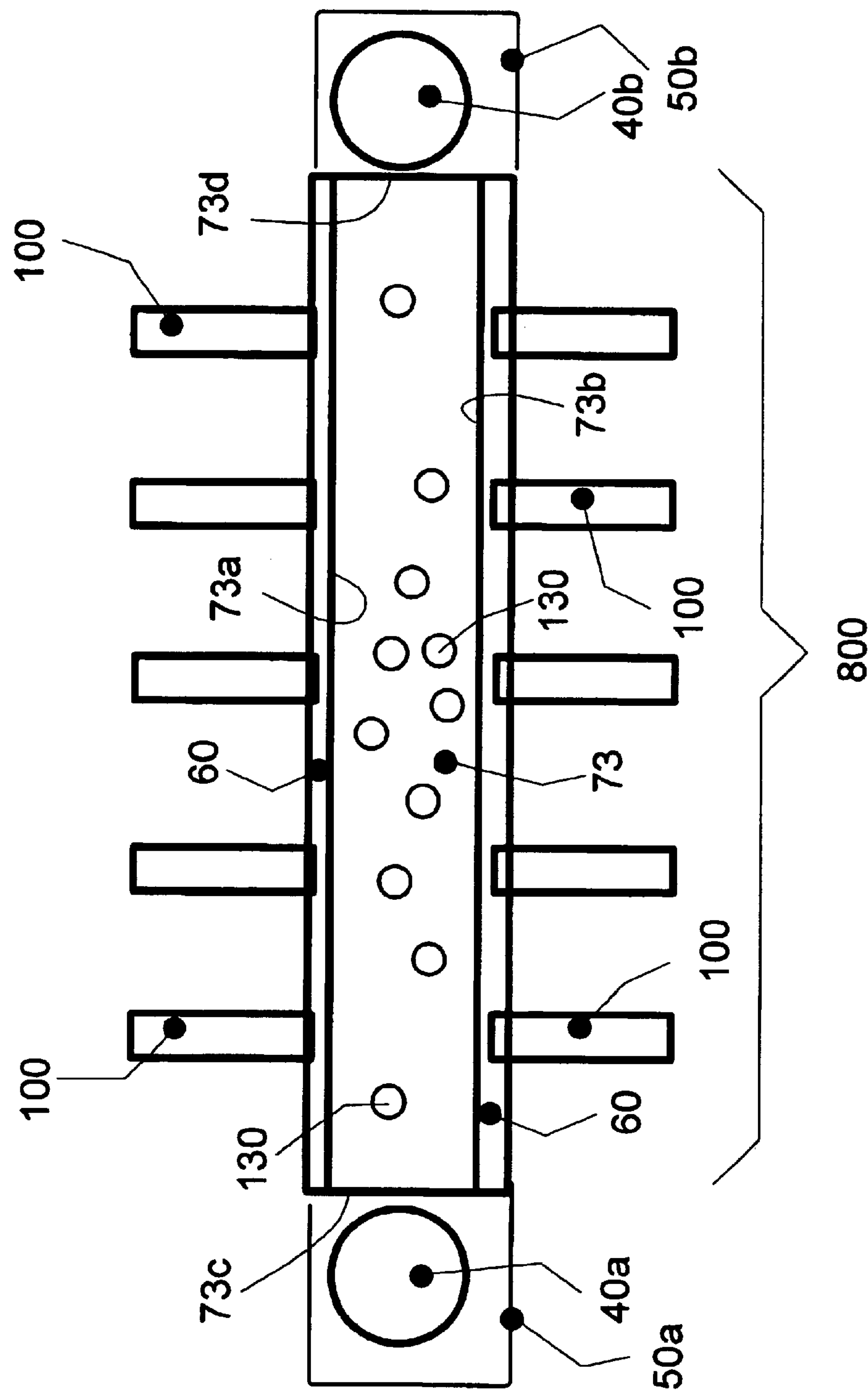
FIG. 13 is a cross sectional view of other preferred embodiment of the present invention, showing a photocatalyst apparatus 800 having photocatalytic optical fibers on dual surfaces of a substrate and having particulate light diffuser in the substrate.

Referring to FIG. 13 showing the other preferred embodiment of the present invention, a photocatalyst apparatus 800 may be provided with a first photocatalytic optical fibers 100 on a first surface 73*a* and a second photocatalytic optical fibers 100 on a second surface 73*b*, wherein a twice contacting area with fluid can be obtained as compared to the photocatalyst apparatus 750 in FIG. 12.

FIG. 13, the photocatalyst apparatus 800 is composed of a transparent substrate 73 having opposed first and second surfaces 73*a* and 73*b* thereof, opposed first and second sides 73*c* and 73*d* thereof, a first and a second adhesive films 60 disposed on the first and the second surfaces 73*a* and 73*b*, a plurality of first photocatalytic optical fibers 100 fixed/attached to the first surface 73*a*, a plurality of second photocatalytic optical fibers 100 fixed/attached to the second surface 73*b* and a light redirecting means 130 buried in the substrate 73.

The light redirecting means have the plural light diffusing particles 130 forming a gradation pattern to distribute non-uniform or evenly in the transparent substrate 73 so as to produce a uniform or even brightness of the first and second surfaces 73*a* and 73*b*. Therefore, every photocatalytic optical fiber 100 can receive light with a uniform or even brightness to irradiate every photocatalytic optical fiber 100 equally.

Figure 15:
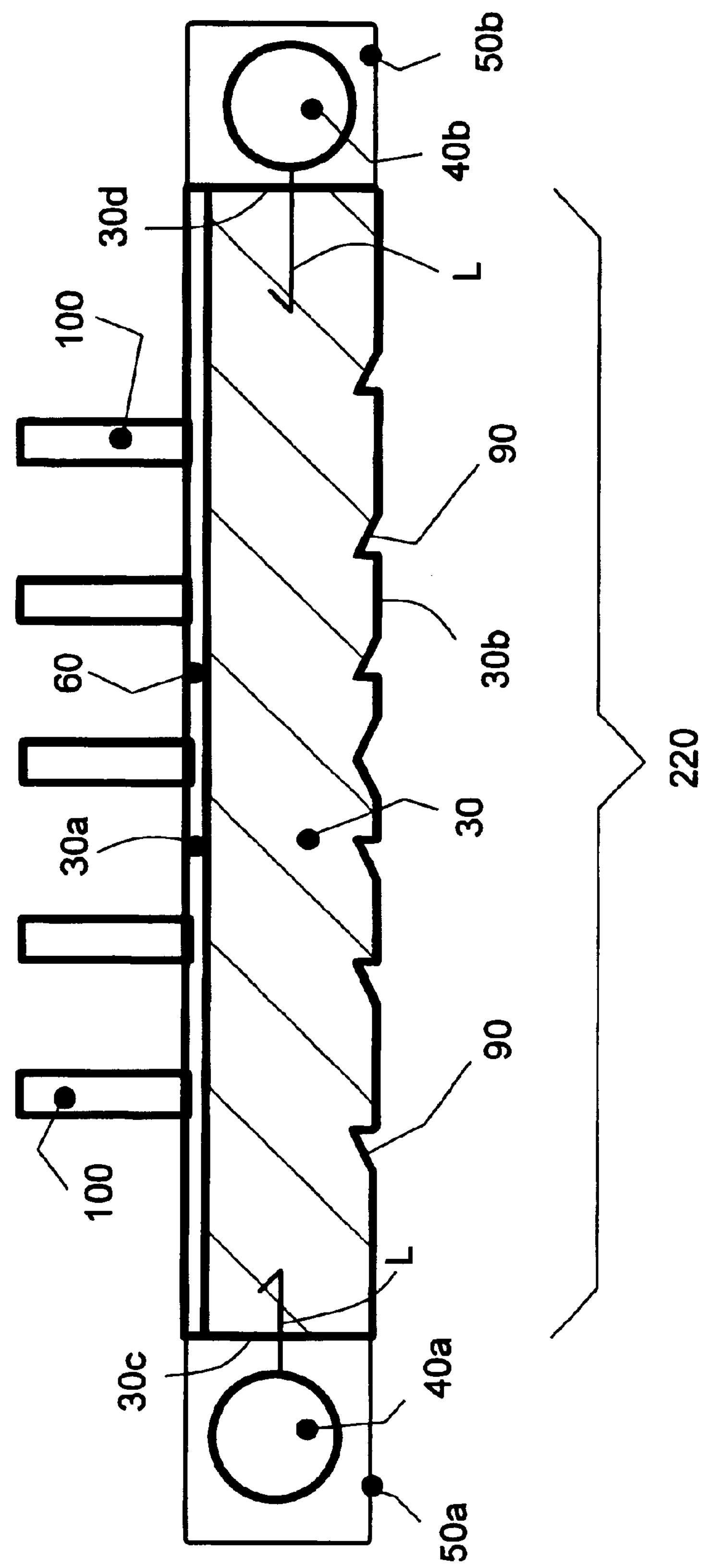
FIG. 15 is a cross sectional view of other preferred embodiment of the present invention, showing a photocatalyst apparatus 220 having dual sides of a substrate to receive light and having light redirecting means to form a gradation pattern on a surface of the substrate.

Referring to FIG. 15 showing the other preferred embodiment of the present invention, a photocatalyst apparatus 220 is one of modified versions of the photocatalyst apparatus 200 as is shown in FIG. 3. The photocatalyst apparatus 200 is composed of the transparent substrate 30 having the first and second surfaces 30*a* and 30*b*, the first and second sides 30*c* and 30*d*, and the photocatalytic optical fibers 100 disposed on the first surface 30*a*. The apparatus 200 is further composed of the plural grooves 90 to form the diffusing gradation pattern having substantially equal (i.e. uniform or even, even) height or depth formed on the second surface 30*b*, the quantities of grooves 90 are gradually increased from the first side 30*c* with the light source 40 at the vicinity thereof toward the second side 30*d*, thereby the diffusing gradation pattern produces the uniform or even surface brightness in the first surface 30*a*.

In FIG. 15, the photocatalyst apparatus 220 of the embodiment of the present invention, which differs from the photocatalyst apparatus 200, is provided with a diffusing gradation pattern composed of plural grooves 90 with uniform or even height on a second surface 30*b*, wherein the quantities of grooves 90 are gradually increased from the first and second sides 30*c* and 30*d*, where the light sources 40*a* and 40*b* are positioned at the vicinity of the sides 30*c* and 30*d* respectively, toward a center between the sides 30*c* and 30*d*. Thereby, the diffusing gradation pattern produces a uniform or even surface brightness in the first surface 30*a*. More explanation in regards to FIG. 15 is as much as possible omitted or simplified herein, since the explanation of like or similar elements designated by the same reference numeral or character has been described hereinbefore (See e.g. FIG. 3.)

Figure 16:
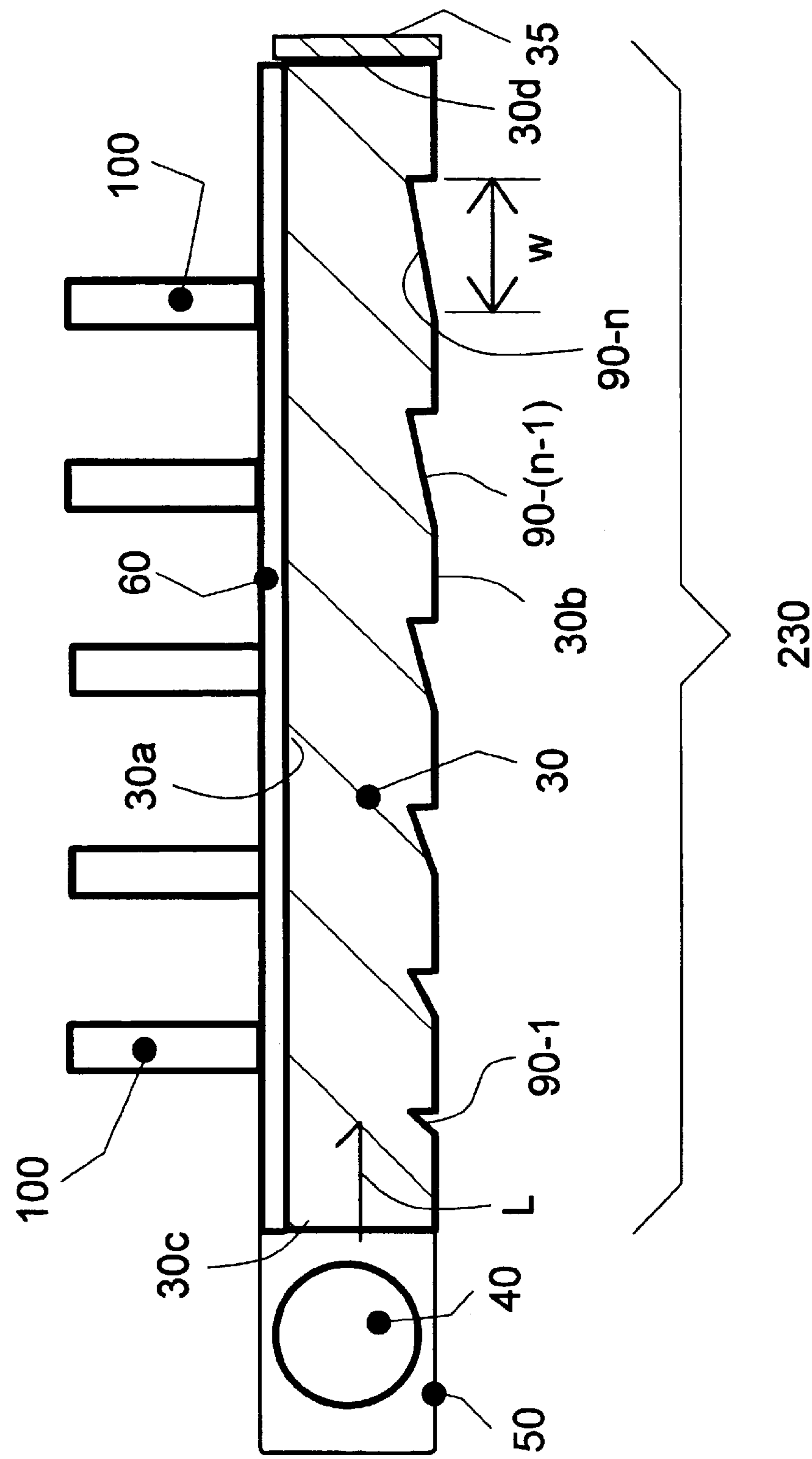
FIG. 16 is a cross sectional view of other preferred embodiment of the present invention, showing a photocatalyst apparatus 230 having light redirecting means to form another gradation pattern on a surface of the substrate.

Referring to FIG. 16 showing the other preferred embodiment of the present invention, a photocatalyst apparatus 230 is another modified version of the photocatalyst apparatus 200 as is shown in FIG. 3.

FIG. 16, the photocatalyst apparatus 230 of the embodiment of the present invention, which differs from the photocatalyst apparatus 200 as is shown in FIG. 3, is provided with a diffusing gradation pattern composed of plural grooves 90 with uniform or even height on a second surface 30*b*, wherein each size of width "w" of the grooves 90 varies to enlarge gradually from a first side 30*c* where the light source 40 is positioned at the vicinity of a first side 30*c* toward the second side 30*d*. For example, the width "w" of the groove 90-1 is shorter than the width "w" of the groove 90-n. Thereby, the diffusing gradation pattern produces a uniform or even surface brightness in the first surface 30*a*. More explanation in regards to FIG. 16 is as much as possible omitted or simplified herein, since the explanation of like or similar elements designated by the same reference numeral or character has been described hereinbefore (See e.g. FIG. 3.)

Figure 17:
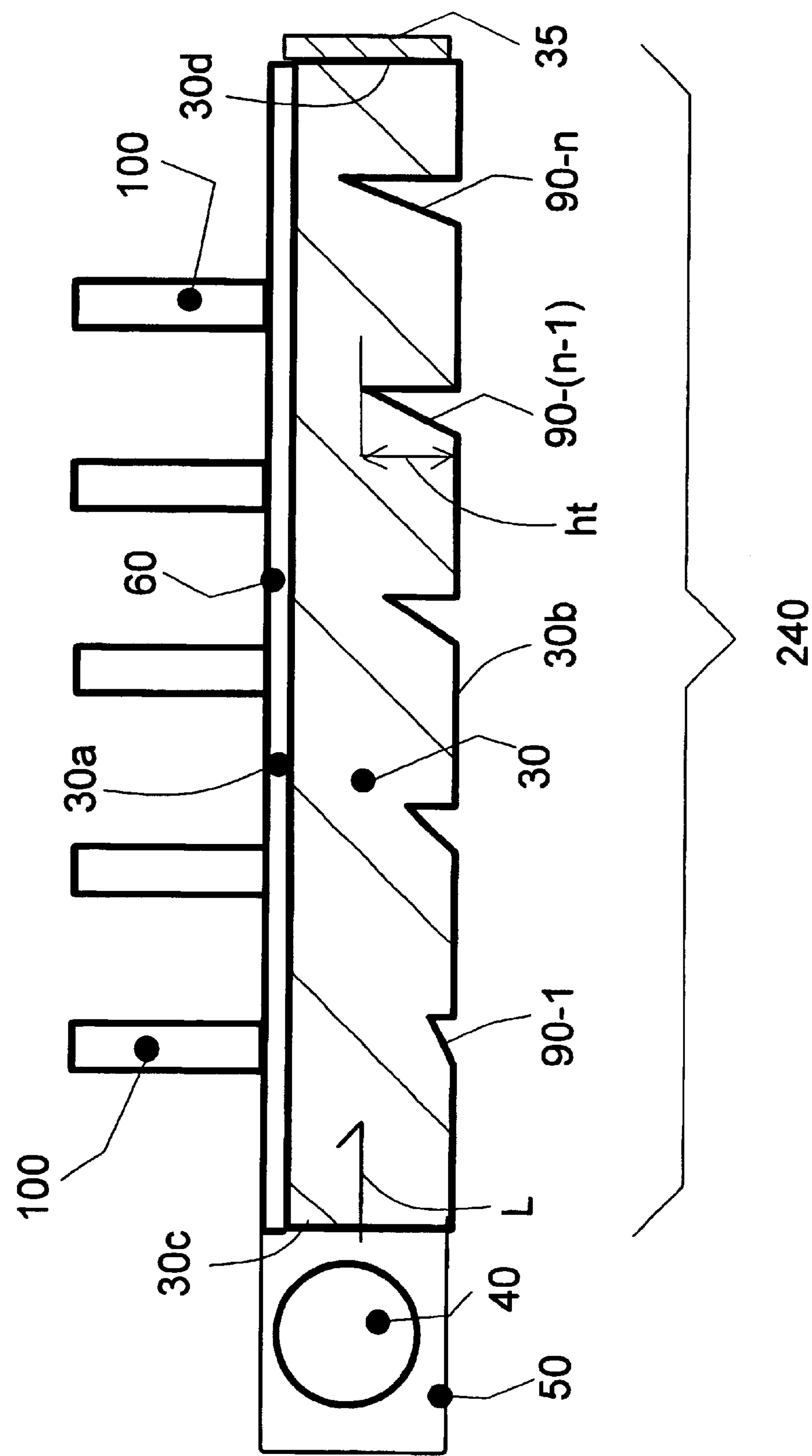
FIG. 17 is a cross sectional view of other preferred embodiment of the present invention, showing a photocatalyst apparatus 240 having light redirecting means to form still another gradation pattern on a surface of the substrate.

Referring to FIG. 17 showing the other preferred embodiment of the present invention, a photocatalyst apparatus 240 is a still another modified version of the photocatalyst apparatus 200 as is shown in FIG. 3.

In FIG. 17, the photocatalyst apparatus 240 of the embodiment of the present invention, which differs from the photocatalyst apparatus 200 as is shown in FIG. 3, is provided with a diffusing gradation pattern composed of plural grooves 90 with uniform or even width on a second surface 30*b*, wherein each height "ht" of the grooves 90 varies to enlarge gradually from a first side 30*c* where the light source 40 is positioned at the vicinity of a first side 30*c* toward the second side 30*d*. For example, the height "ht" of the groove 90-1 is shorter than the height "ht" of the groove 90-n. Thereby, the diffusing gradation pattern produces a uniform or even surface brightness in the first surface 30*a*. More explanation in regards to FIG. 16 is as much as possible omitted or simplified herein, since the explanation of like or similar elements designated by the same reference numeral or character has been described hereinbefore (See e.g. FIG. 3.)

Figure 18:
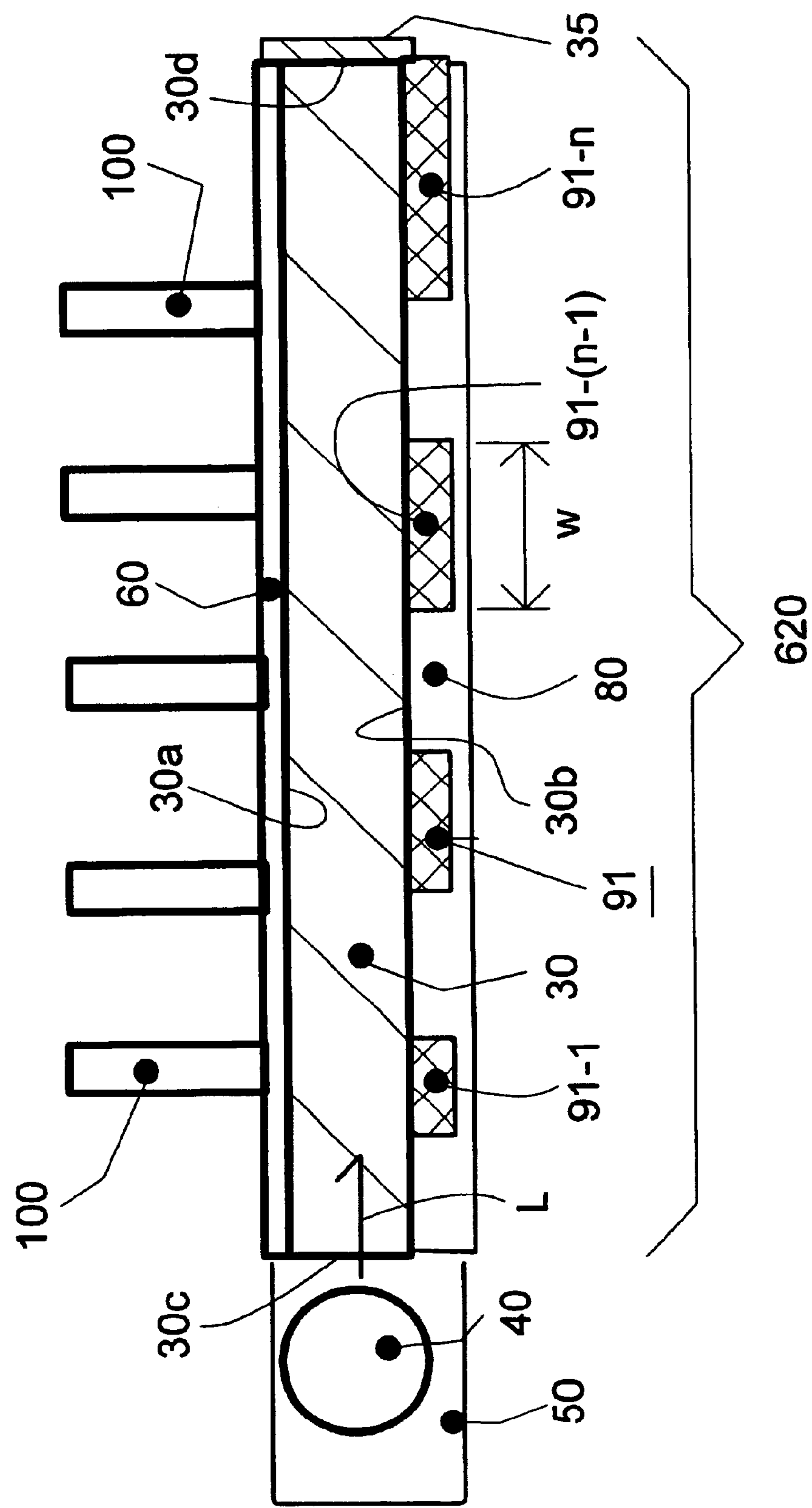
FIG. 18 is a cross sectional view of other preferred embodiment of the present invention, showing a photocatalyst apparatus 620 having light redirecting means to form further gradation pattern on a surface of the substrate.

Referring to FIG. 18 showing the other preferred embodiment of the present invention, a photocatalyst apparatus 620 is a further modified version of the photocatalyst apparatus 500 as is shown in FIG. 6.

In FIG. 18, the photocatalyst apparatus 620 in the embodiment of the present invention, which differs from the photocatalyst apparatus 500 as is shown in FIG. 6, is provided with a diffusing gradation pattern composed of a light redirecting film 91 selectively coated on a second surface 30*b*, wherein the light redirecting film 91 is composed of plural light redirecting areas 91 (91-1, 91-2, . . . , 91-(n−1) and 91-n), each of the light redirecting areas 91 having variable width "w", which varies so as to enlarge from a first side 30*c* toward a second side 30*d* to form the diffusing gradation pattern.

Therefore, the diffusing gradation pattern can produce a uniform or even surface brightness in the first surface 30*a*and each of the photocatalytic optical fibers 100 implanted in separate or different position on an adhesive film 60 can receive substantially equal brightness of light "L" from at least one light source 40 positioned near the first side 30*c*.

The reflector film 80 may be formed to cover entirely the selectively coated light redirecting film 91 and the second surface 30*a* without the film 91 in order to reflect light "L" transmitting inside the transparent substrate 30 upwardly.

More explanation in regards to FIG. 18 is as much as possible omitted or simplified herein, since the explanation of like or similar elements designated by the same reference numeral or character has been described hereinbefore (See e.g. FIG. 6.)

Figure 19:
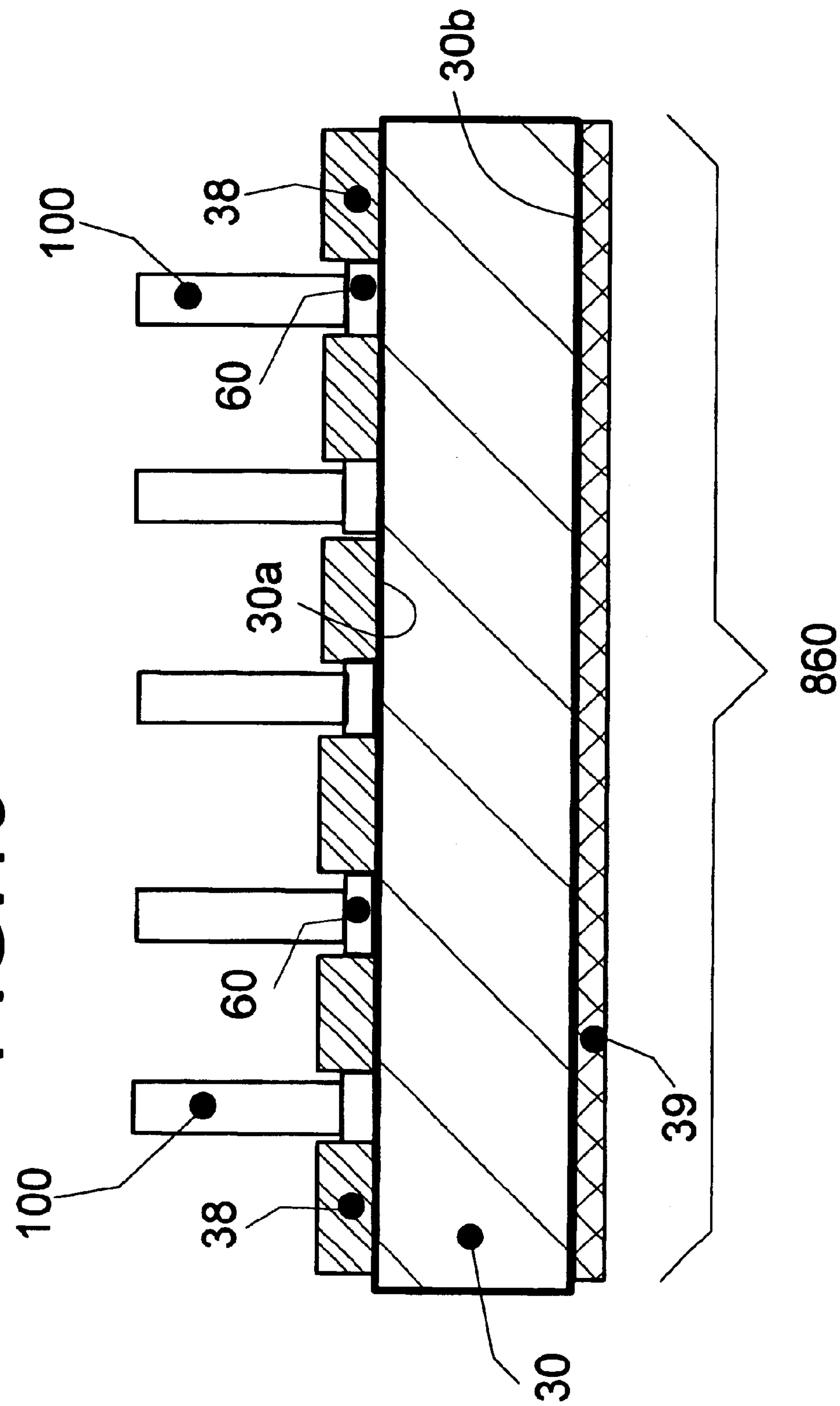
FIG. 19 is a cross sectional view of an other preferred embodiment of the present invention, showing a photocatalyst apparatus 860 having dotted adhesive films on a substrate.

Referring to FIG. 19 showing the other preferred embodiment of the present invention, a photocatalyst apparatus 860 is a further modified version of the photocatalyst apparatus 200 as is shown in FIG. 3.

In FIG. 19, the photocatalyst apparatus 860 may be composed of a transparent substrate 30 (having a first surface 30*a* and a second surface 30*b*, an adhesive film 60 disposed selectively on the first surface 30*a*), plural photocatalytic optical fibers 100 disposed on the adhesive film 60, a first light reflector film 38 disposed selectively on the first surface 30*a* and a second light reflector film 39 disposed on the second surface 30*b*.

The adhesive film 60 may have plural adhesive dotted areas for fixing or attaching the photocatalytic optical fibers 100 at each light input end thereof to the first surface 30*a* corresponding to the adhesive dotted areas. The first light reflector film 38 and the photocatalytic optical fibers 100 are selectively disposed on separate or different portions of the first surface 30*a*. The first light reflector film 38 prevents incident light the from leaking outside the first surface 30*a*, light reflected at the first light reflector film 38 goes downwardly, then its light is reflected at the second light reflector film 39 to redirect upwardly and the photocatalytic optical fibers 100 can receive some redirected light.

Therefore, the photocatalytic optical fibers 100 at each light input end can effectively receive light transmitted inside the transparent substrate 30 whose light is emitted from light source/sources positioned near the first and/second side. Accordingly, the photocatalyst apparatus 860 exhibits such an advantage that light from light source/sources are effectively used with a minimum loss.

Figure 20:
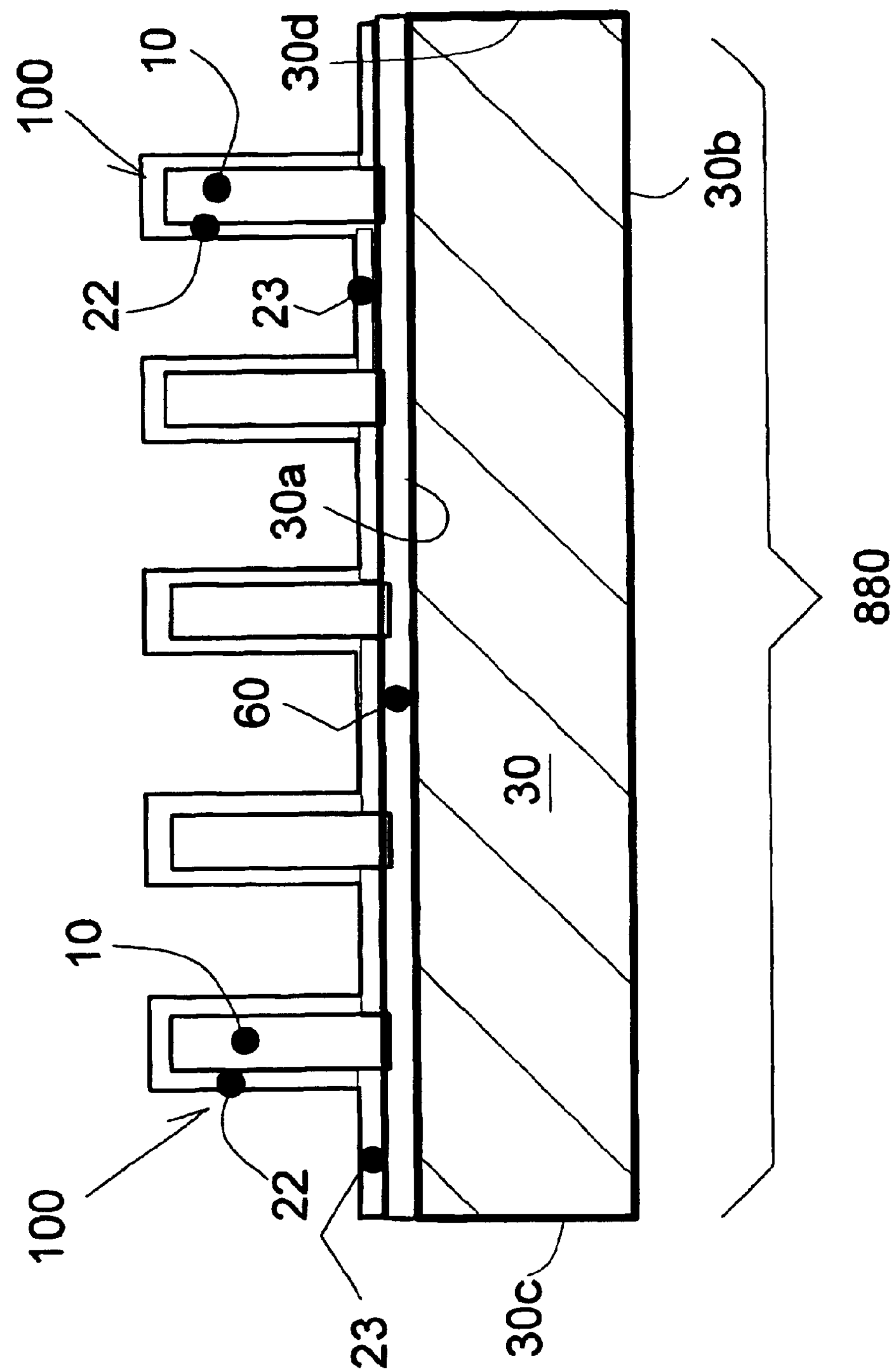
FIG. 20 is a cross sectional view of other preferred embodiment of the present invention, showing a photocatalyst apparatus 880.

Referring to FIG. 20 showing the other preferred embodiment of the present invention, a photocatalyst apparatus 880 includes a transparent substrate 30 having a first surface 30*a* and a second surface 30*b*, a transparent adhesive film 60 disposed on the first surface 30*a*, a plurality of photocatalytic optical fibers 100 fixed/attached on the adhesive film 60 to project or extend out from the first surface 30*a* and a photocatalyst film or layer 23 disposed selectively on the adhesive film 60 where no photocatalytic optical fibers 100 exist.

The photocatalyst apparatus 880 may be preferably manufactured or fabricated according to the following steps: (1) preparing the transparent substrate 30 having the first surface 30*a* and the second surface 30*b* and preparing plural bare optical fibers each composed of a core without a photocatalytic clad as a first step; (2) coating an adhesive in an uncured state or softened state to the first surface 30*a* to form an adhesive film 60 on the surface 30*a* by a conventional coating method such as a splaying, printing, immersing as a second step; (3) fixing or attaching the bare optical fibers 10 to/onto the adhesive film 60 in the uncured state or softened state such as to project from the first surface 30*a* preferably by an electrostatic flocking process as a third step; (4) curing or hardening the uncured or softened adhesive film 60 by applying curing or hardening condition to the adhesive film 60 for fixing or attaching permanently the bare optical fibers 10 to/onto the adhesive film 60 as a fourth step; and (5) applying a photocatalyst material to the adhesive film 60 and the bare optical fibers 10 at the same time such as to coat a first photocatalyst film 23 on the first surface 30*a* and a second photocatalyst film 22 on the bare optical fibers 10 as a fifth step.

For the fifth step, a photocatalyst contained binder may be used, in which a plurality of photocatalyst as the photocatalyst material is dispersed in a transparent binder. The photocatalyst contained binder is coated onto the adhesive film 60 and the bare core optical fibers 10 at the same time by a conventional coating method such a spraying, immersing method. Instead of use of the photocatalyst contained binder, the photocatalyst material may be deposited onto the adhesive film 60 and the bare optical fibers 10 at the same by a chemical vapor deposition (CVD) method. The top ends (i.e. free end) of the core optical fibers 10 are coated with the photocatalyst film by the above method at the same time.

After the fifth step, the bare optical fibers 10 become photocatalytic optical fibers 100, each composed of the core 10 (i.e. bare optical fiber, core optical fiber) and the photocatalytic clad 22 (the second photocatalyst film) disposed on the core 10.

It is noted that, in the manufacture of the photocatalyst apparatus 880 as described in detail, the bare core optical fibers 10 are prepared at a first time and the photocatalytic optical fibers 100 are made by fixing or attaching the photocatalyst material 22 to the cores 10 after the bare core optical fibers 10 are fixed/attached to the substrate 30, and that the first photocatalyst film 23 and the second photocatalyst film (i.e: photocatalytic core) 22 are formed simultaneously.

In the photocatalyst apparatus 880, light from light source/sources introduced from the first and/or second sides 30*c*/30*d* into the transparent substrate 30 where the light is transmitted to reflect repeatedly in the interior thereof, at the same time, the light is leaked or output upwardly from the first surface 30*a* (via the adhesive film 60) to allow the photocatalytic optical fibers 100 to receive the light at the light input end thereof.

Then, the light introduced or input from the light input ends of the photocatalyst optical fibers 100 into the cores 10 is transmitted toward the free ends of the fibers 100 and is gradually leaked or output from the cores 10 to the first photocatalyst film (i.e. the photocatalytic clads) 22, thereby the photocatalytic clads 22 is irradiated by the light. At the same time, the second photocatalyst film 23 disposed on the substrate 30 is irradiated by the light leaked or output from the adhesive film 60 where no photocatalyst optical fibers 100 exist. Further, the top ends (i.e. free ends) of the fibers 100 (or clads 10) is irradiated by the light reached thereto.

In the photocatalyst apparatus 880, substantially all light leaked or output from all areas of the first surface 30*a* contribute to irradiate photocatalyst material so as to irradiate the photocatalytic optical fibers 100 and the second photocatalyst film 23. Accordingly, the photocatalyst apparatus 880 exhibits such an advantage that light from light source/sources are effectively used with a minimum loss.

Figure 21:
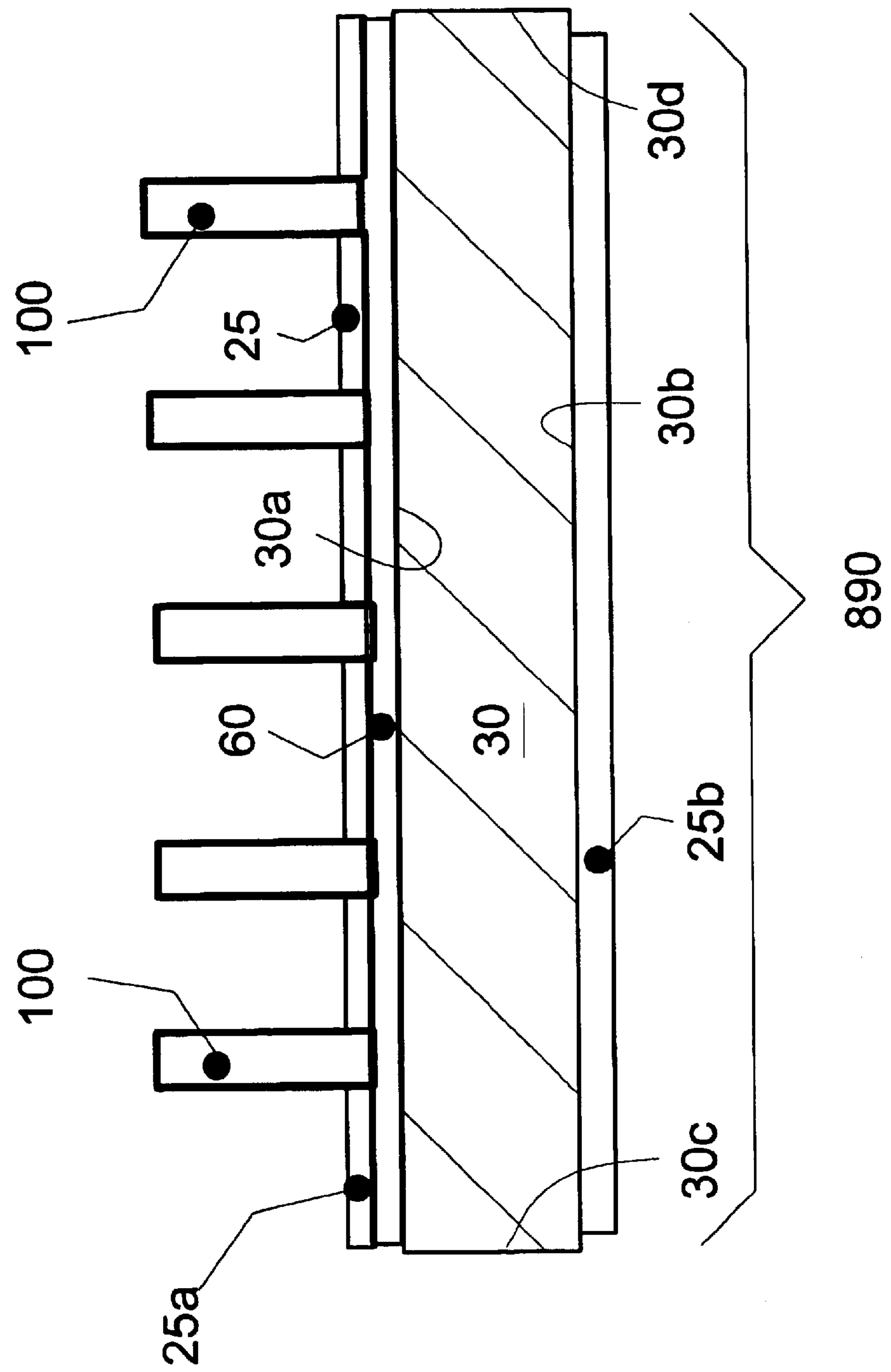
FIG. 21 is a cross sectional view of other preferred embodiment of the present invention, showing a photocatalyst apparatus 890 having a photocatalyst film on an adhesive film.

Referring to FIG. 21 showing the other preferred embodiment of the present invention, a photocatalyst apparatus 890 is basically equal or similar to the photocatalyst apparatus 200 as is shown in FIG. 1 and may be additionally provided with a first photocatalyst film 25*a* and/or a second photocatalyst film 25*b* disposed respectively on the adhesive film 60 and the second surface 25*b*. The photocatalyst film 25 may be preferably formed on the adhesive film 60 in the areas where the photocatalytic optical fibers do not exist, while the photocatalytic optical fibers 100 are disposed on the dotted areas of the adhesive film 60 where the photocatalyst film 25 does not exist.

The photocatalyst apparatus 890 may be preferably manufactured or fabricated according to the following steps: (1) preparing the transparent substrate 30 having the first surface 30*a* and the second surface 30*b* and preparing the plural photocatalytic optical fibers 100 each composed of a core and a photocatalytic clad to cover the core as a first step; (2) coating an adhesive in an uncured state or softened state to the first surface 30*a* to form an adhesive film 60 on the surface 30*a* by a conventional coating method such as a splaying, printing, immersing as a second step; (3) fixing or attaching the photocatalytic optical fibers 100 to/onto the adhesive film 60 in the uncured state or softened state such as to project from the first surface 30*a* preferably by an electrostatic flocking process as a third step; (4) applying a plurality of photocatalyst particles as a photocatalyst material to/onto the uncured or softened adhesive film 60 such as to attach the photocatalyst particles thereon as a fourth step; and curing or hardening the adhesive film 60 by applying a curing or hardening condition to thereof, wherein the adhesive film 60 attaches permanently the photocatalytic optical fibers 100 and the photocatalyst particles at the same time, as a fifth step, thereby the first photocatalyst film or layer 25*a* is formed on the adhesive film or layer 60. The second photocatalyst film or layer 25*b* may be disposed on the second surface, before the above step (1) or after the above step (4).

The photocatalytic optical fibers 100 and/or the photocatalyst particles are preferably fixed/attached to/onto the adhesive film 60 by an electrostatic flocking process as described hereinbefore. That is, after the photocatalytic optical fibers 100 are electro-statically fixed/attached to/onto the adhesive film 60 in an uncured or softened state by the electrostatic flocking process, the photocatalyst particles are electro-statically fixed/attached to/onto the adhesive film 60 in the uncured or softened state by the same or similar process. After curing or hardening the adhesive film 60 in the uncured or softened state, the photocatalyst apparatus 890 has been manufactured so that the adhesive film 60 attach or fix permanently the photocatalytic optical fibers 100 and the photocatalyst particles on the separate or different areas of the adhesive film 60 to each other. The photocatalyst film 25 obtained by the above method is formed mainly on a substantially surface area of the adhesive film 60 with the photocatalyst particles.

In the photocatalyst apparatus 890, each of the photocatalytic optical fibers 100 is not provided with a photocatalyst on a top i.e. free end of each photocatalytic optical fiber because a photocatalytic optical fiber with a very long length has been preliminarily cut to a plurality of photocatalytic optical fibers 100 with shot length having no photocatalyst on the top end. However the photocatalyst is preferably. disposed on the top end. For example, after fixing or attaching the photocatalytic optical fibers 100 to the first surface 30*a* of the substrate 30 by the adhesive layer 60, the top ends of the photocatalytic optical fibers 100 may be coated with a photocatalyst contained adhesive. Alternatively, the top ends of the photocatalytic optical fibers 100 may be coated with an adhesive in an uncured or softened state, photocatalyst particles may be fixed/attached to the top end, and then the adhesive in an uncured or softened state may be cured or hardened.

In the photocatalyst apparatus 890 as well as the photocatalyst apparatus 880, substantially all light leaked or output from all areas of the first surface 30*a* contribute to irradiate photocatalyst material so as to irradiate the photocatalytic optical fibers 100 and the second photocatalyst film 23. Accordingly, the photocatalyst apparatus 890 exhibits such an advantage that light from light source/sources are effectively used with a minimum loss.

Figure 22:
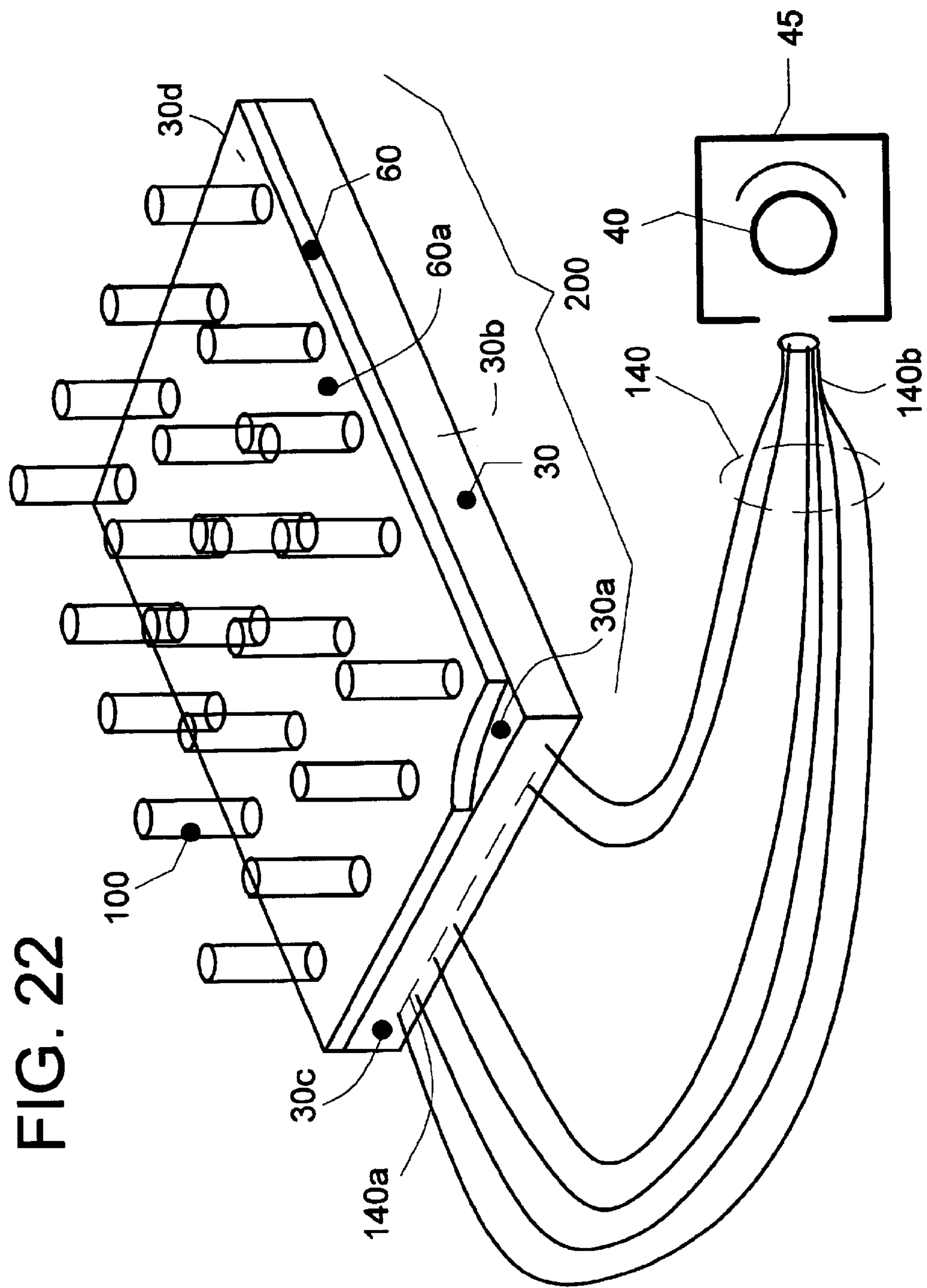
FIG. 22 is a conceptual and schematic perspective view of other preferred embodiment of the present invention, showing a photocatalyst apparatus 200 in FIG. 1 and an optical fiber cable 140 for delivering light from a light source to the photocatalyst apparatus 200.

Referring to FIG. 22 showing the other preferred embodiment of the present invention, the light source 40 housed in a lamp house 45 is disposed at any location distant from the photocatalyst apparatus 200 wherein the photocatalyst apparatus 200 itself is described in detail in FIG. 1 and FIG. 3, while the light source 40 is disposed a the vicinity of the side 30*c* of the transparent substrate 30 in FIG. 1 and FIG. 3.

In this embodiment, a plurality of conventional optical fibers 140 without photocatalyst for use in general light delivery are used wherein the conventional optical fibers 140 are provided with light output ends 140*a* and light input ends 140*b*. The light output ends 140*a* are disposed at the vicinity of the first side 30*c* of the transparent substrate 30 so that the light output ends 140*a* may be arranged in a substantially linear array corresponded to a shape of the first side 30*a* having a substantially linear or striped face. The light input ends 140*b* are disposed at the vicinity of the light source 40 so that the light output ends 140*b* may be arranged in any shape (e.g. a substantially circular shape to bundle tightly together corresponded to a shape of the light source 40 (as is shown in FIG. 22).

Figure 23:
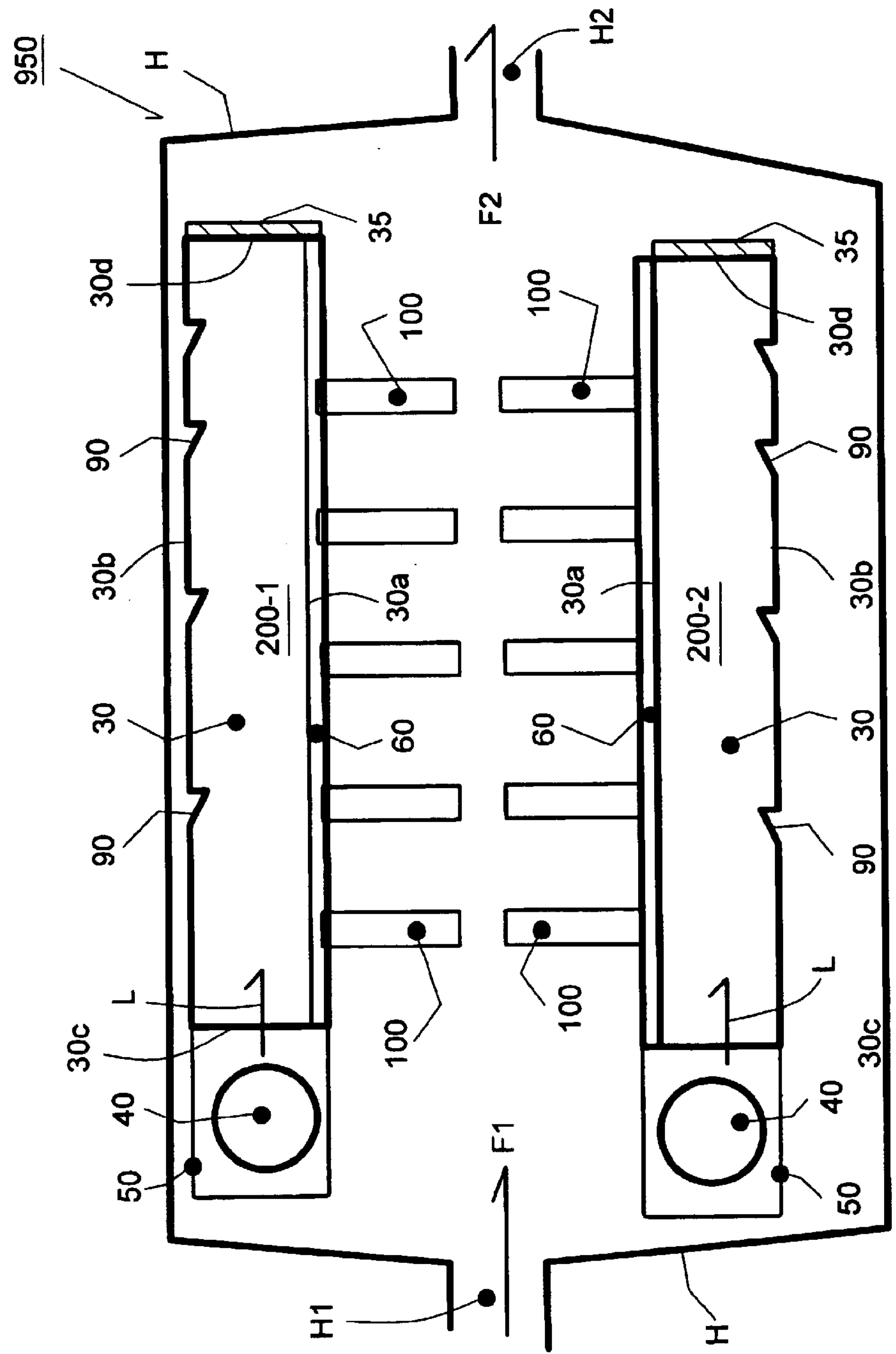
FIG. 23 is a cross sectional view of other preferred embodiment of the present invention, showing a photocatalyst reactor 950.

Referring to FIG. 23 showing the other preferred embodiment of the present invention, a photocatalyst reactor 950 is composed of a reactor housing "H" (i.e. enclosure, tank, vessel, container, casing, case) having a inlet (i.e. entrance) "H!", an outlet (i.e. exit) "H2" and a space (i.e. interior of the housing), a first and a second photocatalyst apparatuses. 200-1 and 200-2 and a first and a second light sources 40 positioned near each first side 30*c*. The photocatalyst apparatuses 200-1 and 200-2 and the light sources 40 are enclosed in the space of the housing "H".

The first or second photocatalyst apparatus 200-1 and 200-2 (200 as is shown in FIG. 3) is further composed of the first or second transparent substrate 30, the first or second photocatalytic optical fibers 100 standing on the surface 30*a*, the light redirecting means 90 on the second substrate 30*b* and the reflector film 35 at the second side 30*d*.

In the photocatalyst reactor 950 as is shown in FIG. 22, the first and second photocatalyst apparatuses 200-1 and 200-2 are enclosed within the reactor housing "H" so that the photocatalyst apparatuses 200-1 and 200-2 are positioned in parallel with each other and the first and second first surfaces 30*a* are positioned in a face-to-face relation, in which the first and second surfaces 30*a* (or the first and second photocatalytic optical fibers 100) are opposed to each other.

A fluid of upstream "F1" containing contaminants is input into the reactor housing "H" from the inlet "H1". The fluid introduced into the interior flows across the length of the first and second photocatalytic optical fibers 100. The fluid comes in contact with the first and second photocatalytic optical fibers 100, etc. Accordingly, the fluid containing contaminants is purified by a photocatalyst reaction and the fluid purified is output from the outlet "H2".

Figure 24:
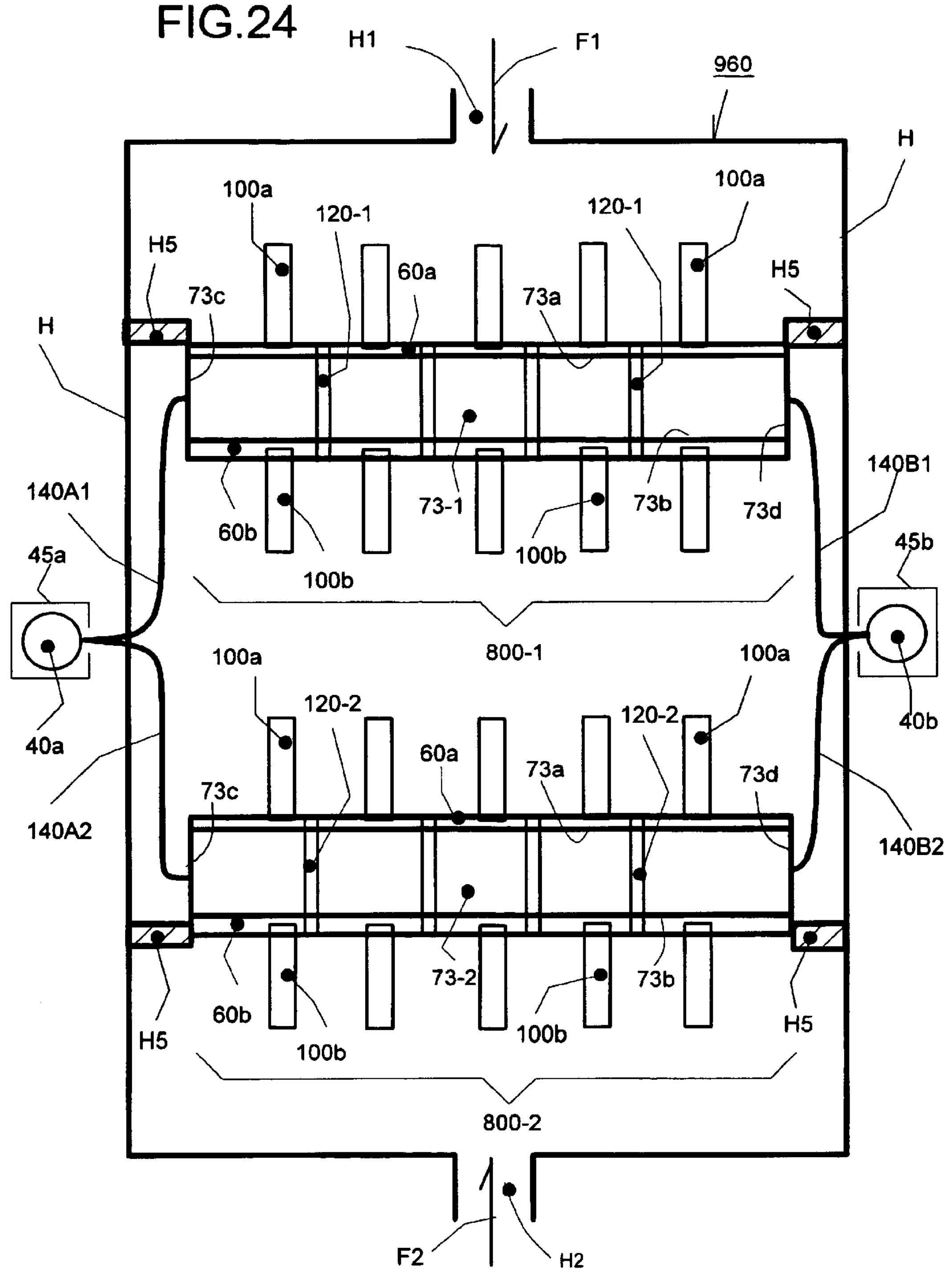
FIG. 24 is a cross sectional view of other preferred embodiment of the present invention, showing another photocatalyst reactor 960.

Referring to FIG. 24 showing the other preferred embodiment of the present invention, a photocatalyst reactor 960 is composed of a reactor housing "H" having a inlet "H!", an outlet "H2" and an interior (i.e. space) of the housing "H", a first and a second photocatalyst apparatuses 800-1 and 800-2 and a first and a second light sources 40*a* and 40*b* within light houses 45*a* and 45*b*. The photocatalyst apparatuses 800-1 and 800-2 are enclosed in the interior of the reactor housing "H", while the light sources 40*a* and 40*b*are positioned at the appropriate places in an exterior of the reactor housing "H". The fluid "F1" introduced into the interior flows along the length of the first and second photocatalytic optical fibers 100 and the fluid "F1" flows toward substantially perpendicular direction to the surface 73*a*.

Plural partitions "H5" are provided to contact closely with a wall of the reactor housing "H" and portions of the photocatalyst apparatuses 800-1 and 800-2 so that a fluid of an upstream "F1" can pass through only the openings 120 and can not pass between the wall of the housing "H" and the sides 73*c* and 73*d*.

The first and second photocatalyst apparatuses 800-1 and 800-2 are respectively further composed of a first and a second transparent substrate 73-1 and 73-2 each having a first surface 73*a*, a second surface 73*b*, a first side 73*c*, a second side 73*d*, a first and a second photocatalytic optical fibers 100*a* and 100*b* extending out from on the surface 73*a* and 73*b*, a first and a second adhesive film 50*a* and 60*b* fixing or attaching the fibers 100*a* and 100*b* on the surface 73*a* and 73*b* and first and second openings 120-1 and 120-2 passing through a pair of the surfaces 73*a* and 73*b*.

The first and second light sources 40*a* or 40*b* housed in the light houses 45*a* and 45*b* is communicated with the first or second photocatalyst apparatus 800 through conventional optical fibers without photocatalyst 140A1, 140B1, 140A2 and 140B2 for use in general light delivery in such a way that the conventional optical fibers (140A1,140B1, 140A2 and 140B2) are interposed between the light sources (40*a* and 40*b*) and the substrates 73-1 or 73-2 at the sides 73*c* and 73*d* in order to introduce light from the light sources 40*a* and 40*b* into the transparent substrates 73-1 and 73-2.

In this case, the first and second light sources 40*a* or 40*b* can be installed at any optimum places in the exterior of the reactor housing "H" by use of the conventional optical fibers 140A1, 140B1, 140A2 and 140B2, therefore countermeasures for water-proof and/or leak proof of electricity in regards to the light sources 40*a* and 40*b* are eliminated, since the interior of the reactor housing "H" contains liquid or gas with liquid, both including dirty contaminants.

In the reactor housing "H", a pair of the photocatalyst apparatuses 800-1 and 800-2 is positioned in series with each other to make a multistage system for a direction of fluid flow so that the first substrate 73-1 are positioned in a face-to-face relation to the second substrate 73-2.

A fluid of the upstream "F1" containing contaminants is input (i.e. introduced) into the reactor housing "H" from the inlet "H1". At first, the fluid within the reactor housing "H" comes in contact with the first photocatalytic optical fibers 100*a* and the first surface 73*a* in the first photocatalyst apparatus 800-1. Next, after the flow passes through the first openings 120-1 of the substrate 73-1, the fluid comes in contact with the second photocatalytic optical fibers 100*b*, etc. in the same first photocatalyst apparatus 800-1. Likewise, the fluid reached to the second photocatalyst apparatus 800-2 comes in contact with the first photocatalytic optical fibers 100*a* and the second surface 100*b* through the second openings 120-2. Accordingly, the fluid of the upstream "F1" containing contaminants is purified by a photocatalyst reaction and the purified fluid is output from the outlet "H2" as a clean down stream "F2".

In all the embodiments of the present invention described hereinbefore, the photocatalyst apparatus receives light from the light source/sources, wherein the light source/sources are disposed at a vicinity of the side/sides of the transparent substrate, or wherein the light output end/ends of the conventional optical fiber/fibers are disposed at a vicinity of the side/sides of the transparent substrate while the light input end/ends of the same conventional optical fiber/fibers are disposed at any location distant from the same side/sides and the light source/sources are disposed at a vicinity of the same the light input end/ends. Further, the prism means for introducing light into the same transparent substrate may be additionally used in such a manner that the photocatalyst apparatus receives light from the light source/sources through the prism means or light from the light output end/ends of the conventional optical fiber/fibers through the prism means, as is shown in FIG. 25 and FIG. 26.

Figure 25:
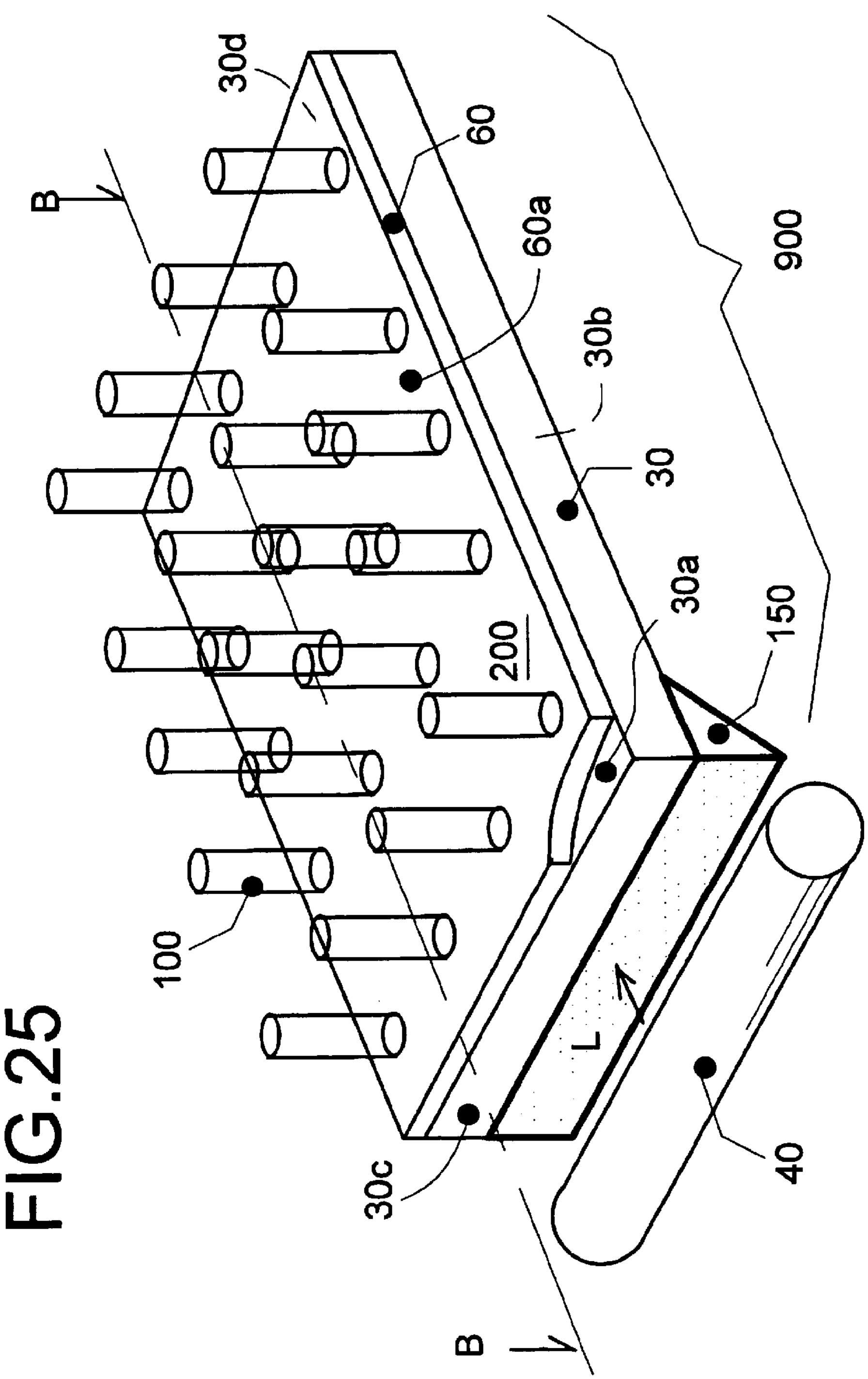
FIG. 25 is a conceptual and schematic perspective view of other preferred embodiment of the present invention, showing a photocatalyst apparatus 900 using prism means as an element thereof.
Figure 26:
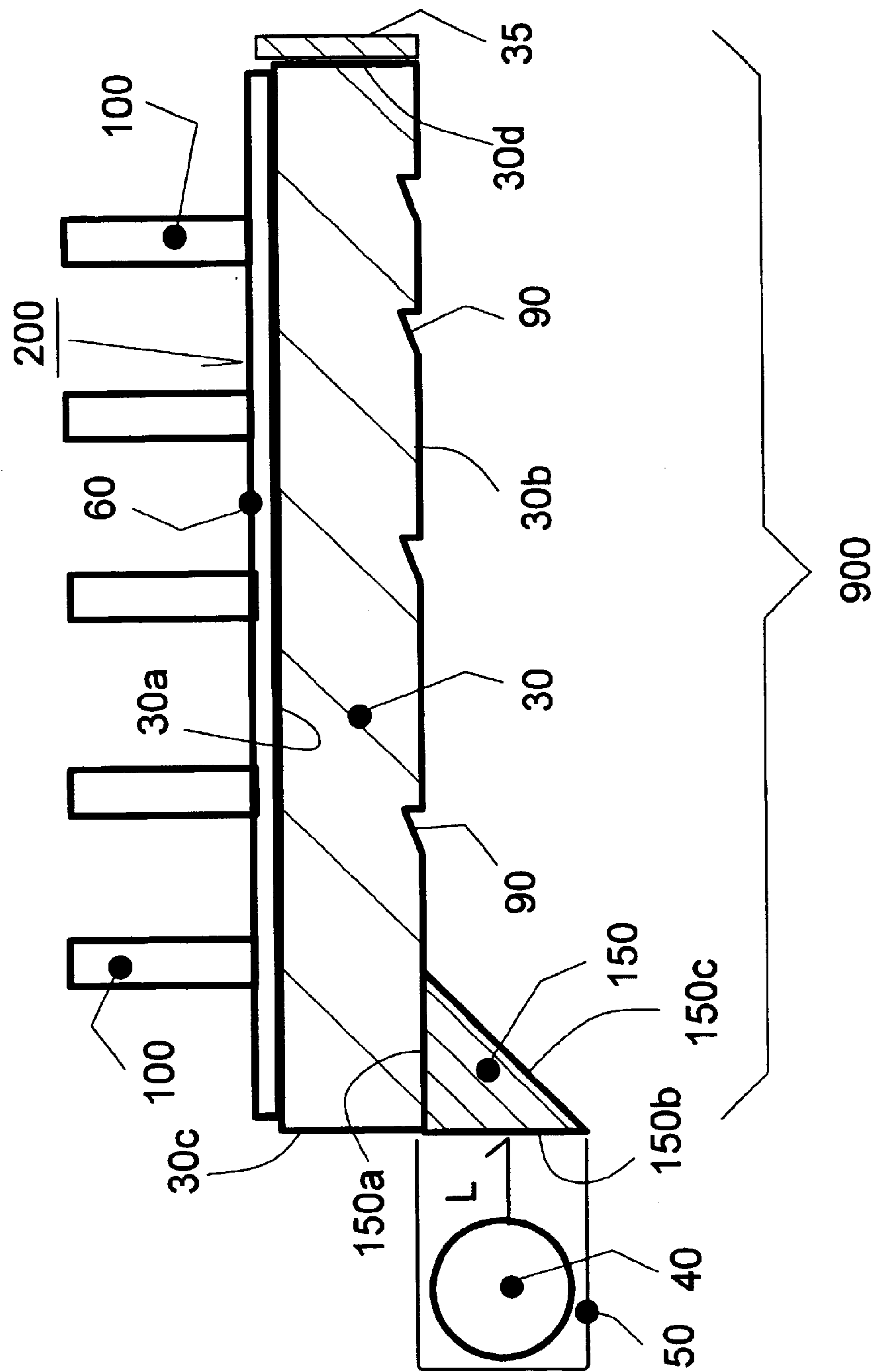
FIG. 26 is a cross sectional view taken away along the line B—B of FIG. 25.

Referring to FIG. 25 and FIG. 26, a photocatalyst apparatus 900 is composed of the photocatalyst apparatus 200 as is shown in FIG. 1 and FIG. 3 and a prism means 150, in which light from a light source 40 is introduced from a terminal part of peripheral area of a second surface 30*b* (or a first surface 30*a*) into an interior of the transparent substrate 30 through the prism means 150.

As is shown in FIG. 25 and FIG. 26, the prism means 150 is preferably composed of a prism with a triangular cross section having a first, a second and a third surfaces 150*a*, 150*b* and 150*c*. The prism 150 is disposed at a vicinity of, or disposed on the terminal part of peripheral area of the second surface 30*b* at the first surface 150*a* in face-to-face relation to the terminal part. The prism 150 is elongated along the width of the first side 30*c*. A linear light source 40 is disposed at the second surface 150*b* perpendicular to the first surface 150*a*, wherein light "L" from the linear light source 40 is received at the second surface 150*b* and introduced into the prism 150. Light introduced from the second surface 150*b* travels to the third surface 150*c* having an inclined face at which light is redirect toward the first surface 150*a*. Therefore, the transparent substrate 30 receives light "L" from the light source 40 through the prism 150 acting as means for changing a direction of light. A linear light array of doted light sources i.e. LED's may substitute for the linear light source 40.

More explanation in regards to FIG. 25 is as much as possible omitted or simplified herein, since the explanation of like or similar elements designated by the same reference numeral or character has been described hereinbefore (See e.g. FIG. 1 and FIG. 3.)

As an alternative of the embodiment as is shown in FIG. 25 and FIG. 26, an extra like prism in addition to the one prism 150 in FIG. 25 and FIG. 26 may be used when each light source is disposed at a pair of the sides of the transparent substrate. For example, in FIG. 6, the transparent substrate 72 necessitates to receive light from the first and second light sources 40*a* and 40*b* disposed at the first and second side 72*c* and 72*d*, in this case, a pair of prisms 150 may be disposed at, or near a pair of opposed terminals of the peripheral portion of the first surface 72*a* and a pair of light sources 40*a* and 40*b* may be disposed at, or near the a pair of the prisms 150 respectively, as is shown in and FIG. 26.

Figure 27:
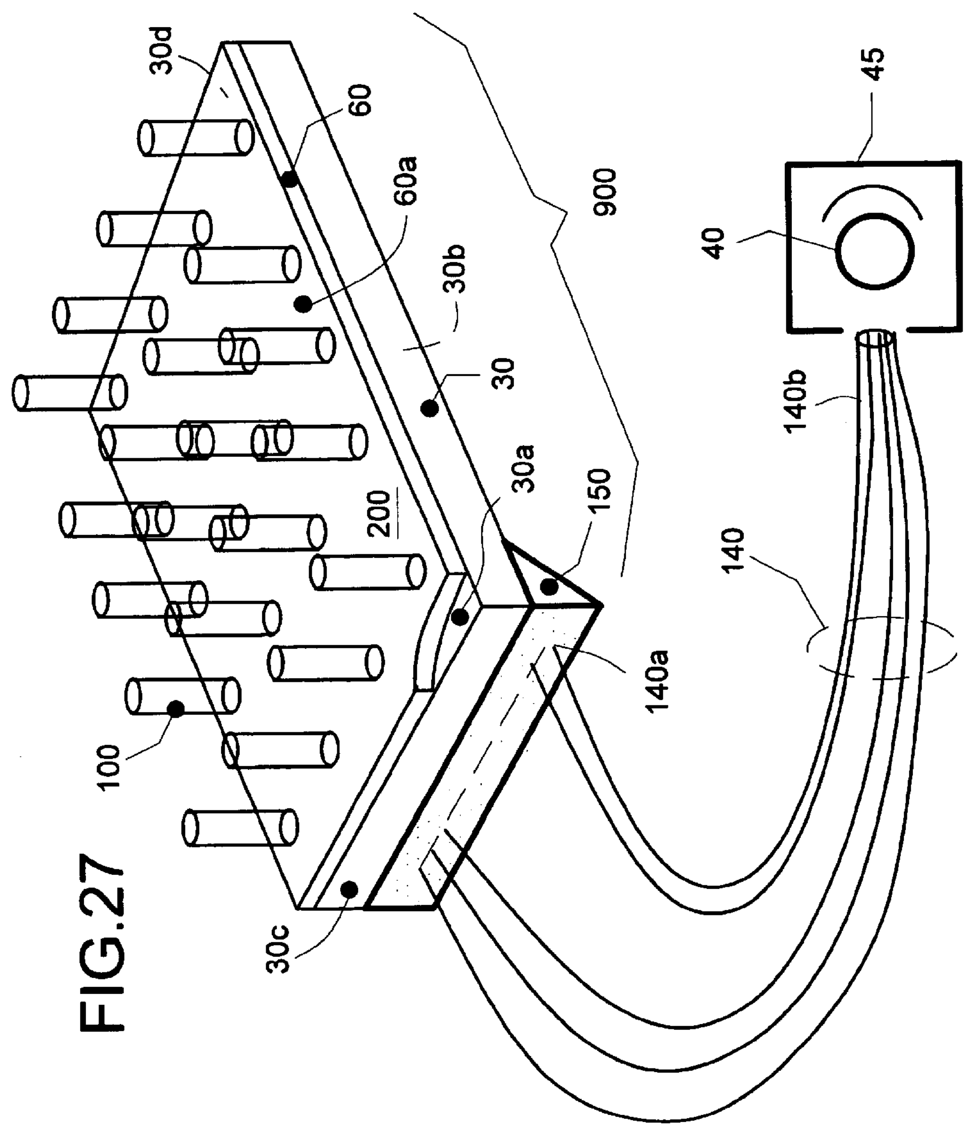
FIG. 27 is a conceptual and schematic perspective view of other preferred embodiment of the present invention, showing a photocatalyst apparatus 900 using prism means as an element thereof and an optical fiber cable 140.

Referring to FIG. 27 showing another embodiment of the present invention, this embodiment is another alternative of the embodiment as is shown in FIG. 25 and FIG. 26 wherein a plurality of conventional optical fibers 140 excluding photocatalyst may additionally be used so that the conventional optical fibers 140 are interposed between the prism 150 and the light source 40, wherein the light source 40 is disposed at any location distant from the prism 150.

In this embodiment as is shown in FIG. 27, the same photocatalyst apparatus 900 as is shown in FIG. 25 and FIG. 26 is used, which includes the prism 150 disposed at a vicinity of, or disposed on the terminal part of peripheral area of the second surface 30*b* at the first surface 150*a* of the prism 150 in face-to-face relation to the terminal part.

In FIG. 27, the conventional optical fibers 140 are provided with light output ends 140*a* and light input ends 140*b*. The light output ends 140*a* are disposed at the vicinity of the first side 30*c* of the transparent substrate 30 so that the light output ends 140*a* may be arranged in a substantially linear array corresponded to a shape of the first side 30*a* having a substantially linear or striped face. The light input ends 140*b* are disposed at the vicinity of the light source 40 so that the light output ends 140*b* may be arranged in any shape (e.g. a substantially circular shape to bundle tightly together corresponded to a shape of the light source 40 (as is shown in FIG. 27).

More explanation in regards to FIG. 27 is as much as possible omitted or simplified herein, since the explanation of like or similar elements designated by the same reference numeral or character has been described hereinbefore (See e.g. FIG. 1, FIG. 3, FIG. 25 and FIG. 26).

Figure 28:
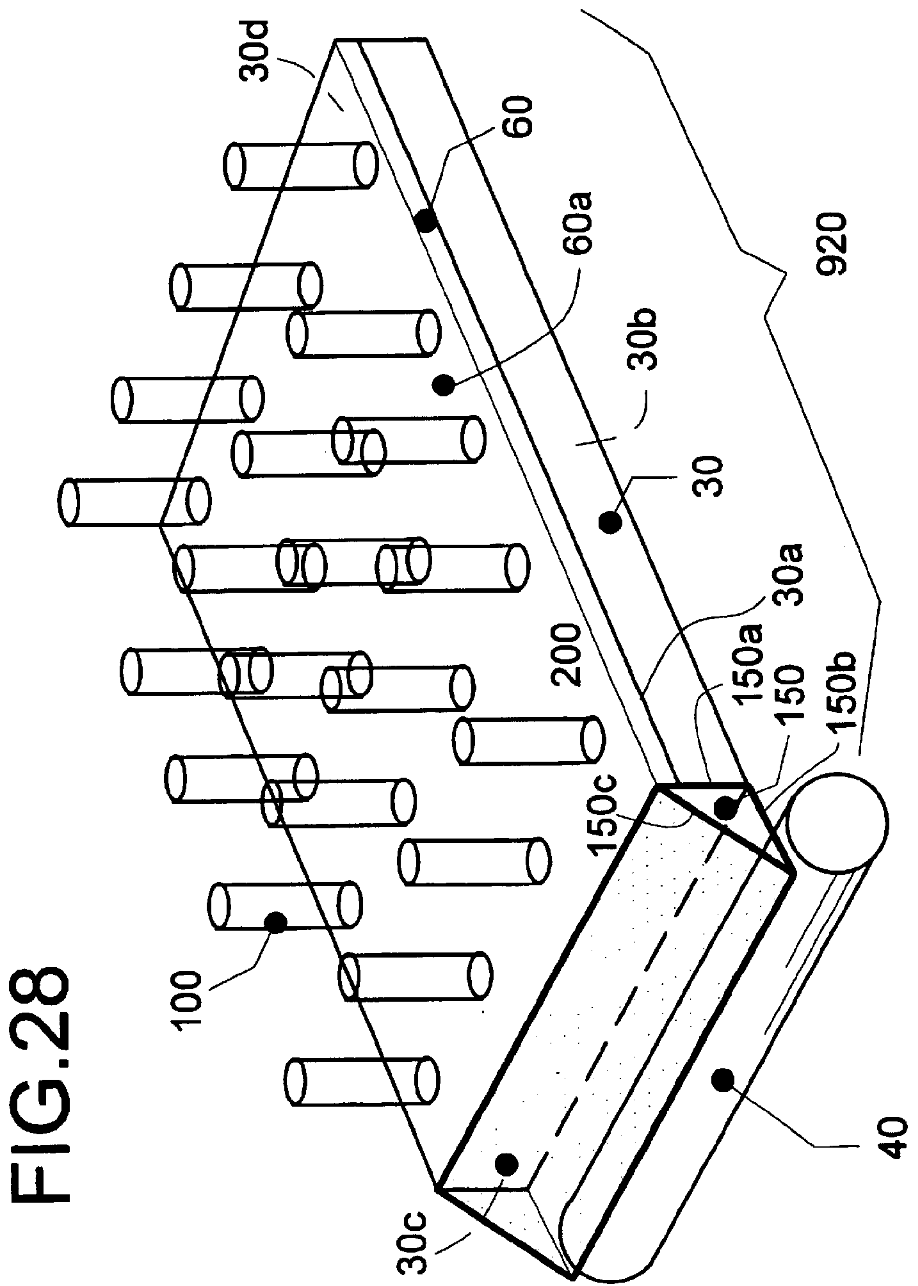
FIG. 28 is a conceptual and schematic perspective view of other preferred embodiment of the present invention, showing a photocatalyst apparatus 920 using prism means as an element thereof.

Referring to FIG. 28 showing still another embodiment of the present invention. In this embodiment, the prism means 150 as is shown in FIG. 25 and FIG. 26 is used for changing a direction of incident light and the prism 150 is disposed at the vicinity of the first side 30*c* of the transparent substrate 200.

In FIG. 28, a photocatalyst apparatus 920 is composed of a photocatalyst apparatus 200 as is shown in FIG. 1 and the prism 150 as is shown in FIG. 25 and FIG. 26. The photocatalyst apparatus 200 is composed of a transparent substrate 30 having first and second surfaces 30*a* and 30*b*, an adhesive film 60 on the first surface 30*a*, plural photocatalytic optical fibers 100 on the first surface 30*a* to project from the surface 30*a*. The prism 150 is a triangular body having a first, a second and a third surfaces 150*a*, 150*b* and 150*c* and elongated along the width of the first side 30*c* of the transparent substrate 30. The prism 150 is disposed at a vicinity of the first side 30*a* so that the first surface 150*a* of the prism 150 is positioned in face-to-face relation to the first side 30*c* of the transparent substrate 30. A linear light source 40 is disposed at the vicinity of the second surface 150*b* perpendicular to the first surface 150*a* of the prism 150. Therefore, the light source 40 can be positioned under the substrate 30 and the prism 150.

In the embodiment in FIG. 28, the conventional optical fiber/fibers 140 for light delivery use in FIG. 27 may be used so as to interpose them between the second surface 150*b* of the prism and the light source 40, thereby the light source 40 can be positioned at any proper location.

In the various embodiments as is shown in FIG. 1 and FIG. 2 through FIG. 28, it is disclosed that the photocatalyst apparatus comprises the substrate (e.g. 30, 70, 72, 73, 75, 77) and the plurality of the photocatalytic optical fibers 100 extending out from the surface, the substrate is made of substantially transparent material, the substantially transparent substrate receives light at the side/sides of the substrate or at the peripheral portion/portions of the surface to introduce into the substrate and light introduced is input into the photocatalytic optical fibers 100 at each end on the way of transmission by repeated reflection. However, the present invention is not limited to the embodiments hereinbefore. As light for activating the photocatalytic optical fibers 100, other light may be utilized instead, such as light from light sources for general lighting and natural light from sun shine.

Namely, (1) a light source 40 may be positioned in front of the first surface 30*a* of the substrate 30 where the photocatalytic optical fibers 100 exist thereon, wherein the photocatalytic optical fibers 100 receive from light not passed through the substrate 30 at the free ends thereof or (2) a light source 30 may be positioned in the rear of the second surface 30*b* opposed to the first surface 30*a*, wherein the photocatalytic optical fibers 100 receive from light passes through the substrate 30 at the free ends thereof.

Figure 29:
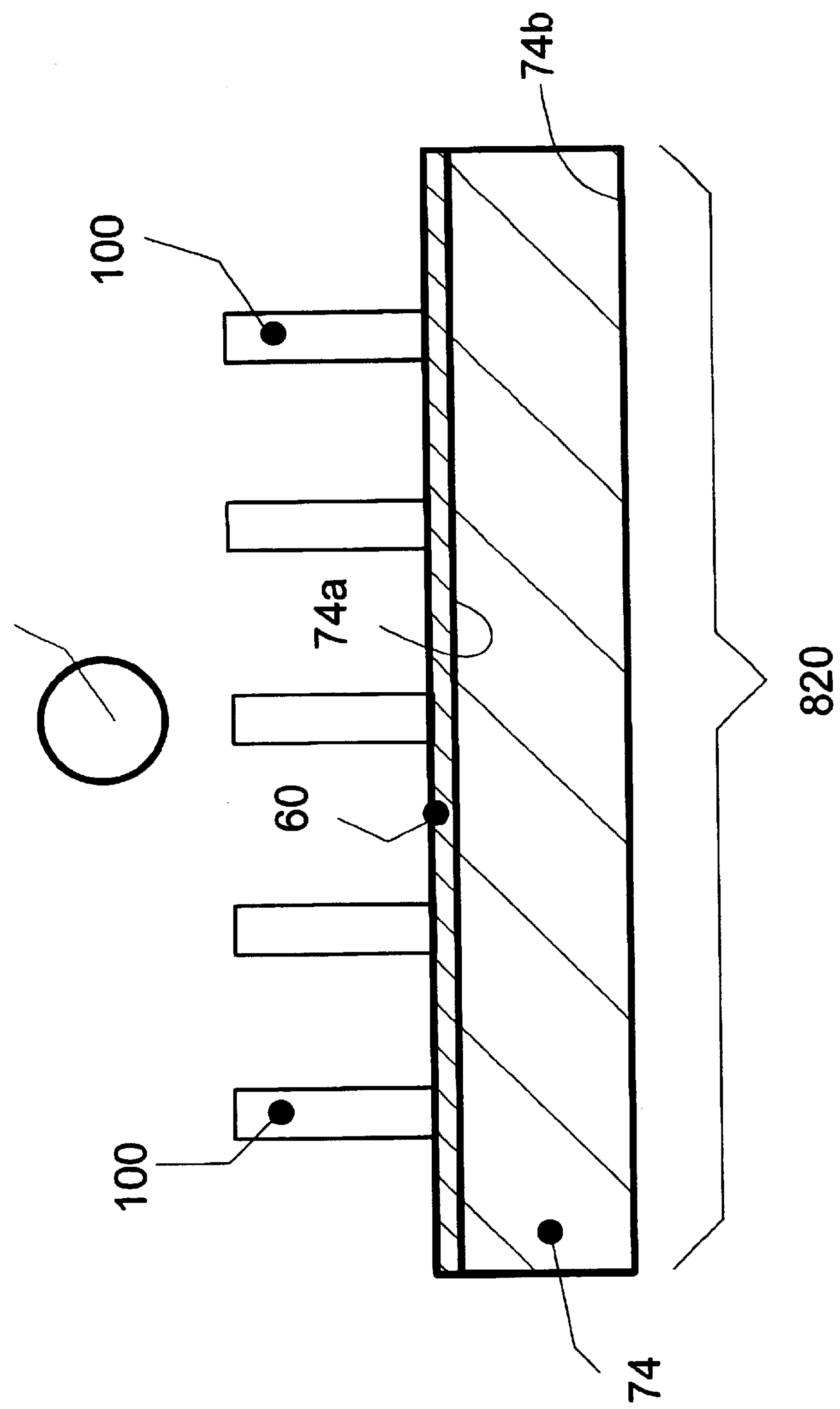
FIG. 29 is a cross sectional view of other preferred embodiment of the present invention, showing another method for irradiating a photocatalyst apparatus 820 by a front lighting, in which the photocatalytic optical fibers receive light at free ends thereof.

Referring to FIG. 29 showing still another embodiment of the present invention, a photocatalyst apparatus 820 is composed of a substrate 74 made of non-transparent (i.e. opaque) or substantially transparent material having a first and a second surface 74*a* and 74*b*, an adhesive film 60 and a plurality of photocatalytic optical fibers 100 fixed/attached to the first surface 74*a* by the adhesive e film 60 to expand out from the first surface 74*a*. The adhesive film 60 preferably includes a particulate photocatalyst material wherein a plurality of particulate photocatalyst material is dispersed in the adhesive film 60. The substrate 74 may be widely selected from organic materials such as artificial polymer, resin or inorganic materials such as glass, metal, ceramic.

Further, the substrate 74 may be composed of rigid (i.e. hard) or flexible members, wherein the flexible members include textiles such as woven or non-woven fabrics, polymer sheets or films, elastomer plate, sheets or films such as rubber and flexible metal plate, films or foils.

In FIG. 29, the photocatalytic optical fibers 100 receive light at the fee ends (i.e. top ends) thereof, such as light from the light source 40 for i.e. general lighting/illumination positioned in the front of the photocatalytic optical fibers 100 and the first surface 74*a* and solar light, wherein the above light comes directly to the photocatalytic optical fibers 100 and the surface 74*a* without passing through the substrate 74.

Figure 30:
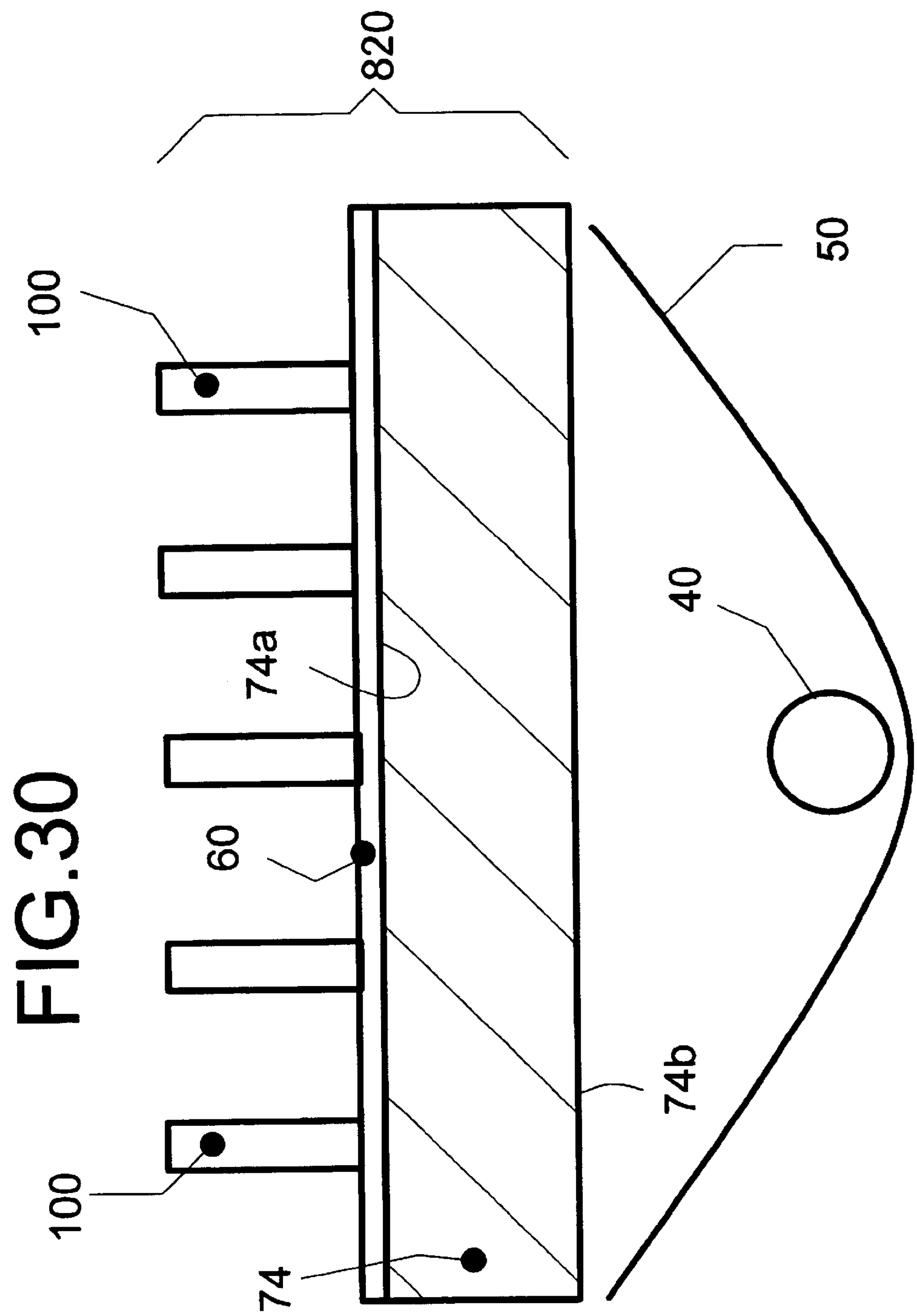
FIG. 30 is a cross sectional view of other preferred embodiment of the present invention, showing still another method for irradiating a photocatalyst apparatus 820 by a rear lighting, in which the photocatalytic optical fibers receive light at fixed ends thereof via a rear surface of a transparent substrate.

Referring to FIG. 30 showing a still another embodiment of the present, the same photocatalyst apparatus 820 as is shown in FIG. 29 is used except that the substrate 74 in FIG. 30 consists of substantially transparent materials. In FIG. 30, at least one light source 40 is may be positioned in the rear of the second surface 74*b* opposed to the first surface 30*a*, which differs from the embodiment in FIG. 29.

In FIG. 30, the photocatalytic optical fibers 100 receive light from the light source 40 through the transparent substrate 74 in such a manner that light incident from the second surface 74*b* transmits into the transparent substrate and the photocatalytic optical fibers 100 receive the light at the light input ends (i.e. implanted ends, fixed ends).

Figure 31:
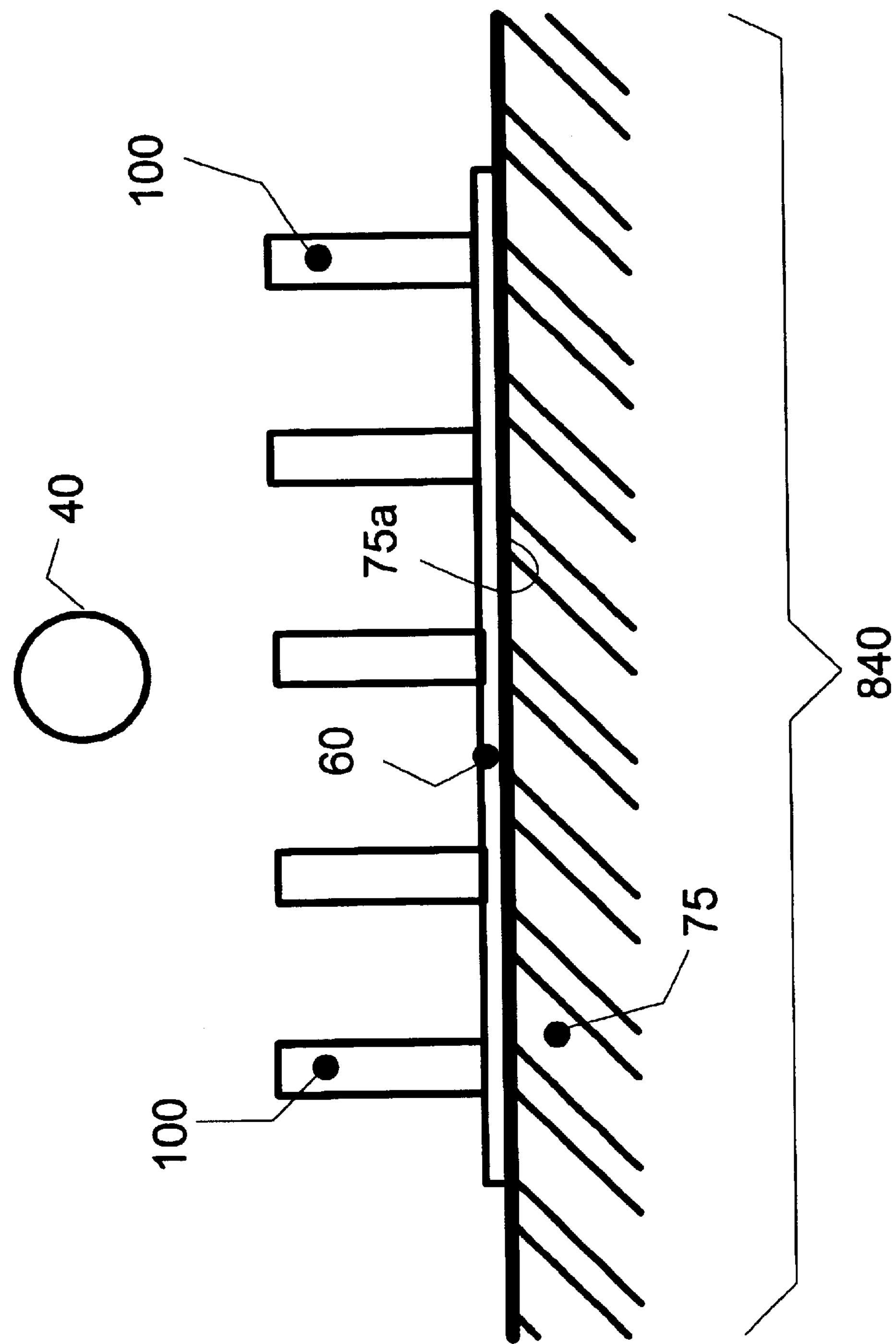
FIG. 31 is a cross sectional view of other preferred embodiment of the present invention, showing a photocatalyst apparatus 840, in which the substrate thereof is existing installations.

Referring to FIG. 31 showing a still another embodiment of the present, a photocatalyst apparatus 31 may be composed of a substrate 75 having a surface 75*a* and a plurality of photocatalytic optical fibers 100 fixed on the surface 75*a* by an adhesive film 60, wherein the substrate 75 may be an existing article, an existing installation or facility such as the sound proof walls of traffic roads, the interior or exterior walls of the buildings or houses, the ceilings or floors of the buildings or houses, which may be made of concrete, ceramic or plastic tiles, wall covering/paper to cover walls or ceilings, etc.

In FIG. 31, the photocatalytic optical fibers 100 may be attached or fixed to/onto the surface 75*a* by an adhesive 60 at the each site where such substrate 75 has been installed and may be processed preferably by an electrostatic flocking process using a movable or portable electrostatic flocking machine. The such kinds of movable or portable electrostatic flocking machine is typically composed of a high voltage electric power source and a handheld casing having a room capable of containing the fibers 100 and an outlet with plural openings to allow the fibers 100 to exit outside gradually and an electrode for giving electric charges to the fibers 100.

Figure 32:
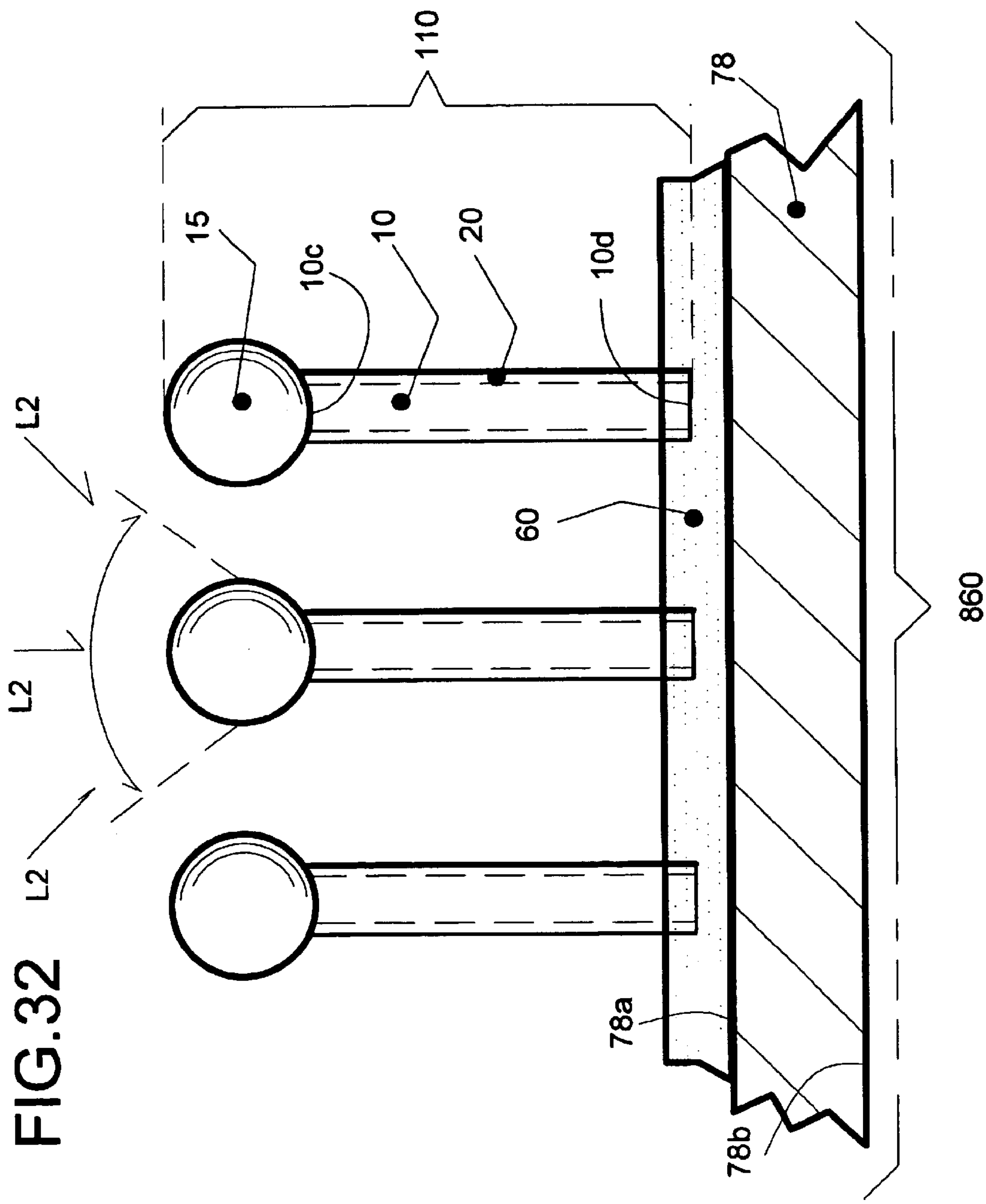
FIG. 32 is an enlarged cross sectional view of an other preferred embodiment of the present invention, showing a photocatalyst apparatus 860, in which each photocatalytic optical fiber 110 is provided with a light collector 15 at a free end of each photocatalytic optical fiber 100.
Figure 33:
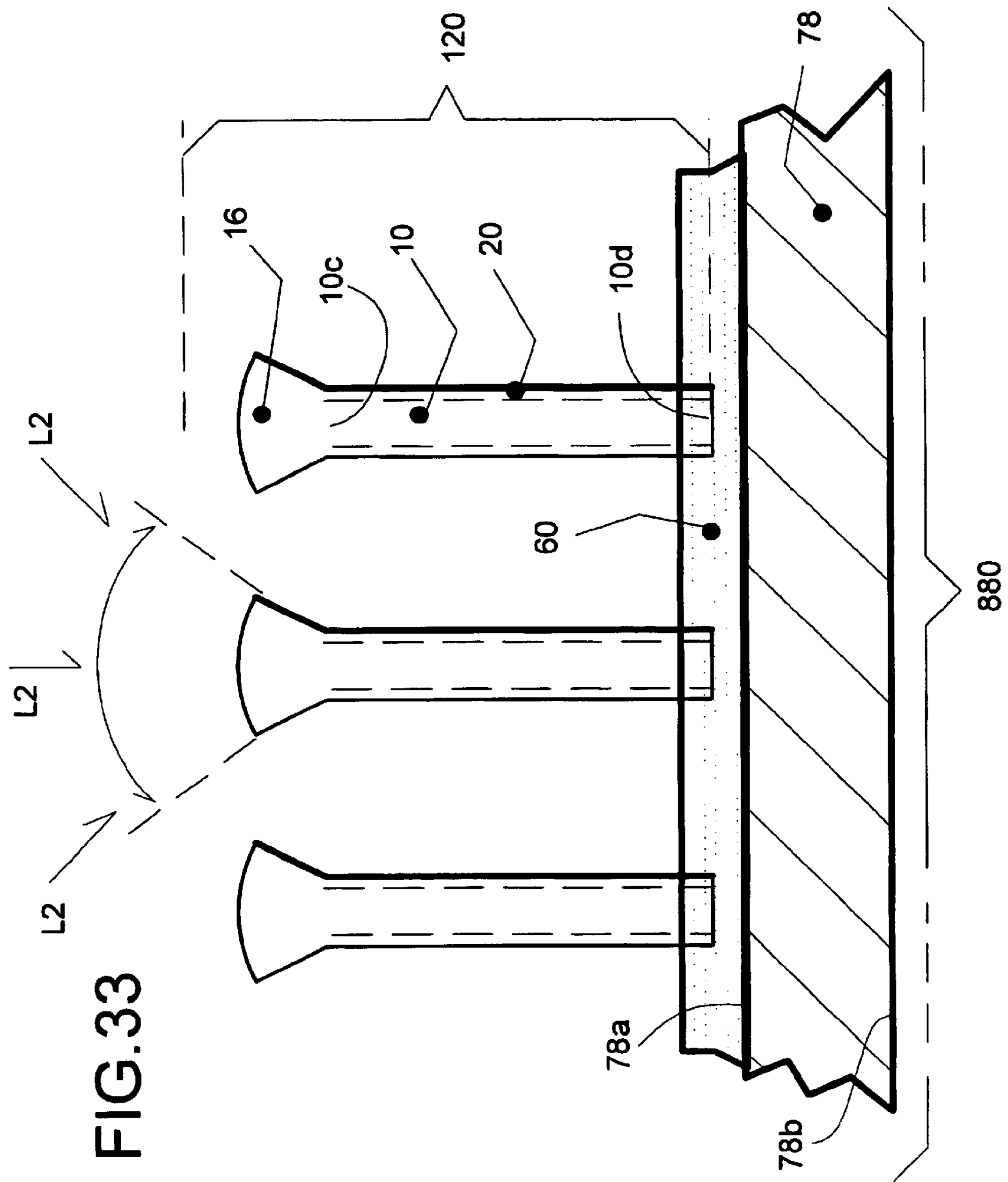
FIG. 33 is an enlarged cross sectional view of other preferred embodiment of the present invention, showing a photocatalyst apparatus 860, in which each photocatalytic optical fiber 120 is provided with another light collector 16 at a free end of each photocatalytic optical fiber 100.

Referring to FIG. 32 and FIG. 33 showing a still another embodiment of the present invention, a photocatalytic optical fiber 110 (FIG. 32) and 120 (FIG. 33) may be respectively provided with a light collector (i.e. light collecting means) 15 and 16 at a free end of the fiber 110 and 120, wherein the free end can receive light incident to it with a wider angle than the photocatalytic optical fiber 100 described herein before.

In FIG. 32, a photocatalyst apparatus 860 is composed of a substrate 78 having a surface 78*a*, an adhesive film 60 on the surface 78*a* made of substantially transparent or opaque material and a plurality of photocatalytic optical fiber 110, wherein each photocatalytic optical fiber 110 is composed of a core 10, a clad 20 to cover the core 10, a free end 10*c* (i.e. first end, light input end, top end), a light collector 15 disposed at the free end 10*c* and a fixed end (i.e. second end). The light collector 15 is made of like material of the core 10 and is composed of a condenser or condensing lens acting as a wide-angle lens having a substantially transparent and substantially spherical, circular, round, semi-circular or semi-round shaped body capable of introducing light "L2" in a wider angle into the core 10 than the photocatalytic optical fiber 100.

In FIG. 33, a photocatalyst apparatus 880 is composed of a substrate 78 having a surface 78*a*, an adhesive film 60 on the surface 78*a* made of substantially transparent or opaque material and a plurality of photocatalytic optical fiber 120, wherein each photocatalytic optical fiber 110 is composed of a core 10, a clad 20 to cover the core 10, a free end 10*c* (i.e. first end, light input end, top end), a light collector 15 disposed at the free end 10*c* and a fixed end (i.e. second end). The light collector 15 is made of like material of the core 10 and is composed of a condenser lens acting as wide-angle lens having a substantially transparent and substantially conic, funnel like or inverse pyramid shaped body capable of introducing light "L2" in a wider angle into the core 10 than the photocatalytic optical fiber 100.

Figure 34:
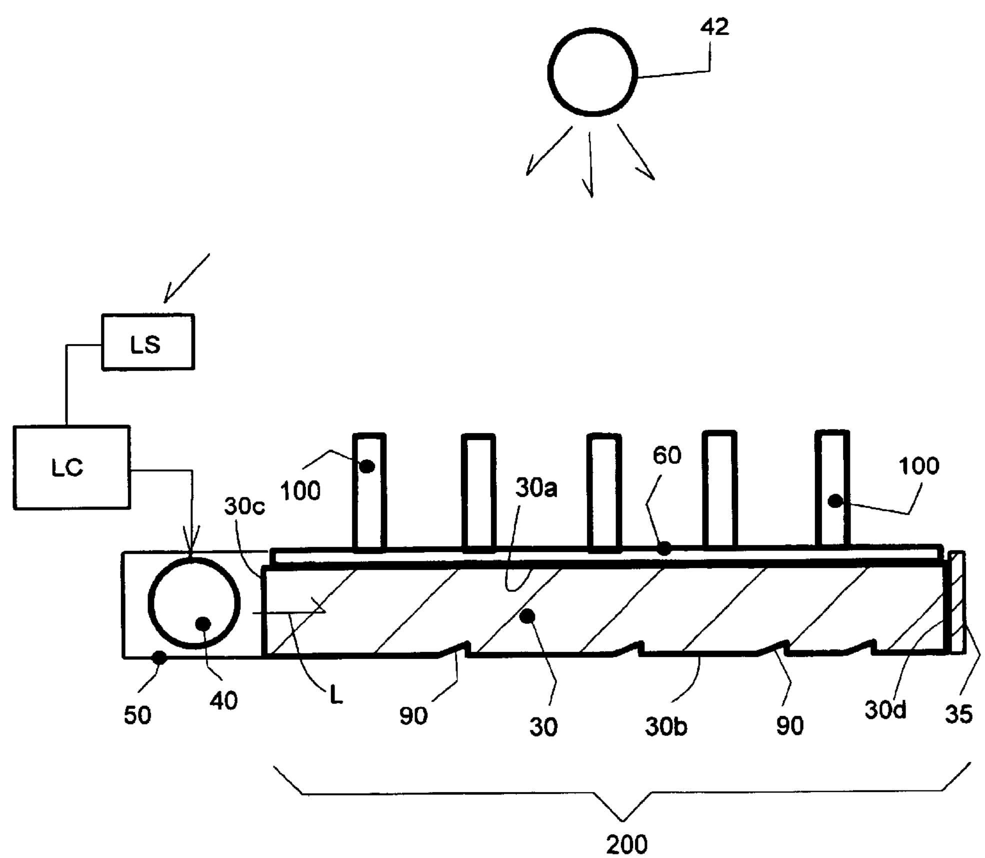
FIG. 34 is a cross sectional view including a conceptual block diagram of other preferred embodiment of the present invention, showing an automatic light control means for controlling a lighting of a light source disposed at a side of a substrate in response to ambient light.

Referring to FIG. 34 showing a still another embodiment of the present, the photocatalyst reactor includes an automatic light control device having a light source to irradiate the photocatalytic optical fibers, a brightness control device and a photo-sensor, wherein the brightness control device controls a brightness of the light source in response to an ambient light detected by the photo-sensor.

In FIG. 34*a*, the photocatalyst reactor may be composed of the photocatalyst apparatus 200 (as is shown in e.g. FIG. 1 and FIG. 3), a first light source 40 (disposed at the vicinity of the first side 30*c* of the substantially transparent substrate 30), a second light source 42 for generating an ambient light such as for use in a room lighting disposed in front of the photocatalytic optical fibers 100 (or 110 in FIG. 32, 120 in FIG. 33), an automatic lighting control device "LC" and a light sensor "LS". The lighting control device "LC" is electrically connected to the light sensor "LS" and the first light source 40, wherein the light sensor "LS" detects the ambient light from the second light source 42 and controls the first light source 40 to be switched on/off or to be changed in a brightness of light therefrom.

Figure 35:
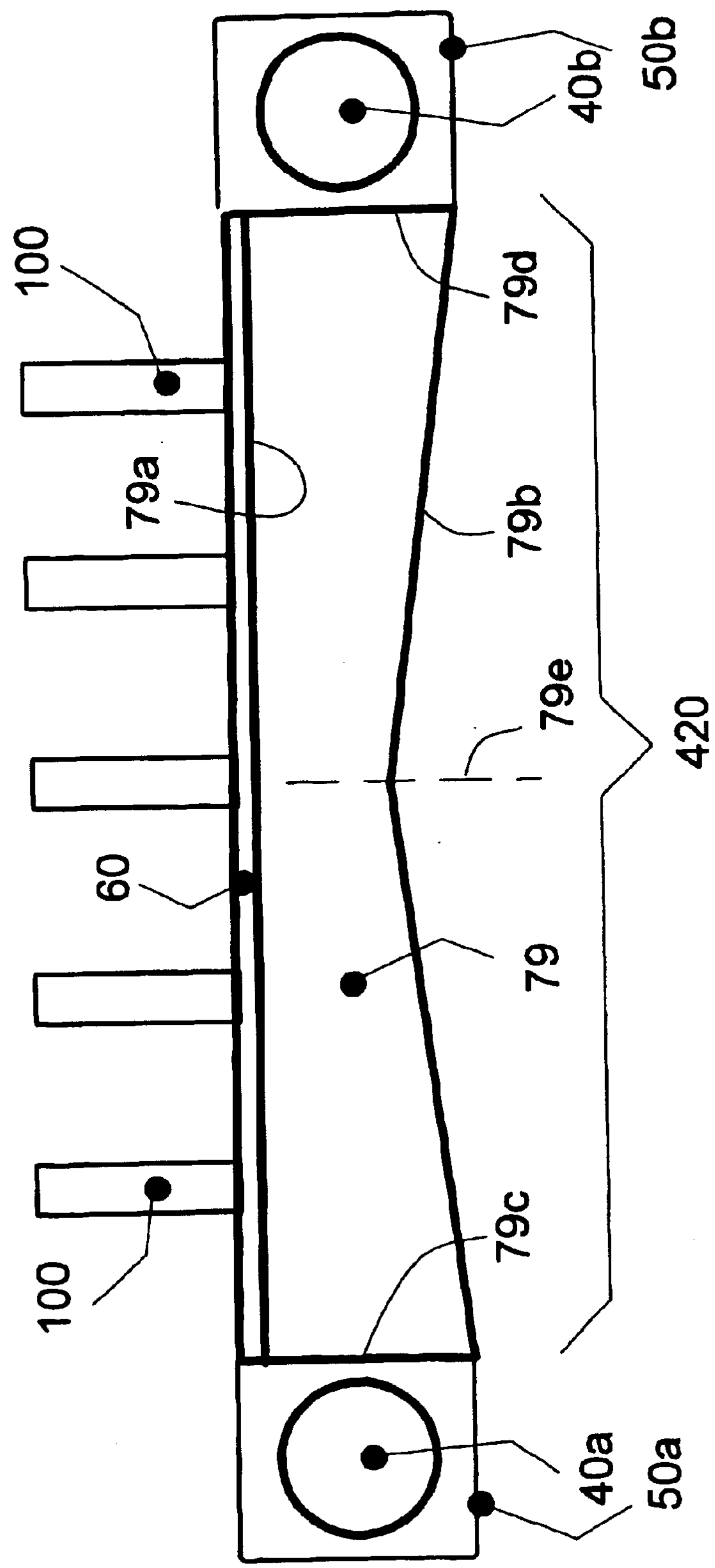
FIG. 35 is a cross sectional view of other preferred embodiment of the present invention, showing a photocatalyst apparatus 420 which is a modified embodiment of FIG. 5 or FIG. 8 having a taper like substrate.

In FIG. 35, when the second light source 42 is lit up or switched on, the light sensor "LS" detects light from the second light 42 and sends a first signal to the lighting control device "LC" to allow the first light source 42 to be unlit or switched off, while when the second light 42 is unlit or switched off, the light sensor "LS" does, not detect light from the second light source 42 and sends a second signal to the lighting control device "LC" to allow the first light source 42 to be lit or switched on.

The photocatalytic optical fiber 100, 110 and/or 120 may receive always light in such a way that the fiber 100 receives light from the fee ends when the second light 42 is lit up and the fiber 100, 110 or 120 receive light from the fixed ends when the first light 40*a* is lit up. In this case, therefore, the first light source 40*a* can be unlit or switched off when the room of the office or the home is bright enough, while the first light source 40 is automatically lit or switched on when the room of the office or the home is dark.

Referring to FIG. 35 showing a still another embodiment of the present invention, a photocatalyst apparatus 420 is composed of a substantially transparent substrate 79 having a first and a second surfaces 79*a* and 79*b*, a first and a second sides 79*c* and 79*d*, an adhesive film disposed on the first surface 79*a* and a plurality of photocatalytic optical fibers 100 fixed/attached to first surface 79*a* to project therefrom by the adhesive film 60.

In FIG. 35, the transparent substrate 79 is composed of a modified taper like member having a variable thickness so as to decrease gradually from the first side 79*c* toward a center 79*e* between the first and second sides 79*c* and 79*d* and gradually increase from the center 79*e* to the second side 72*d*, wherein the second surface 79*b* forms a substantially inverse "V" like shape while the first surface 79*a* forms a substantially straight line A first and a second light sources 42*a* and 42*b* with a light reflector 50*a* and 50*b* may be respectively positioned at the vicinity of the first and second sides 72*c* and 72*d*. The first and second light sources 42*a* and 42*b* may be respectively composed of a linear shape having a length elongated along a width of the first or second side 79*c* or 79*d*. Therefore, a uniform or even brightness can be produced in the first surface 72*a* and every photocatalytic optical fibers 100 can receive light with the uniform or even brightness at every light input ends of the photocatalytic optical fibers 100 fixed on the first surface 72*a*.

Figure 36:
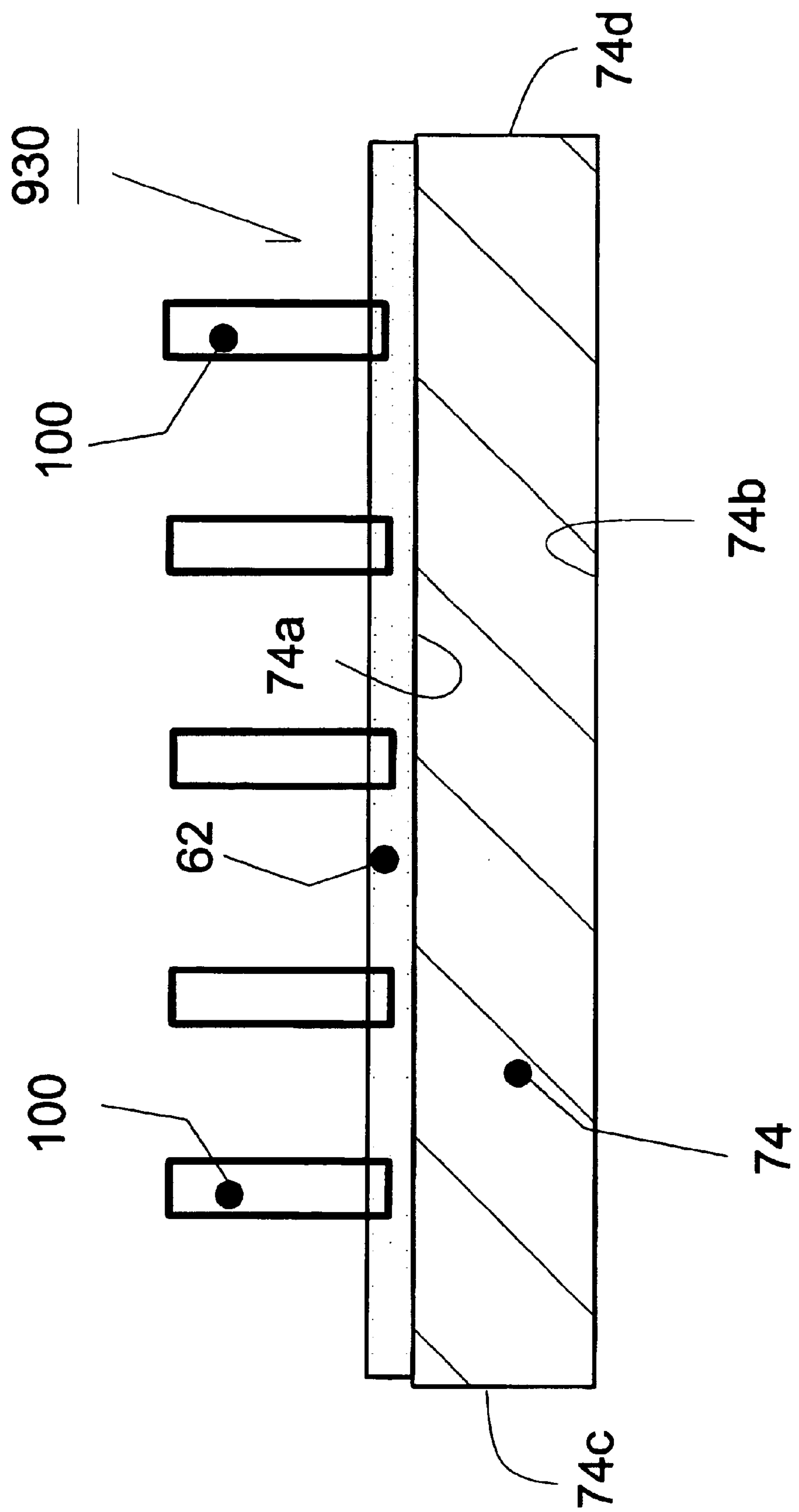
FIG. 36 is a cross sectional view of other preferred embodiment of the present invention, showing a photocatalyst apparatus 930 having a non-transparent substrate.

Referring to FIG. 36 showing other embodiment of the present invention, a photocatalyst apparatus 930 may be composed of a non-transparent or transparent substrate 74 (having a first and a second surfaces 74*a*, 74*b* and a first and a second sides 74*c*, 74*d*) a photocatalytic adhesive film (or layer) 62 disposed entirely on the first surface 74*a* and plural photocatalytic optical fibers 100 disposed on the photocatalytic adhesive film 62 to elongated from the first surface 74*a*. The photocatalytic adhesive film 62 contains plural photocatalyst particulates (i.e. photocatalyst particles) therein and/or thereon.

In FIG. 36, the substrate 74 may be non-transparent (i.e. opaque) or substantially transparent material. When the transparent substrate 74 is used, a light source may be positioned at the side or sides 74*c*, 74*d*, in the front of the first surface 74*a* and photocatalytic optical fibers 100 or in the rear of the second surface 74*b*. When the non-transparent substrate 74 is used, a first light source may be positioned in the front of the first surface 74*a* and a second photocatalytic optical fibers 100 and light source may be positioned in the rear of the second surface 74*b*.

Figure 37:
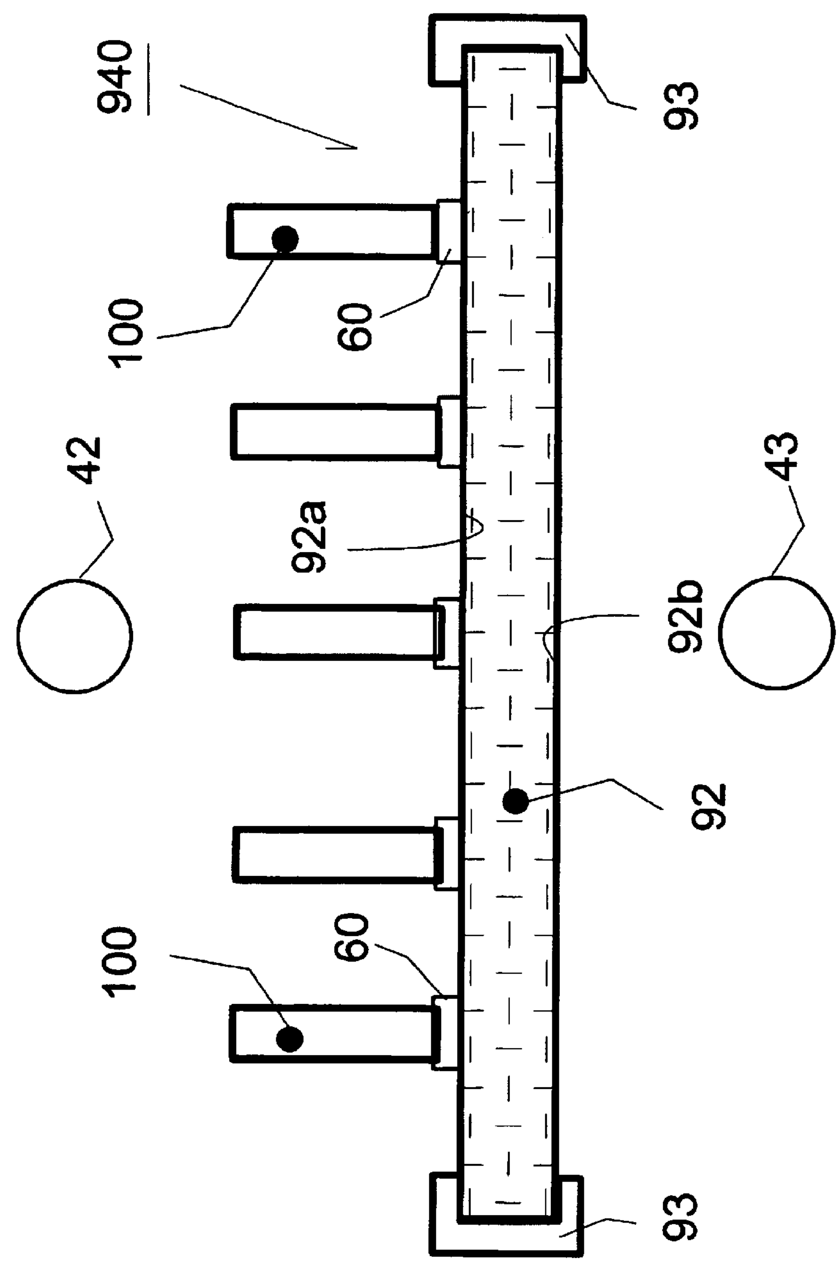
FIG. 37 is a cross sectional view of other preferred embodiment of the present invention, showing a photocatalyst apparatus 940 having a filter device as a substrate.

Referring to FIG. 37 showing a still further embodiment of the present invention, a photocatalyst apparatus 940 may be composed of a non-transparent or transparent filter 92 (or filter substrate, filter material, filter medium) for capturing and retaining dirt particles included in fluid thereon/therein. The photocatalyst apparatus 940 may be further composed of a first and a second surfaces 92*a*, 92*b* and a frame 92*c* to fix the filter material 92 thereto and a plurality of photocatalytic optical fibers 100 to attach the first surface 92*a* (and/or the second surface 92*b*) by an adhesive 60, wherein the photocatalytic optical fibers 100 project (extend out) from the first surface 92*a* (and/or the second surface 92*b*). The filter 92 and acts as a substrate to support the photocatalytic optical fibers 100 at fixing ends thereof.

FIG. 37, the filter 92 has a plurality of through-holes (or permeable openings, ventilating openings, fluid passages, vent-holes, fluid vents) to pass through between the first and second surfaces 92*a*, 92*b*, wherein the filter 92 may be formed as sheet-like (or paper-like, cloth-like, film-like) filter member capable of capturing dirt particles and/or odors including fluid and the filter 92 allows fluid (gas or liquid) to pass therethrough. The filter 92 may be composed of typically a woven or non-woven fabric, a mesh, a screen, a perforated sheet/film or a punched sheet/film, preferably made of natural fiber sheet or paper, woven or non-woven plastic fiber cloth or paper, porous plastics sheet or paper made of e.g. formed polymer with through holes, glass fiber cloth or paper, carbon fiber cloth or paper, porous ceramic sheet, metallic wire screen or combination thereof. The filter 92 may include an adsorbent therein/thereon to absorb contaminants included in fluid, such as active carbon, zeolite, porous ceramics or silica gel. Further, the filter 92 may include a photocatalyst therein/thereon as is mentioned hereinbefore.

The adhesive 60 may be selectively coated on the first surface 92*a* to form plural dotted adhesive films or layers (island-like adhesives, isolated adhesive films) 60 at substantially the same positions where the photocatalytic optical fibers 100 are attached so as to prevent the filter 92 from closing the through holes as much as possible. The island-like adhesives 60 may be coated selectively on the first surface 72*a* (and/or the second surface 92*c*) preferably by a screen printing method or an ink jet printing method. The plurality of photocatalytic optical fibers 100 are permanently attached or fixed to the island-like adhesive films 60 disposed on the first surface 92*a* (and/or the second surface 92*b*) preferably by an electrostatic flocking process as is described hereinbefore.

It is noted that the filter 92 may contain a photocatalyst material and/or the adhesive 60 may contain a photocatalyst therein/thereon.

In FIG. 37, when the substantially transparent material is used as the filter material 92, a first light source 42 may be positioned in front of the photocatalytic optical fibers 100 (and the first surface 92*a*), and/or a second light source 43 may be positioned in rear of the second surface 92*b*, in this case the adhesive 60 may be also transparent. However, when the substantially non-transparent material is used as the filter material 72, only the first light source 42 positioned in front of the photocatalytic optical fibers 100 can irradiate the photocatalytic optical fibers 100 and the first surface 92*a*.

Figure 38:
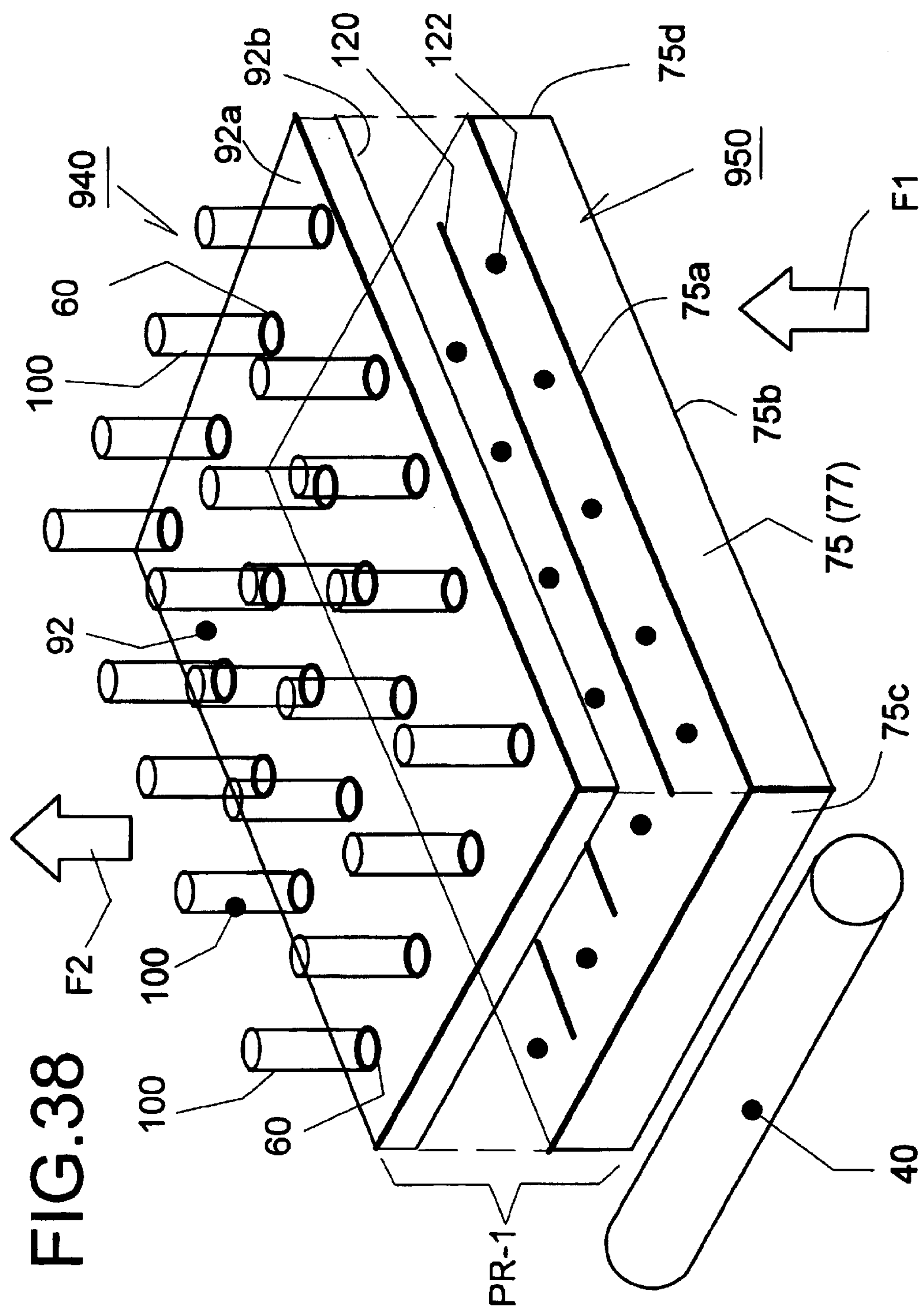
FIG. 38 is a conceptual and schematic view of other preferred embodiment of the present invention, showing a photocatalyst reactor "PR-1" using the photocatalyst apparatus 940 of FIG. 37 and a secondary light source 950.

Referring to FIG. 38, showing further embodiments of the present invention, a photocatalyst reactor "PR-1" may comprise a photocatalyst apparatus 940 and a light-diffusing (or leaky) light-guide means 950 (i.e. light-conductor), wherein the photocatalyst apparatus 940 has the same or like structure as is shown in FIG. 37 and the secondary light source 950 has like structure as the substrate 75 (or 77) as is shown in FIG. 11 (or FIG. 14). The light-diffusing light-guide means 950 may be a surface, planer, flat type or panel-like light source (i.e. a light diffuser, light radiator, illuminator, light diffusible light-conductor) acting as the secondary light source and may be composed of a substantially transparent member 75 (or 77) having a first surface 75*a* (or 77*a*), a second surface 75*b* (or 77*b*) opposed to each other, a first side 75*c* (or 77*c*), a second side 75*d* (or 77*d*) opposed to each other and a plurality of linear (and/or dotted) openings (i.e. through holes, perforations) 120 (and/or 122) passing through the first and second surfaces 75*a* (or 77*a*) and 75*b* (or 77*b*).

In FIG. 38, a substantially linear primary light source 40 is positioned at the vicinity of the first side 75*c* wherein the first side 75*c* receives light from the primary light source 40 to introduce light into the secondary light source 75. The photocatalyst apparatus 940 may be disposed in front of the first surface 75*a* of the secondary light source 75 in such a manner that the second surface 92*b* of the filter substrate 92 is positioned adjacent to or in contact with the first surface 75*a* of the secondary light source 950 in face-to-face relation to each other.

Accordingly, fluid of an upstream "F1" containing contaminants passes subsequently the openings 120 (and/or 122) of the secondary light source 75, the filter substrate 92 and the photocatalytic optical fibers 100, wherein the fluid coming in contact with the photocatalyst clads of the photocatalytic optical fibers 100 is purified by oxidation/reduction reaction due to photo-catalyzing of the photocatalyst included in the photocatalyst clad, therefore, the fluid of a downstream "F2" is clean and contains less contaminants than that of the upstream "F1".

Figure 39:
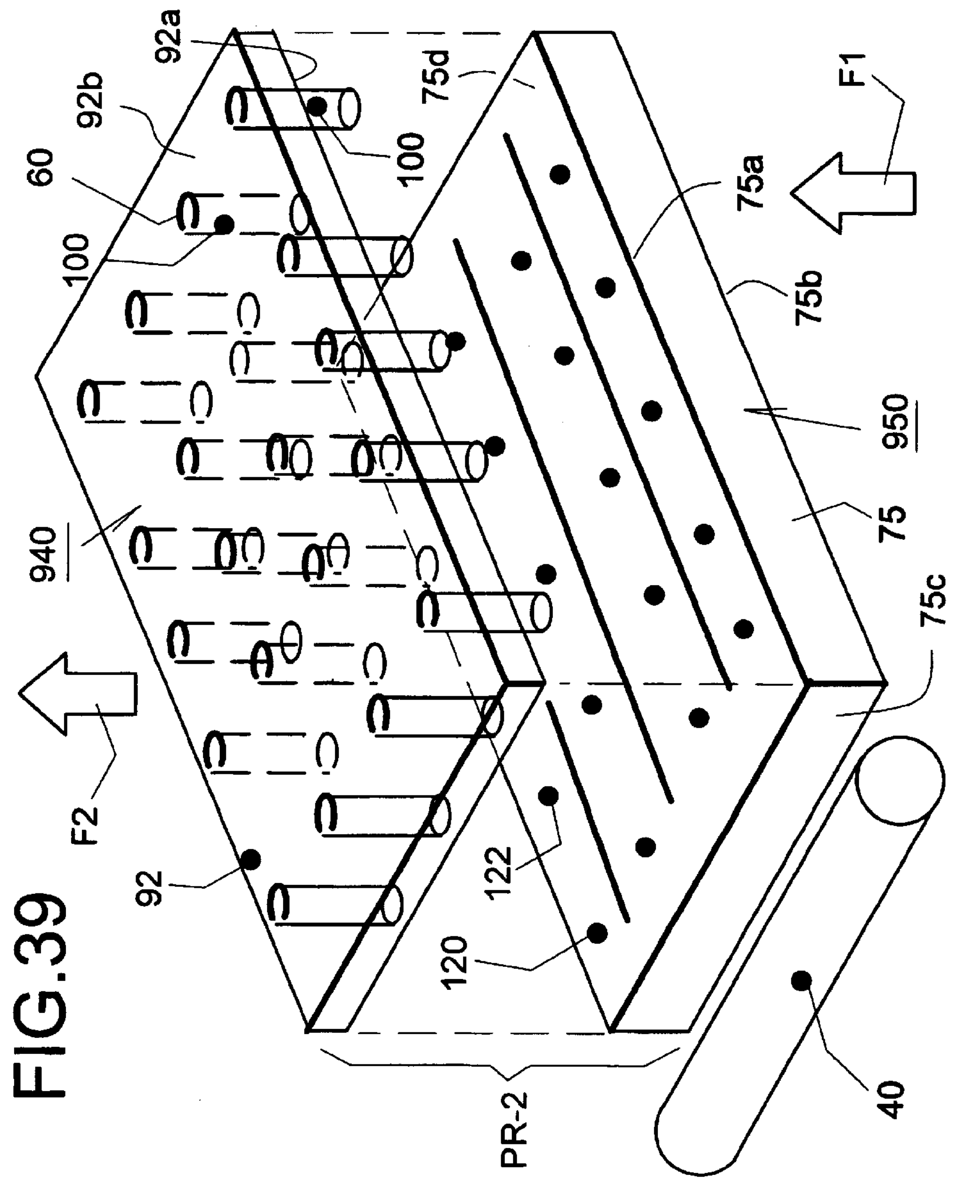
FIG. 39 is a conceptual and schematic view of other preferred embodiment of the present invention, showing a photocatalyst reactor "PR-2", which is a modification of the photocatalyst reactor "PR-1" of FIG. 38.

Referring to FIG. 39, showing a still further embodiments of the present invention which is a modification of the photocatalyst reactor "PR-1" in FIG. 38, a photocatalyst reactor "PR-2" may comprise the photocatalyst apparatus 940 of FIG. 37 (and FIG. 38), the panel-like secondary light source 950 of FIG. 38 and a primary light source 40 of e.g. FIG. 38. An arrangement of the photocatalyst apparatus 940 in FIG. 39 is inverted from an arrangement in FIG. 38 in such a manner that the free ends of the photocatalytic optical fibers 100 projected from the first surface 92*a* of the filter substrate 92 are positioned adjacent to or in contact with the first surface 75*a* of the secondary light source 950.

Accordingly, fluid of an upstream "F1" containing contaminants passes subsequently the openings 120 (and/or 122) of the secondary light source 75, the photocatalytic optical fibers 100 and the filter substrate 92, wherein the fluid coming in contact with the photocatalyst clads of the photocatalytic optical fibers 100 is purified by oxidation/reduction reaction due to photo-catalyzing of the photocatalyst included in the photocatalyst clad, therefore, the fluid of a downstream "F2" is clean and contains less contaminants than that of the upstream "F1".

Figure 40:
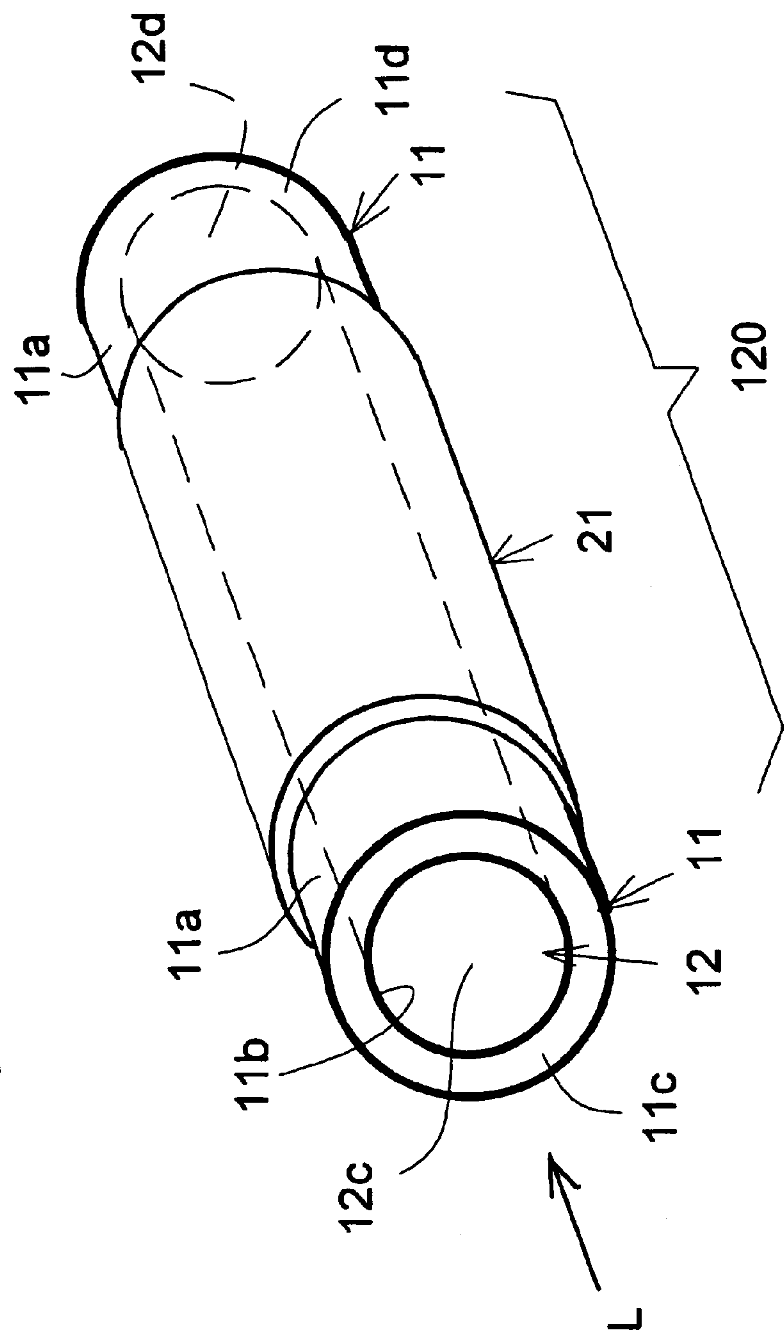
FIG. 40 is a conceptual and schematic view of other preferred embodiment of the present invention, showing a photocatalytic hollow optical fiber 120 with a hollow core.

In all the aforementioned embodiments, the photocatalytic optical fiber 100 is used as one of the key elements, a photocatalytic hollow optical fiber 120 as is shown in FIG. 40 may substitute for the photocatalytic optical fiber 100, because the photocatalytic optical fiber 120 is functionally equivalent to the photocatalytic optical fiber 100 as described as follows.

Referring to FIG. 40, the photocatalytic hollow-optical fiber 120 (i.e. a fiber-like photocatalytic hollow wave-guide, a photocatalytic hollow wave-guide fiber) may comprise a longitudinal tubular member 11 (i.e. typically a cylindrical tube or pipe) having a first tube end 11*c*, a second tube end 11*c*, an inner surface 11*b* and an outer surface 11*c*, a longitudinal photocatalytic clad 21 including a photocatalyst material to cover entirely or partially the outer surface 11*c* and a longitudinal hollow core 12 (i.e. opening, through hole, hollow path, space) having a first hollow end 12*c* and a second hollow end 12*d*. The longitudinal hollow core 12 elongates from the first hollow end 12*c* to the second hollow end 12*d* for connecting or passing through between the first end 11*c* and the second end 11*d*. The tubular member 11 may be made of a substantially transparent material such as glass (e.g. quartz) or polymer material (e.g. silicone resin, acrylic resin polycarbonate resin, fluoric resin). The photocatalytic clad 21 may be composed of a thin photocatalyst film or a binder film including a plurality of photocatalyst particles.

In FIG. 40, when light "L" enters from the first hollow end 12*c* (and/or the second hollow end 12*d*) into an interior of the hollow core 12 (i.e. air core), light is reflected repeatedly at the inner surface 11*b* of the tube 11 and at the interface between the outer surface 11*c* of the tube and the photocatalytic clad 21. Further, some volume of light is gradually leaked or output from the outer surface 11*a* into the photocatalytic clad 21, thereby the photocatalytic clad 21 is irradiated or exited by the light leaked or output. Therefore, the photocatalytic hollow optical fiber 120 is functionally equivalent to the photocatalytic optical fiber 100 as is described in detail hereinbefore and the photocatalytic hollow optical fiber 120 may substitute for the photocatalytic optical fiber 100 in the aforementioned embodiments.

Figure 41:
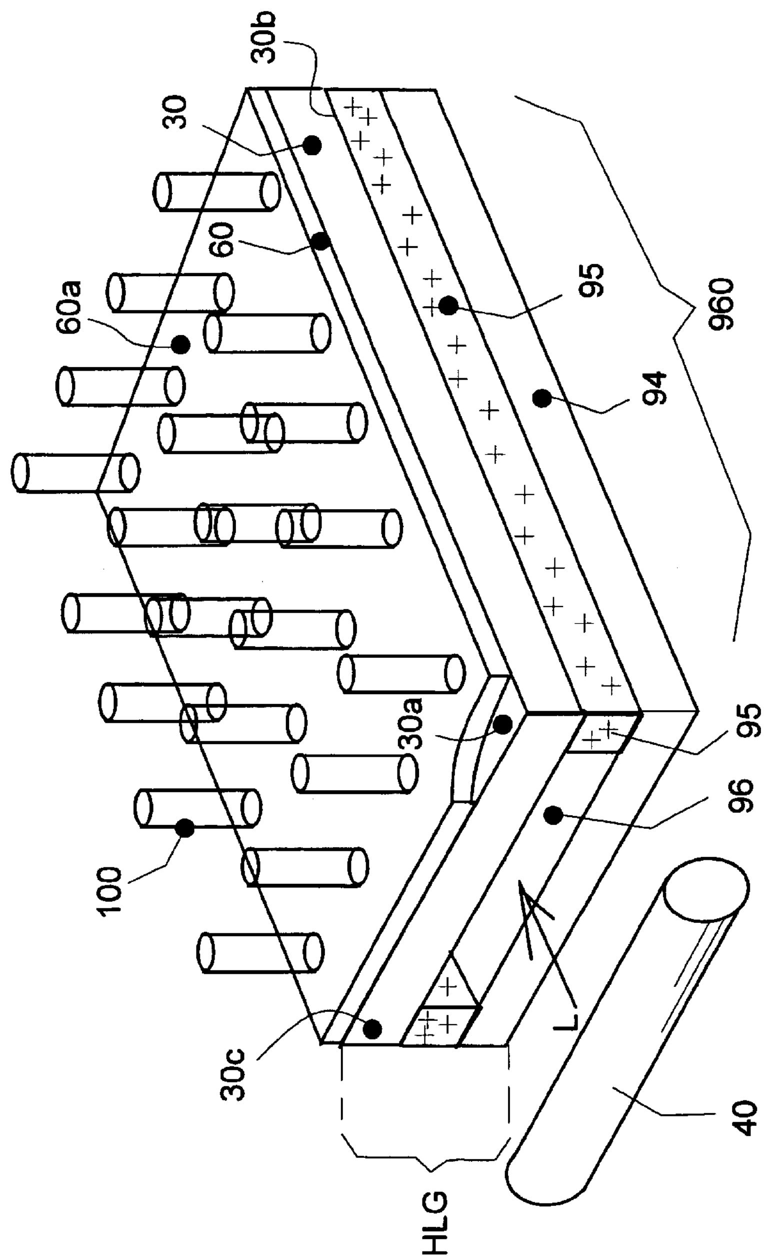
FIG. 41 is a conceptual and schematic view of other preferred embodiment of the present invention, showing a photocatalyst apparatus 960 using a hollow light-guide means "HLG" as a secondary light source.

Referring to FIG. 41, a photocatalyst apparatus 960 of the present invention may be provided with a hollow lightguide or hollow wave-guide, wherein the photocatalyst apparatus 960 includes a substrate with a hollow light guide means "HLG" having a sandwiched structure composed of a first member 30, a second member 94 opposed to the first member 30 and a spacer/spacers 95 therebetween, and wherein a light, guidable hollow space 96 is produced in an interior of the sandwiched structure "HLG". In more detail, the photocatalyst apparatus 960 may comprise a substantially rectangular and substantially transparent plate 30 (or transparent substrate), a substantially rectangular light reflecting plate 94, a plurality of photocatalytic optical fibers 100 (or photocatalytic optical hollow fibers 120) and a pair of longitudinal, light reflecting stripe spacers 95. The photocatalytic optical fibers 100 are attached to/onto a first surface 30*a* of the substrate 30 through a substantially transparent adhesive film 60 so as to project or extend out from the first surface 30*a*. The adhesive film 60 may contain a plurality of photocatalyst particles therein/thereon.

In FIG. 41, the pair of the plates 30 and 94 is sandwiched by the pair of stripe spacers 95 so as to provide a longitudinal, substantially rectangular hollow 96 (hollow space) in cross section therebetween. The light reflecting plate 94 is composed of a light reflecting metal plate (e.g. aluminum plate or sheet ) or a light non-reflecting plate (transparent or non-transparent plate) having a light reflecting film preferably made of an aluminum film on an inner surface of. the light non-reflecting plate.

The linear light source 30 is positioned at a vicinity of an end (or a light inlet) of the hollow 96, wherein light "L" from the light source 30 is introduced from the light inlet of the hollow 96 into an interior of the hollow 96. Light "L" is reflected repeatedly between the first surface 30*a* of the transparent plate 30 and the light reflecting plate 94 as well as between a second surface 30*b* of the transparent plate 30 and the light reflecting plate 94. Further, some volume of light "L" on the way of transmission is gradually leaked or output into the photocatalytic optical fibers 100 at the fixed ends thereof and the adhesive film 60. Then, light "L" is input or introduced into the photocatalytic optical fibers 100 from the cores thereof and the rest of light "L" goes out via the adhesive film 60 or irradiate the photocatalyst contained in the adhesive film 60.

Figure 42:
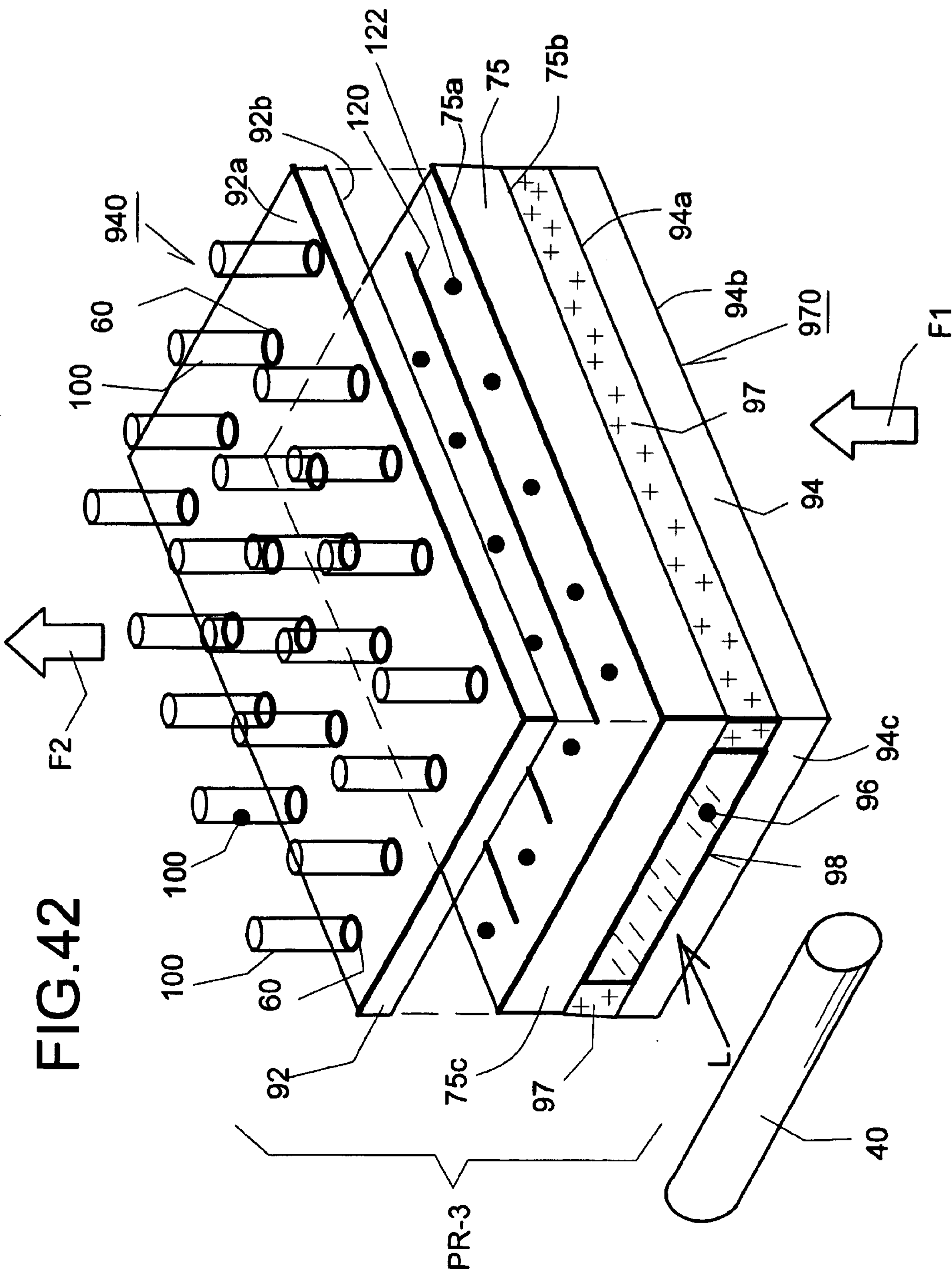
FIG. 42 is a conceptual and schematic view of other preferred embodiment of the present invention, showing a photocatalyst reactor "PR-3" using a hollow light-guide means 970 as a secondary light source and openings therethrough.

Referring to FIG. 42, a photocatalyst reactor "PR-3" of a still further embodiment of the present invention may briefly comprise a photocatalyst apparatus 940 of FIG. 37 and a panel-like secondary light source 970 (i.e. a surface, planer or flat light source, or a surface, planer or flat light diffuser), wherein the photocatalyst apparatus 940 has the same or like structure as is shown in FIG. 37. The secondary light source 970 having a hollow wave-guide or a hollow light-guide may be composed of a pair of substantially rectangular plates 75 and 94, wherein each of the plates 75 and 94 has a first surface 75*a*, 94*a*, a second surface 75*b*, 94*b* opposed to each other, a first side 75*c*, 94*c*, a second side 75*d*, 94*d* opposed to each other, a plurality of linear (and/or dotted) openings 120 and/or 122 passing through the first and second surfaces 75*a*, 75*b* and 94*a*, 94*b* and a reflecting spacer 97.

In FIG. 42, the photocatalyst apparatus 940 may be disposed in front of the secondary light source 960 so that the filter substrate 92 of the photocatalyst apparatus 940 is positioned adjacent to or in contact with the first plate 75*a* of the secondary light source 970 in a face-to-face relation. Instead of this state, the photocatalyst apparatus 940 may be disposed in front of the secondary light source 960 in inverse relation so that the free ends of the photocatalytic optical fibers 100 of the photocatalyst apparatus 940 are positioned adjacent to or in contact with the first plate 75*a* of the secondary light source 970.

The reflecting spacer 97 is formed as a substantially rectangular frame and is sandwiched between the pair of the rectangular plates 75 and 94 (i.e. between the second surface 75*b* and the first surface 94*a*) so as to produce or provide a substantially rectangular hollow space 96 therebetween. The reflecting spacer 97 has a transparent window 98 made of glass or transparent polymer to receive or introduce light "L" into the hollow space 96. The openings 120 and/or 122 in the pair of the plates 75 and 94 allow fluid flow "F1" to pass through the secondary light source 960 via the hollow space 96. The first rectangular plate 75 and the second rectangular plate 94 may be made of transparent material respectively, but the pair of the plate 75 may be made of light reflecting material because the openings 120, 122 allow light transmitted in an interior of the hollow space 96 to leak or output toward the photocatalyst apparatus 940.

A linear primary light source 30 is positioned at a vicinity of the transparent window 98 (or a side of the rectangular hollow space 96), wherein light "L" from the light source 30 is introduced from the window 98 into an interior of the hollow space 96. Light "L" is reflected repeatedly between the first surface 75*a* of the transparent first plate 75 and the light reflecting plate 94, as well as between the second surface 75*b* of the first plate 75 and the light reflecting plate 94. Further, some volume of light "L" on the way of transmission is gradually leaked or output to the photocatalyst apparatus 940 and the light "L" leaked or output from the secondary light source 970 passes through the filter substrate 92 of the photocatalyst apparatus 940 so as to enter or input into the photocatalytic optical fibers 100 at the fixed ends thereof and the adhesive film 60. Then, light "L" is input or introduced into the photocatalytic optical fibers 100 from the cores thereof and the rest of light goes out via the adhesive film 60 or irradiate the photocatalyst contained in the adhesive film 60.

Figure 43:
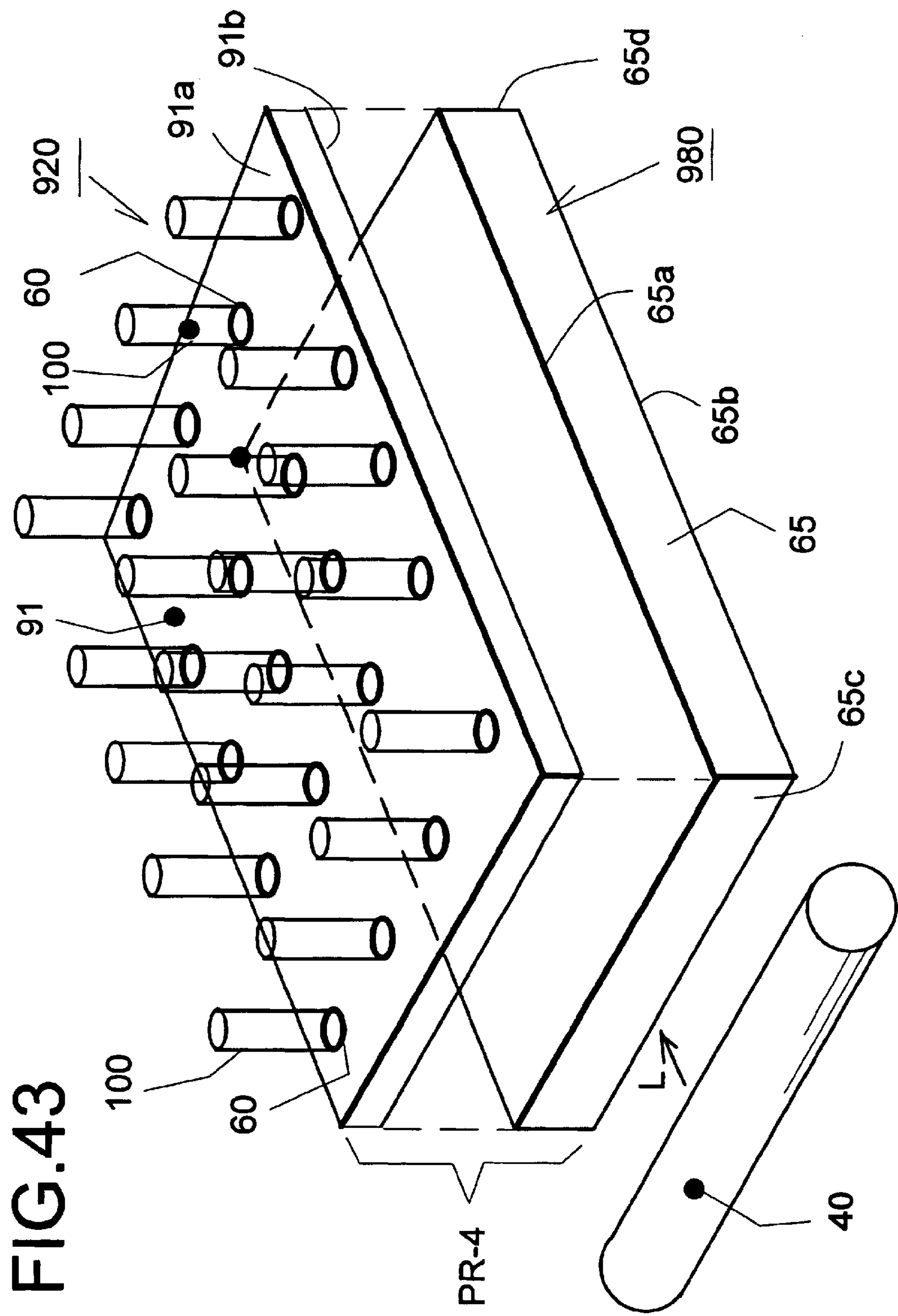
FIG. 43 is a conceptual and schematic view of other preferred embodiment of the present invention, showing a photocatalyst reactor "PR-4" using a light-guide means 980 as a secondary light source.

Referring to FIG. 43, a photocatalyst reactor "PR-4" of a still further embodiment of the present invention may briefly comprise a photocatalyst apparatus 921 and a panel-like secondary light source 930. The photocatalyst apparatus 921 may be composed of a substantially transparent substrate member 91 (having a substantially rectangular-shaped body, a first surface 91*a* and a second surface 91*b* opposed to each other) and a plurality of photocatalytic optical fibers 100 attached or fixed to/onto the first surface 91*a* by plural adhesives 60 (i.e. island-like or dotted adhesive films or layers disposed on separate areas of the first surface 91*a*). The panel-like secondary light source 980 may be composed of a substantially transparent member 65 having a substantially rectangular shaped body, a first surface 65*a*, a second surface 65*b* opposed to the first surface 65*a*, a first side 65*c* and a second side 65*d* opposed to the first side 65*c*. The panel-like secondary light source 980 is acting as a surface, planer or flat light source (or a surface, planer or flat light diffuser, or leaky light-guide panel), wherein the secondary light source 980 may have like structure as the transparent substrate to denote the reference numeral e.g. 30 in FIG. 3 with light-redirecting means (or light-diffusing means) to denote the reference numeral e.g. 90 in FIG. 3.

In FIG. 43, the substantially linear light source 40 as a primary light source is disposed at the vicinity of the first side 65*c* of the secondary light source 980. Light from the light source 40 is introduced from the first side 65*c* into an interior of the transparent panel (or plate) in such a manner that light transmits to reflect repeatedly in the interior toward the second side 65*d* by the principle of the total internal reflection. Some volume of the above light gradually redirects or diffused at the light-redirecting means (or light-diffusing means) e.g. 90 and advances toward the first surface 65*a* to leak or output therefrom so that the leaked or output light passes the transparent substrate 91 and irradiate the photocatalytic optical fibers 100.

The photocatalytic optical fibers 100 receive light from the fixed ends thereof to allow the cores 10 (in FIG. 2) to transmit along the length thereof and to leak from the core 10 to the photocatalytic clads 20 (in FIG. 2), thereby the photocatalytic clads 20 are irradiated by light output or leaked from the core 10. At the same time, the photocatalytic optical fibers 100 directly receive light from the photocatalytic clads 20 by the light leaked or output from the first surface 65*a* without interposing the cores 10. It is noted that the photocatalytic clads of the photocatalytic optical fibers 100 can be irradiated by the light from the inside via the cores and also the direct light from the outside.

Figure 44:
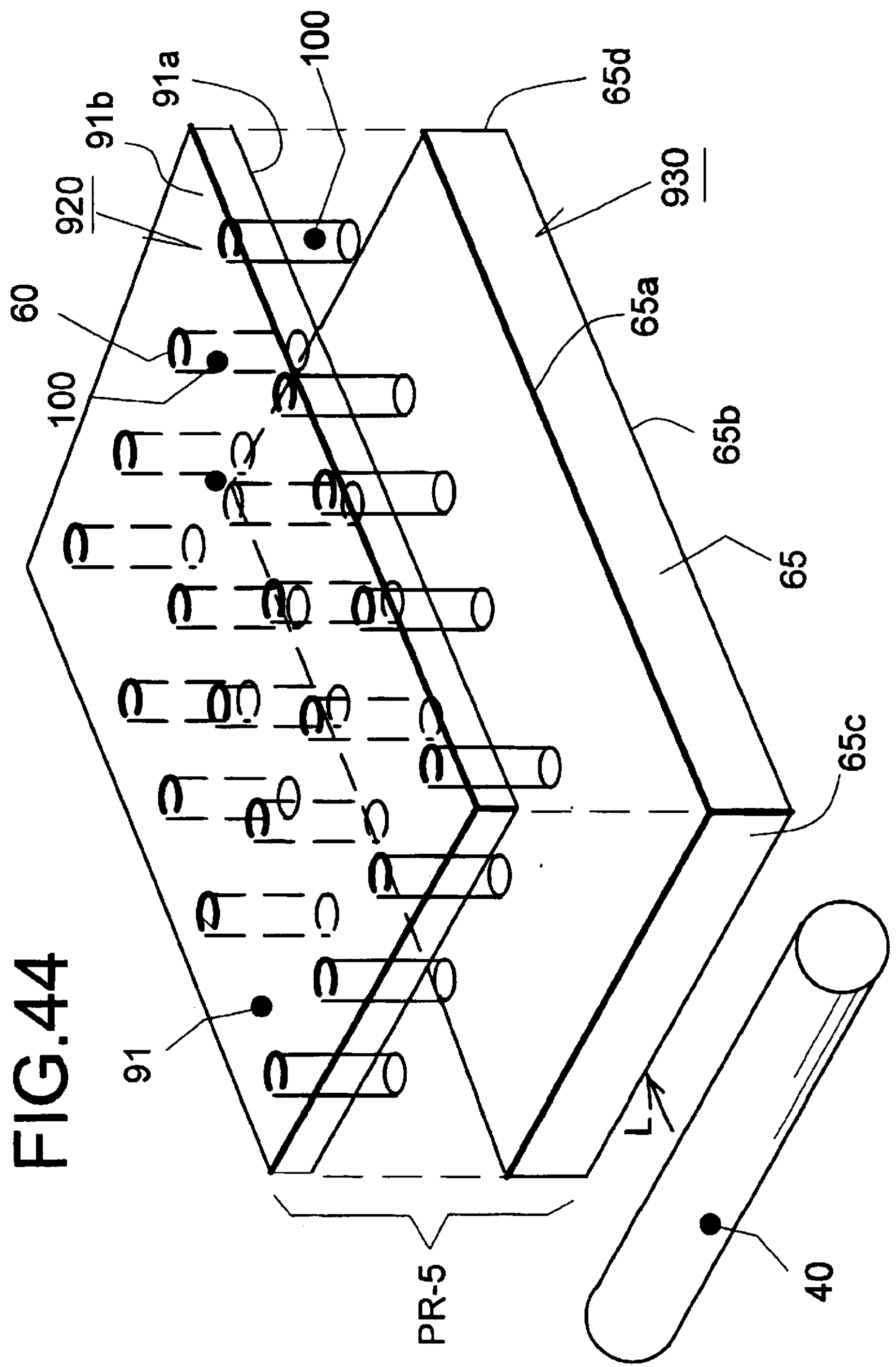
FIG. 44 is a conceptual and schematic view of other preferred embodiment of the present invention, showing a photocatalyst reactor "PR-5" using a hollow light-guide means 980 as a secondary light source.

Referring to FIG. 44, a photocatalyst reactor "PR-5" of a still further embodiment of the present invention may briefly comprise a photocatalyst apparatus 921 and a panel-like secondary light source 980. The photocatalyst reactor "PR-5" in FIG. 44 is basically like as the photocatalyst reactor "PR-5" in FIG. 43, with the exception of a disposition or allocation. That is, the disposition of the photocatalyst reactor "PR-5" in FIG. 44 is such that the free ends of the photocatalytic optical fibers 100 are disposed on or adjacent to the first surface 65*a* of the secondary light source 980, while the disposition of the photocatalyst reactor "PR-4" in FIG. 43 is such that the fixed ends of the photocatalytic optical fibers 100 or the first surface 91*a* of the substrate 91 are disposed on or adjacent to the first surface 65*a* of the secondary light source 980.

In the photocatalyst reactor "PR-5" of FIG. 44, the photocatalyst apparatus 921 receives light from the secondary light source 980 at the free ends of cores 10 of the photocatalytic optical fibers 100 and at the photocatalytic clad 20 thereof, while in the photocatalyst reactor "PR-4" of FIG. 43, the photocatalyst apparatus 921 receives light from the secondary light source 980 at the fixed ends of cores 10 of the photocatalytic optical fibers 100 and at the photocatalytic clad 20 thereof.

In FIG. 44, the photocatalytic optical fibers 100 may preferably substitute for the photocatalytic optical fibers 110 shown in FIG. 32 or 120 shown in FIG. 33, since the photocatalytic optical fibers 110 and 120 are provided with the light collectors 15 and 16 at the free ends of the cores 10*c* wherein the light collectors 15 and 16 can receive light from the secondary light source 980 with a wide angle, which enables to introduce light into the cores 10 more efficiently and effectively. The substrate 91 may be preferably composed of a light reflecting panel in order to reflect light to irradiate again directly the photocatalytic clads 20.

Figure 45:
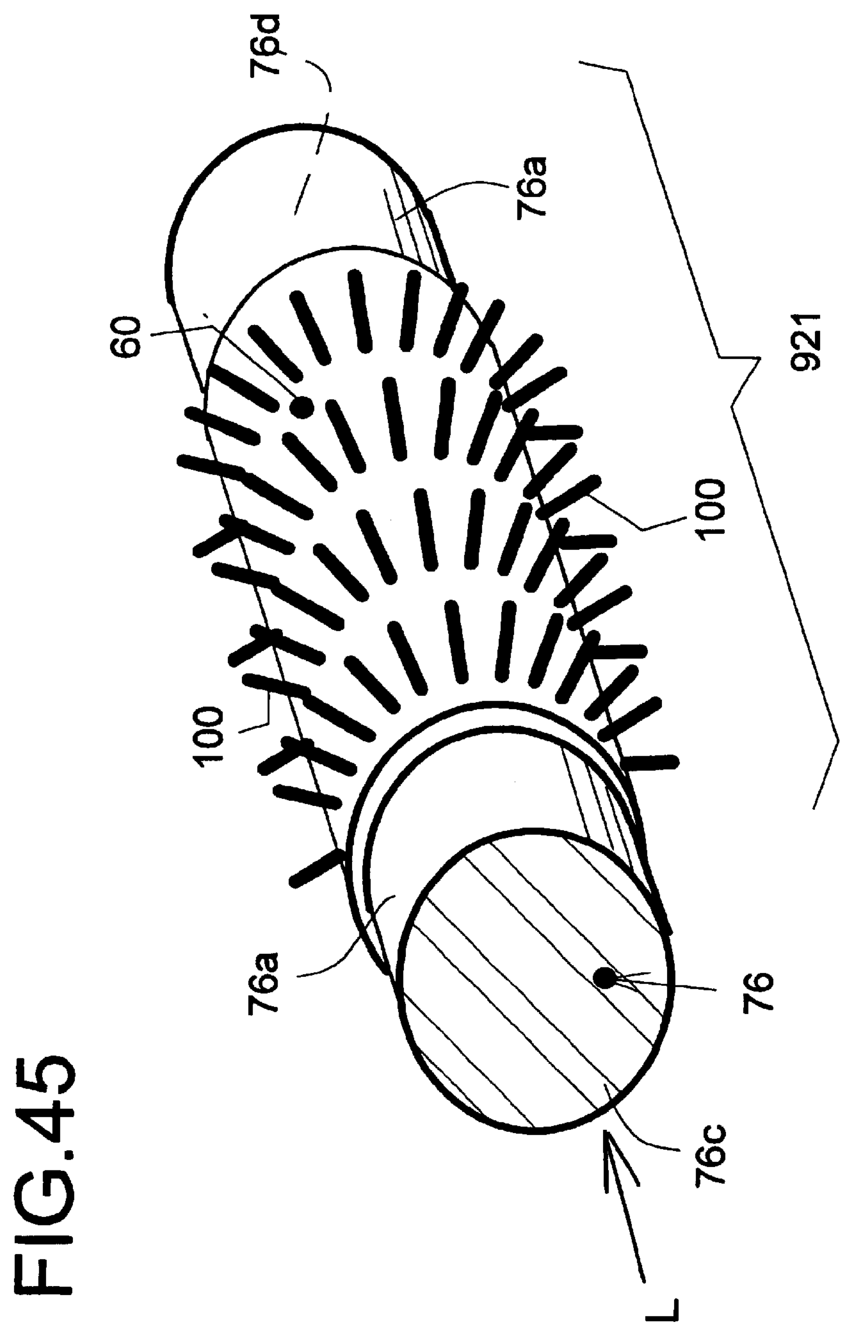
FIG. 45 is a conceptual and schematic view of other preferred embodiment of the present invention, showing a photocatalyst apparatus 921 using a column-like light-guide substrate.

Referring to FIG. 45, a still further embodiment of the present invention, a photocatalyst apparatus 921 may briefly comprise a longitudinal column-like solid light-guide or wave-guide (or light-pipe, light guiding rod) 76 acting as a substrate and a plurality of photocatalytic optical fibers 100 attaching or fixing to/on the column-like light-guide 76 to project or extend out from a surface 76*a* of the column-like light-guide 76. The column-like light-guide 76 may be made of a substantially transparent longitudinal body as an optical core having a first end 76*c* to introduce light "L" into the core and a second end 76*d*.

In FIG. 45, the column-like light-guide 76 may be formed as a substantially cylinder or a substantially circular shape in cross section in FIG. 45, however, other shapes of the cross section may be applied as the column-like light-guide 76 such as polygon e.g. triangle, tetragon, pentagon. An adhesive film 60 made of a substantially transparent adhesive may be formed on the surface 76*a* to allow the photocatalytic optical fibers 100 to adhere thereto/thereon, wherein a refractive index of the adhesive film 60 may be substantially equal to or more than that of the core so that light transmitted in an interior of the core 76 is easy to leak out or output from the core surface 76*a* to the photocatalytic optical fibers 100 so as to be irradiated directly or through each core 10 (see FIG. 2) by the leaked or output light.

The photocatalytic optical fibers 100 may be flocked preferably by the aforementioned electrostatic flocking process. Further, the column-like light-guide 76 may be provided with a substantially transparent electric conductor film (e.g.110 in FIG. 7) made of typically tin oxide or indium oxide disposed on the external surface 76*a* in such a manner that the electric conductor film is interposed between the external surface 76*a* and the adhesive film 60. The electric conductor film may acts as an earth electrode (one of a pair of electrodes) if the electrostatic flocking process is carried out, wherein the photocatalytic optical fibers 100 may extend out or project from the external surface 76*a* in a substantially perpendicular direction and substantially parallel to one another around the surface 76*a* and along the length of the column-like light-guide 76 in a good condition as is shown in FIG. 45.

The photocatalyst apparatus 921 may be provided with a light diffusing means disposed on the surface 76*a* in order to diffuse light transmitted in the interior of the core 76 from the surface 76*a*. An example of the light diffusing means is a rough surface to rough entirely or partially the surface 76*a*, another example is a plurality of light diffusing particles e.g. transparent beads or light reflecting pigments disposed in the interior of the core 76 uniformly or non-uniformly along a length thereof and a still another example is like light diffusing particles disposed in the interior of the adhesive films 60 uniformly or non-uniformly along the length of the core 76.

In the photocatalyst apparatus 921 in FIG. 45, the photocatalytic optical fibers 100 may be replaced to the photocatalytic hollow optical fibers 120 in FIG. 40.

Figure 46:
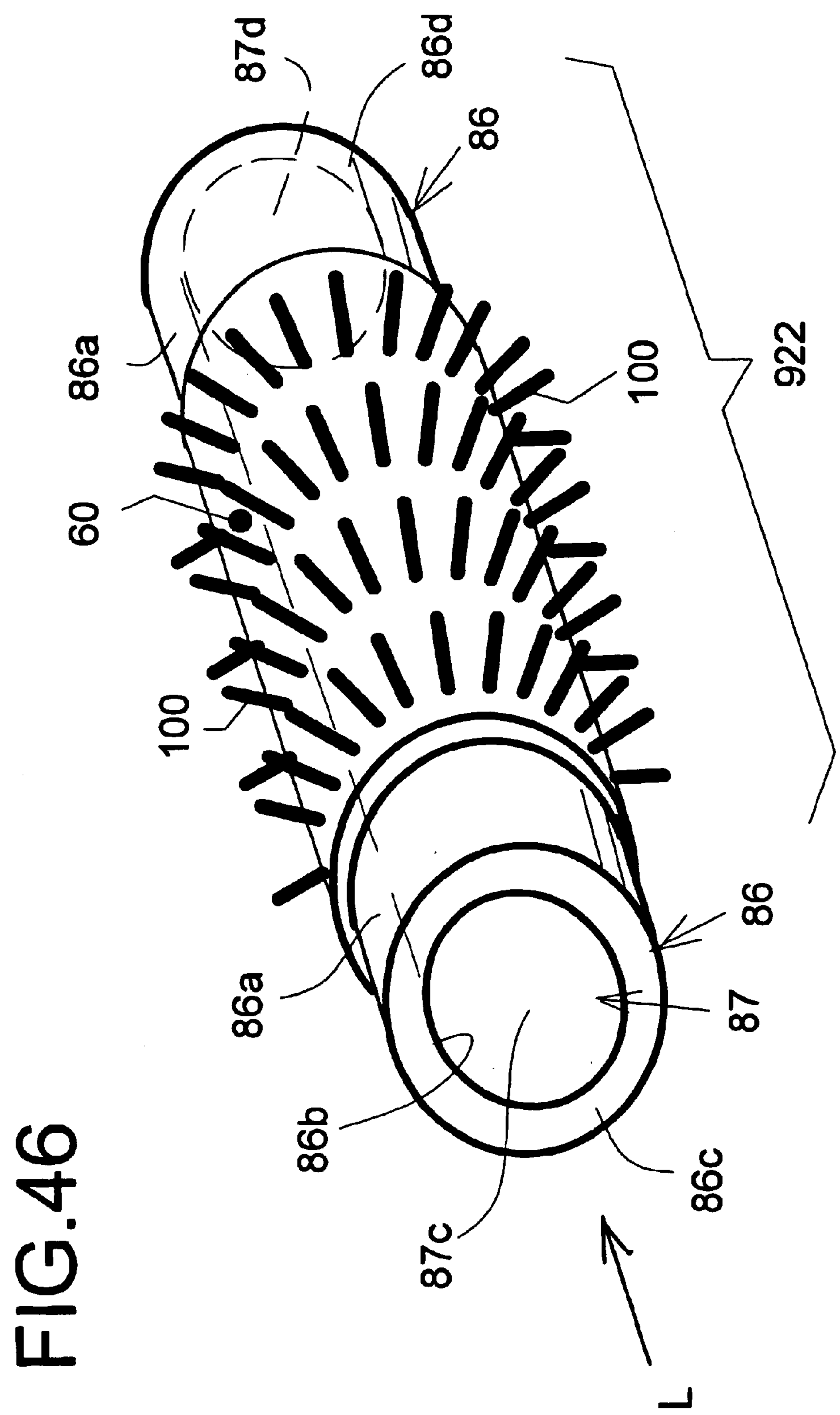
FIG. 46 is a conceptual and schematic view of other preferred embodiment of the present invention, showing a photocatalyst apparatus 922 using a tubular light-guide substrate.

Referring to FIG. 46, a still further embodiment of the present invention, a photocatalyst apparatus 922 may briefly comprise a transparent, hollow column-like member (or tubular hollow light-guide, hollow light-pipe, hollow waveguide) 86 and a plurality of photocatalytic optical fibers 100 attaching or fixing to/on the tubular hollow light-guide 86 to project or extend out from a surface 86*a* of the tubular hollow light-guide 86 by an adhesive film 69 entirely or partially disposed on the surface 86*a*. The tubular hollow light-guide 86 may be composed of a substantially transparent tubular body or wall 86 having the first surface 86*a* (i.e. an external surface of the wall 86), a second surface 86*b* (i.e. an internal surface of the wall 86), a first end 86*c* and a second end 86*d* and a longitudinal hollow space 87 as an optical core surrounded by the internal surface 86*b* of the wall 86. The longitudinal hollow space (i.e. hollow core) 87 is elongated from a first hollow end 87*c* (i.e. light-input end) to introduce or input light "L" into the longitudinal hollow space 87 to a second end 87*d* opposed to the first hollow end 87*c*. The adhesive film 60 made of a substantially transparent adhesive may be formed on the surface 86*a* to allow the photocatalytic optical fibers 100 to adhere thereto/thereon preferably by the aforementioned electrostatic flocking process.

In FIG. 46, the photocatalyst apparatus 922 may be provided with a light diffusing means disposed on the surface 86*a* in order to diffuse light transmitted in the interior of the hollow core 86 from the external surface 86*a* like as the embodiment in FIG. 45. The photocatalytic optical fibers 100 may be replaced to the photocatalytic hollow optical fibers 120 in FIG. 40 In the photocatalyst apparatus 922 in FIG. 45 as well as the photocatalyst apparatus 921 in FIG. 44.

Figure 47:
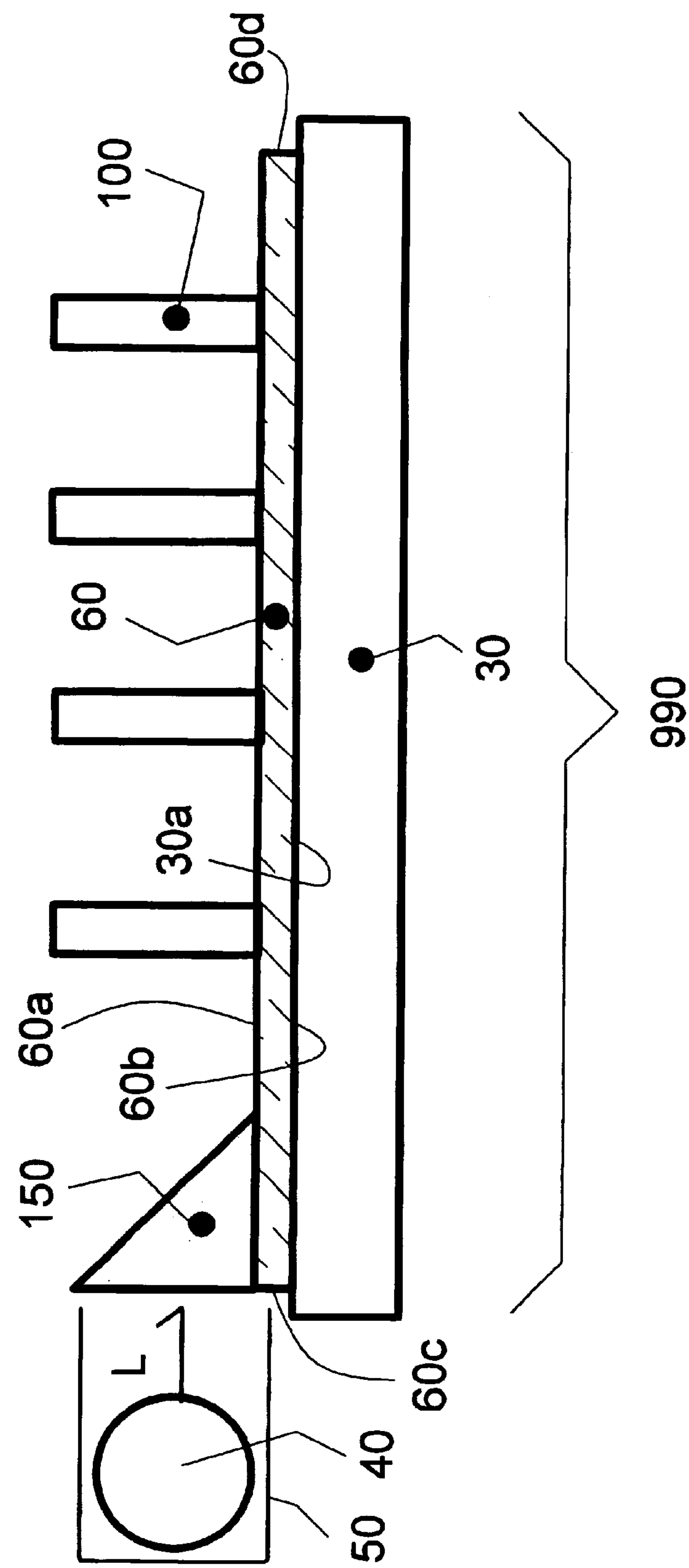
FIG. 47 is a cross sectional view of other preferred embodiment of the present invention, showing a photocatalyst apparatus 980 using an adhesive film as a light-guide.

Referring to FIG. 47, a still further embodiment of the present invention, a photocatalyst apparatus 950 may comprise a substrate 30 and a substantially transparent adhesive film (or layer) 60 acting as a light-guide having a first surface 60*a*, a second surface 60*b* opposed one another, a first side or end 60*c* and a second side or end 60*d* opposed one another. The adhesive film (or layer) 60 may be disposed on the substrate 30 (or the surface 30*a* of the substrate 30) composed of a substantially transparent material having a surface 30*a*.

In FIG. 47, the adhesive film (or layer) 60 adheres to attach or fix the photocatalytic optical fibers 100 thereon/thereto preferably by an electrostatic flocking process. The light source 40 may be disposed on a position relative to the first surface 60*a* or the first side 60*d* of the adhesive film 60, wherein light "L" from the light source 40 is introduced into the adhesive film 60 from the surface 60*a* or the side 60*d* thereof to allow the photocatalytic optical fibers to be irradiated by light leaked or output on a way of transmission in the adhesive film 60. The adhesive film 60 may have preferably a higher refractive index than that of the substrate 30 to allow the introduced light to reflect repeatedly at the second surface 60*b* from the first side 60*c* to the second side 60*d*. The photocatalyst apparatus 990 may be provided with at least one prism 150 disposed on or adjacent to the first and/or second surfaces 30*a* and/or 30*b* so as to introduce light into the adhesive film 60 through the prism 150. Since the adhesive film (or layer) 60 is generally more thin than that of the substrate 30 and the side 60*d* is too thin for introducing light from the side 60*d*, the light source 40 having a small size is preferred for this purpose such as at least one LED (light emitting diode) or laser diode, a linear array of LED's or laser diodes.

The substrates e.g. 30 in e.g. FIG. 3, the filter 92 in e.g. FIG. 37 or the secondary light sources may be configured as a non-linear (e.g. wave-like, corrugated, zigzag) shape in cross section in order to increase the surface area thereof.

Other various embodiments can be easily made by combining some elements in FIG. 1 through FIG. 47, for example, another photocatalyst apparatus may comprise a plurality of the longitudinal photocatalyst apparatus 921 in FIG. 45 and/or the longitudinal photocatalyst apparatus 922 in FIG. 46 are disposed on the substrate (for example, 30 in FIG. 3, 70 in FIG. 5, 72 in FIG. 6, 73 in FIG. 12, 74 in FIG. 29, 75 in FIG. 11, 92 in FIG. 37, 65 in FIG. 43) so as to project from the first and/or second surfaces of the substrate.

Still further, the photocatalyst apparatus e.g. 200 in FIG. 1 or 820 in FIG. 30 can be used in a lighting or illumination purpose as well as a fluid purifying purpose, if the photocatalyst apparatus receives light from the light source/sources (typically a conventional fluorescent lamp/lamps)

e.g. 40 including a visible wavelength region as well as a ultraviolet wavelength region to activate a photocatalyst contained in the photocatalytic optical fibers e.g. 100.

Although illustrative embodiments of the present invention have been described referring to the accompanying drawings, it is to be understood that the present invention is not limited to those embodiments and that various changes, modifications or equivalents may be made in the present invention by those skilled in the art without departing from the spirit or the scope of the present invention and the appended claims.

What is claimed is:

1. A photocatalyst apparatus comprising:

a plurality of photocatalytic optical fibers, each of the photocatalytic optical fibers having a core (or sheath) and a photocatalytic clad including a photocatalyst;

a substrate having at least one surface;

the core comprising a solid core composed of a substantially transparent material or a hollow core composed of a substantially transparent tubular member having a hollow space therethrough; and wherein the photocatalytic optical fibers are disposed on the substrate to project from the surface.

2. The photocatalyst apparatus according to claim 1, wherein the photocatalytic optical fibers project in a substantially perpendicular direction.

3. The photocatalyst apparatus according to claim 1, wherein the photocatalytic optical fibers further comprise an adsorbent disposed partially or entirely in/on the photocatalytic clad.

4. The photocatalyst apparatus according to claim 1, wherein the photocatalytic optical fibers project in a substantially parallel relation to one another.

5. The photocatalyst apparatus according to claim 1, wherein the substrate comprises a substantially rectangular panel-like member composed of a solid body or a substantially rectangular panel-like member composed of a hollow structure having a pair of substantially rectangular plates and a substantially angular hollow space therebetween.

6. The photocatalyst apparatus according to claim 1: wherein the substrate comprises a solid or hollow light guide.

7. The photocatalyst apparatus according to claim 1, wherein the substrate comprises a column-like solid body or a column-like hollow structure having a substantially transparent tubular member and a space therethrough.

8. The photocatalyst apparatus according to claim 1, further comprising an adhesive for adhering the photocatalytic optical fibers to/on the at least one surface, the adhesive being disposed entirely or partially on the at least one surface to form at least one adhesive film.

9. The photocatalyst apparatus according to claim 1, further comprising an adhesive for adhering the photocatalytic optical fibers to the at least one surface, wherein the adhesive is composed of a thermosetting, photo-setting or thermoplastic resin and a combination thereof.

10. The photocatalyst apparatus according to claim 1, further comprising an adhesive for adhering the photocatalytic optical fibers to/on the at least one surface, the adhesive being disposed entirely or partially on the at least one surface to form at least one adhesive film and a photocatalyst and/or an adsorbent disposed entirely or partially on/in the at least one adhesive film.

11. The photocatalyst apparatus according to claim 1, wherein the substrate further comprises a photocatalyst and/or an adsorbent disposed partially or entirely in/on the at least one surface or an adhesive film formed on the at least one surface.

12. The photocatalyst apparatus according to claim 1, wherein the photocatalytic optical fibers are attached to/on the at least one surface by an electrostatic process.

13. The photocatalyst apparatus according to claim 1, the substrate further comprising at least one opening to pass through a thickness thereof.

14. The photocatalyst apparatus according to claim 1, the substrate further comprising at least one opening to pass through a thickness thereof, wherein the opening is composed of a dot and/or linear shape.

15. The photocatalyst apparatus according to claim 1, each of the photocatalytic optical fibers further comprising a light collector disposed on a free end thereof.

16. The photocatalyst apparatus according to claim 1, each of the photocatalytic optical fibers further comprising a light collector disposed on a free end thereof and the light collector being composed of a condenser lens having a substantially spherical or funnel-like body.

17. The photocatalyst apparatus according to claim 1, each of the photocatalytic optical fibers further comprising a photocatalyst disposed on a free end of the core as well as the photocatalytic clad disposed on a surface of the core.

18. The photocatalyst apparatus according to claim 1, further comprising at least one electric conductor film disposed on the at least one surface.

19. The photocatalyst apparatus according to claim 1, wherein the substrate is composed of a panel-like member having a substantially uniform thickness.

20. The photocatalyst apparatus according to claim 1, wherein the substrate is composed of a panel-like member having a substantially variable thickness.

21. The photocatalyst apparatus according to claim 1, wherein the substrate is composed of a panel-like member having a substantially variable thickness of a taper-like shape in cross section.

22. The photocatalyst apparatus according to claim 1, further comprising a light reflector film disposed selectively on a first area/areas of the at least one surface, except a second area/areas where the photocatalytic optical fibers are attached to/on the at least one surface.

23. The photocatalyst apparatus according to claim 1, wherein the substrate is an existing article, installation or facility and the photocatalytic optical fibers are attached to/on the at least one surface by an electrostatic process at a site where the existing article, installation or facility is located.

24. The photocatalyst apparatus according to claim 1, wherein the substrate comprises a filter device composed of a filter medium having a thickness and a plurality of through holes to pass through the thickness.

25. The photocatalyst apparatus according to claim 1, wherein the substrate comprises a filter device composed of a filter medium having a thickness and a plurality of through holes to pass the thickness, wherein the filter medium contains an adsorbent and/or a photocatalyst therein/thereon.

26. A photocatalyst apparatus comprising:

a plurality of photocatalytic optical fibers, each of the photocatalytic optical fibers having a core and a photocatalytic clad including a photocatalyst;

a substrate having at least one surface, wherein the photocatalytic optical fibers are disposed on the substrate to project from the at least one surface; and light-redirecting or light-diffusing means for redirecting or diffusing light transmitted in the substrate.

27. The photocatalyst apparatus according to claim 26, wherein the light-redirecting means comprise a plurality of projections, grooves or prisms disposed in/on the at least one surface.

28. The photocatalyst apparatus according to claim 26, wherein the light-redirecting means comprise a light-redirecting film including a plurality of light diffusing particles disposed in/on the at least one surface.

29. The photocatalyst apparatus according to claim 26, wherein the light-redirecting means comprise a plurality of light diffusing particles disposed in an interior of the substrate.

30. The photocatalyst apparatus according to claim 26, wherein the light-redirecting means form a gradation pattern so as to produce a substantially uniform brightness of light to irradiate uniformly most of the photocatalytic optical fibers.

31. The photocatalyst apparatus according to claim 26, wherein the light-redirecting means form a gradation pattern so as to produce a substantially uniform brightness of light to irradiate uniformly most of the photocatalytic optical fibers and wherein the gradation pattern is selected from the gradation patterns with variable distribution density consisting of grooves on the at least one surface, projections on the at least one surface, prisms on the at least one surface, light-redirecting film on the at least one surface and light-diffusing particles in an interior of the substrate.

32. The photocatalyst apparatus according to claim 26, wherein the light-redirecting means form a gradation pattern so as to produce a substantially uniform brightness of light to irradiate uniformly most of the photocatalytic optical fibers and wherein the gradation pattern is selected from the gradation patterns with variable quantity, width or height consisting of grooves on the at least one surface, projections on the at least one surface, prisms on the at least one surface, light-redirecting film on the at least one surface and light-diffusing particles in an interior of the substrate.

33. A photocatalyst reactor comprising:

a photocatalyst apparatus comprising (1) a plurality of photocatalytic optical fibers, each of the photocatalytic optical fibers having a core and a photocatalytic clad including a photocatalyst and (2) a substrate having at least one surface, wherein the photocatalytic optical fibers are disposed on the substrate to project from the surface; and a light source in communication with the photocatalytic optical fibers.

34. The photocatalyst reactor according to claim 33, wherein the photocatalytic optical fibers receive light from the light source or ambient light passed through the substrate or wherein the photocatalytic optical fibers receive the light or the ambient light directly without passing through the substrate.

35. The photocatalyst reactor according to claim 33, further comprising at least one light delivering optical fiber without a photocatalyst for delivering light from the light source toward the substrate and/or the photocatalytic optical fibers.

36. The photocatalyst reactor according to claim 33, the substrate further comprising a substantially transparent material to act as a light guide having at least one side or end and/or at least one peripheral portion of the at least one surface to introduce light from the light source into the substrate therefrom, wherein the photocatalytic optical fibers receive light leaked or output from the at least one surface of the surface.

37. The photocatalyst reactor according to claim 33, the photocatalyst reactor further comprising:

the substrate composed of a substantially transparent material to act as a light guide having at least one side or end and/or at least one peripheral portion of the at least one surface;

at least one prism disposed on or adjacent to at least one portion of at least one surface or disposed on or adjacent to the at least one side or end and/or the at least one peripheral portion of the at least one surface to receive light from the light source; and wherein light is introduced into the substrate through the at least one prism and the photocatalytic optical fibers receive light leaked or output from the at least one surface of the surface.

38. The photocatalyst apparatus according to claim 33, further comprising an automatic light control device having a brightness control device and a photo-sensor, wherein the brightness control device controls a brightness of the light source in response to an ambient light detected by the photo-sensor.

39. The photocatalyst reactor according to claim 33, further comprising:

a substantially transparent adhesive film to act as a light guide having at least one surface and/or at least one side or end;

wherein the adhesive film is disposed on the substrate to attach the photocatalytic optical fibers thereto/thereon; and wherein the light source is disposed in at least one position relative to the at least one surface and/or or the at least one side or end to receive light from the light source and to introduce light into the adhesive film.

40. The photocatalyst reactor according to claim 33, wherein each of the photocatalytic optical fibers receives light from the light source at a fixed end thereof and/or at a free end thereof and/or receives light directly at the photocatalytic clad.

41. The photocatalyst reactor according to claim 33, further comprising:

a light-diffusing or leaky light-guide means having a solid or hollow light guide; and wherein the light source is disposed in at least one position relative to the light-diffusing or leaky light-guide means and the photocatalyst apparatus receives light via the light-diffusing or leaky light-guide means to irradiate the photocatalytic optical fibers.

42. The photocatalyst reactor according to claim 33, further comprising:

a light-diffusing or leaky light-guide means composed of a substantially rectangular panel having a solid body or composed of a substantially rectangular panel having a hollow structure with a pair of substantially rectangular plates and a substantially rectangular hollow space therebetween; and wherein the light source is disposed in at least one position relative to the light-diffusing or leaky light-guide means and the photocatalyst apparatus receives light via the light-diffusing or leaky light-guide means to irradiate the photocatalytic optical fibers.

43. The photocatalyst reactor according to claim 33, further comprising: a housing to enclose the one or more photocatalyst apparatus having a space to enclose the photocatalyst apparatus, an inlet to introduce a fluid thereto and an outlet to discharge the fluid therefrom.

44. The photocatalyst reactor according to claim 33, further comprising: a housing to enclose the one or more photocatalyst apparatus having a space to enclose the photocatalyst apparatus, an inlet to introduce a fluid thereto and an outlet to discharge the fluid therefrom, wherein the photocatalyst apparatus is disposed at one or more position where fluid flows across a length of the photocatalytic optical fibers, or wherein the photocatalyst apparatus is disposed at one or more position where fluid flows along a length of the photocatalytic optical fibers.

45. A method for manufacturing a photocatalyst apparatus comprising the steps of:

a first step of preparing (a) a plurality of optical fibers, each of the optical fibers having a core, (b) a substrate having at least one surface and (c) a photocatalyst;

a second step of attaching the optical fibers to/on the at least one surface so as to project from the at least one surface by an electrostatic process; and fixing the photocatalyst to/on the core/cores to form a photocatalytic optical fiber/fibers having a photocatalytic clad/clads before the first step or after the second step.

46. The method for manufacturing a photocatalyst apparatus according to claim 45, wherein an adhesive is disposed entirely or partially on the at least one surface after the first step so as to adhere the photocatalytic optical fibers thereto/thereon.

47. The method for manufacturing a photocatalyst apparatus according to claim 45, wherein an adhesive is disposed entirely or partially on the at least one surface after the first step so as to adhere the photocatalytic optical fibers thereto/thereon and the adhesive is made of thermosetting, photosetting or thermoplastic resin or plastic material.

* * * * *